United States Patent
Kawakami

(10) Patent No.: US 12,494,506 B2
(45) Date of Patent: Dec. 9, 2025

(54) NONAQUEOUS ELECTROLYTIC SOLUTION AND ENERGY DEVICE INCLUDING THE SAME

(71) Applicants: Mitsubishi Chemical Corporation, Tokyo (JP); MU IONIC SOLUTIONS CORPORATION, Tokyo (JP)

(72) Inventor: Daisuke Kawakami, Tokyo (JP)

(73) Assignees: Mitsubishi Chemical Corporation, Tokyo (JP); MU IONIC SOLUTIONS CORPORATION, Tokyo (JP)

( * ) Notice: Subject to any disclaimer, the term of this patent is extended or adjusted under 35 U.S.C. 154(b) by 1315 days.

(21) Appl. No.: 17/001,783

(22) Filed: Aug. 25, 2020

(65) Prior Publication Data

US 2020/0388884 A1     Dec. 10, 2020

Related U.S. Application Data

(63) Continuation of application No. PCT/JP2019/013279, filed on Mar. 27, 2019.

(30) Foreign Application Priority Data

Mar. 27, 2018   (JP) ................. 2018-060481

(51) Int. Cl.
| | |
|---|---|
| *H01M 10/0567* | (2010.01) |
| *H01M 4/02* | (2006.01) |
| *H01M 4/36* | (2006.01) |
| *H01M 4/48* | (2010.01) |
| *H01M 4/583* | (2010.01) |
| *H01M 10/0525* | (2010.01) |
| *H01M 10/0568* | (2010.01) |
| *H01M 10/0569* | (2010.01) |

(52) U.S. Cl.
CPC ....... *H01M 10/0567* (2013.01); *H01M 4/366* (2013.01); *H01M 4/48* (2013.01); *H01M 4/583* (2013.01); *H01M 10/0568* (2013.01); *H01M 10/0569* (2013.01); *H01M 2004/027* (2013.01); *H01M 2004/028* (2013.01); *H01M 10/0525* (2013.01); *H01M 2300/0028* (2013.01)

(58) Field of Classification Search
CPC .. H01M 10/0567; H01M 4/366; H01M 4/583; H01M 10/0568; H01M 10/0569; H01M 10/0525; H01M 2004/027; H01M 2004/028; H01M 2300/0028
See application file for complete search history.

(56) References Cited

U.S. PATENT DOCUMENTS

| | | |
|---|---|---|
| 8,580,429 B2 | 11/2013 | Abe et al. |
| 9,130,244 B2 | 9/2015 | Abe et al. |
| 2006/0292452 A1 | 12/2006 | Utsugi et al. |
| 2011/0064998 A1 | 3/2011 | Abe et al. |
| 2012/0034517 A1 | 2/2012 | Utsugi et al. |
| 2012/0171581 A1 | 7/2012 | Abe et al. |
| 2013/0101895 A1 | 4/2013 | Utsugi et al. |
| 2014/0093787 A1* | 4/2014 | Abe .............. C07D 327/04 429/188 |
| 2015/0221985 A1 | 8/2015 | Abe |
| 2015/0372349 A1 | 12/2015 | Shikita |
| 2016/0294008 A1 | 10/2016 | Yoshida et al. |
| 2017/0179528 A1 | 6/2017 | Lee et al. |
| 2017/0200976 A1 | 7/2017 | Nakazawa et al. |
| 2018/0248226 A1 | 8/2018 | Kono et al. |
| 2020/0263516 A1 | 8/2020 | Yoshida et al. |

FOREIGN PATENT DOCUMENTS

| | | | |
|---|---|---|---|
| EP | 3 086 398 A1 | 10/2016 | |
| EP | 3 182 497 A1 | 6/2017 | |
| EP | 3 203 569 A1 | 8/2017 | |
| EP | 3182497 B1 * | 10/2018 | ......... H01M 10/052 |

(Continued)

OTHER PUBLICATIONS

Fujita, JP-2019179638-A, Espacenet machine translation, 2019 (Year: 2019).*

(Continued)

*Primary Examiner* — Adam A Arciero
(74) *Attorney, Agent, or Firm* — Oblon, McClelland, Maier & Neustadt, L.L.P.

(57) ABSTRACT

A nonaqueous electrolytic solution may include a nonaqueous solvent and a compound of formula (1):

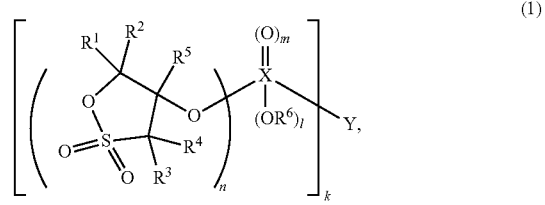

wherein, $R^1$ to $R^5$ are each independently H or an alkyl group with 1 to 3 carbon atoms and optionally a substituent; $R^6$ is an organic group with 1 to 8 carbon atoms and optionally a heteroatom; X is C, S, or P; when X is C, l=0, m=1, and n=1, when X is S, l=0, m=2, and n=1, and when X is P, l=0, m=1, and n=2 or l=1, m=1, and n=1; k is an integer of 2 to 4; and Y is a direct bond or a linking group with 1 to 8 carbon atoms and optionally a heteroatom, and when Y is a direct bond, the compound has an X-X bond and k=2.

20 Claims, No Drawings

(56) References Cited

FOREIGN PATENT DOCUMENTS

| | | | |
|---|---|---|---|
| JP | 2011-184390 A | | 9/2011 |
| JP | 2011-187235 A | | 9/2011 |
| JP | 2014-26972 A | | 2/2014 |
| JP | 2015-195196 A | | 11/2015 |
| JP | 2016-184579 A | | 10/2016 |
| JP | 2019179638 A | * | 10/2019 |
| WO | WO 2009/113545 A1 | | 9/2009 |
| WO | WO 2011/034067 A1 | | 3/2011 |
| WO | WO 2012/147818 A1 | | 11/2012 |
| WO | WO 2014/021272 A1 | | 2/2014 |
| WO | WO 2017/043576 A1 | | 3/2017 |

OTHER PUBLICATIONS

International Search Report issued Jun. 25, 2019 in PCT/JP2019/013279 filed Mar. 27, 2019, 2 pages.
Extended European Search Report issued Jun. 8, 2021 in European Patent Application No. 19778330.1, 9 pages.
Korean Office Action issued Jul. 11, 2022 in Korean Patent Application No. 10-2020-7024520 (with unedited computer generated English translation), 13 pages.
Combined Chinese Office Action and Search Report issued Sep. 29, 2023 in Chinese Application 201980016502.4 (with partial unedited computer-generated English translation), 8 pages.

* cited by examiner

NONAQUEOUS ELECTROLYTIC SOLUTION AND ENERGY DEVICE INCLUDING THE SAME

CROSS-REFERENCE TO RELATED APPLICATIONS

The present application is a bypass continuation of international application PCT/JP2019/013279, filed on Mar. 27, 2019, and claims the benefit of the filing date of Japanese Appl. No. 2018-060481, filed on Mar. 27, 2018.

TECHNICAL FIELD

The present invention relates to a nonaqueous electrolytic solution and an energy device that includes the nonaqueous electrolytic solution.

BACKGROUND ART

With a rapid advance of mobile electronic devices, such as cellular mobile phones and notebook-sized personal computers, there has been an increasing demand for an increase in the capacities of the batteries used as a main power source or a backup power source for the mobile electronic devices. Thus, particular attention is given to energy devices such as lithium-ion secondary batteries, which have higher energy densities than nickel-cadmium batteries or nickel-hydrogen batteries.

The components constituting a lithium secondary battery are broadly classified into a positive electrode, a negative electrode, a separator, and an electrolytic solution. Among these, the electrolytic solution is commonly a nonaqueous electrolytic solution produced by dissolving an electrolyte, such as $LiPF_6$, $LiBF_4$, $LiClO_4$, $LiCF_3SO_3$, $LiAsF_6$, $LiN(CF_3SO_2)_2$, or $LiCF_3(CF_2)_3SO_3$, in a nonaqueous solvent, such as a cyclic carbonate (e.g., ethylene carbonate or propylene carbonate), a chain carbonate (e.g., dimethyl carbonate, diethyl carbonate, or ethyl methyl carbonate), a cyclic ester (e.g., γ-butyrolactone or γ-valerolactone), or a chain ester (e.g., methyl acetate or methyl propionate).

Against the backdrop of global issues, such as environment and energy, there have also been great expectations for the application of lithium secondary batteries to large power sources, such as on-vehicle power sources and stationary power sources. In particular, there has been a rapid progress in the application of lithium secondary batteries to on-vehicle power sources. Accordingly, improvement of the performance capabilities of the batteries has been anticipated.

One of the approaches to further improve the characteristics of lithium secondary batteries is to add an appropriate compound to the electrolytic solution. For example, PTLs 1 and 2 propose that adding a specific hydroxy acid derivative to a nonaqueous electrolyte may improve low-temperature and high-temperature cycle characteristics and low-temperature rate characteristics measured subsequent to charge and storage at high temperatures. PTLs 3 and 4 disclose that adding a specific sulfonate ester to a nonaqueous electrolyte may, for example, limit a reduction in capacity and the generation of a gas which may occur subsequent to storage at high temperatures and improve cycle characteristics.

PTL 1: International Publication No. 2009/113545
PTL 2: International Publication No. 2011/034067
PTL 3: Japanese Unexamined Patent Application Publication No. 2011-187235
PTL 4: Japanese Unexamined Patent Application Publication No. 2014-26972

There has been an increasing demand for batteries having higher performance. In particular, in consideration of the use of the batteries as on-vehicle batteries, the batteries are required to achieve various battery characteristics, such as an increase in capacity, resistance characteristics, a reduction in the generation of a gas during charge, retention of high capacity under long-term charge-discharge cycles, simultaneously at high levels.

Examples of the methods for increasing the battery capacity which have currently been studied include a method of widening the range in which the positive electrode can be used and using the battery at higher potentials and a method of increasing the densities of the active material layers of the electrodes. However, widening the range in which the positive electrode can be used and using the battery at higher potentials may increase the reactivity of the positive electrode and consequently accelerate the side reaction between the positive electrode and the electrolytic solution. Thus, troubles, such as a reduction in capacity and an increase in the amount of decomposition gas, are likely caused by the side reaction in a high-temperature continuous-charging endurance test, which is conducted by forcibly keeping a battery being charged and at a high temperature in order to accelerate degradation. Since an increase in the amount of decomposition gas results in the expansion and fracture of the battery, it also poses significant risks in terms of safety. On the other hand, increasing the densities of the active material layers of the electrodes may make it difficult to uniformly use the active materials and result in a nonuniform reaction, which causes lithium to be partially precipitated. Furthermore, the degradation of the active materials may be accelerated. Therefore, a sufficiently high capacity may fail to be maintained in a cycle test, in which the durability of a battery is determined while a cycle of charging and discharging are repeated over a prolonged period of time and, in particular, in a high-temperature cycle test, in which the degradation of a battery is accelerated. Furthermore, the above-described degradation of a battery may result in an increase in the resistance at the interfaces between the electrodes and the electrolytic solution and increase the likelihood of the battery having higher resistance than the initial battery.

PTLs 1 to 3 describe a technique for improving low-temperature and high-temperature cycle characteristics and discharge capacity retention factor, which is a measure of low-temperature rate characteristics measured subsequent to charge and storage at high temperatures, and limiting the generation of a gas subsequent to storage at high temperatures. However, the resistance characteristics of batteries determined in the evaluations for the above items were at insufficient levels.

Although PTL 4 discloses a technique for limiting a reduction in capacity, the generation of a gas, etc. which may occur subsequent to storage at high temperatures, durability to withstand high-temperature continuous charging was at an insufficient level.

While the battery voltage is set to 4.2 V in the techniques disclosed in the above patent literatures, there is no study conducted at a higher battery voltage in order to increase battery capacity.

SUMMARY OF INVENTION

The present invention was made in order to address the above-described issues. An object of the present invention is to provide a nonaqueous electrolytic solution capable of improving the discharge capacity retention factor of an energy device including the nonaqueous electrolytic solution and the resistance characteristics of the energy device relative to the initial battery, which are determined in the high-temperature cycle test, and reducing the generation of a gas and continuous charge capacity, which are determined in the high-temperature continuous-charging endurance test, and an energy device that includes the nonaqueous electrolytic solution.

In order to achieve the above object, the inventor of the present invention conducted a variety of studies and consequently found that the above issues may be addressed by adding a specific cyclic sulfonate ester to an electrolytic solution. Thus, the present invention was made.

The summary of the aspects of the present invention is as described below.

[1] A nonaqueous electrolytic solution comprising a nonaqueous solvent and a compound represented by Formula (1) below.

[Chem. 1]

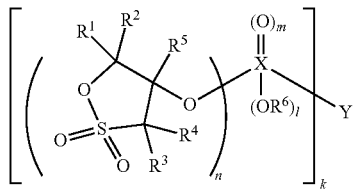

(wherein, in Formula (1),
$R^1$ to $R^5$ each independently represent a hydrogen atom or an alkyl group that has 1 to 3 carbon atoms and may have a substituent;
$R^6$ is an organic group that has 1 to 8 carbon atoms and may have a hetero atom;
X is a carbon atom, a sulfur atom, or a phosphorus atom; when X is a carbon atom, l=0, m=1, and n=1, when X is a sulfur atom, l=0, m=2, and n=1, and when X is a phosphorus atom, l=0, m=1, and n=2 or l=1, m=1, and n=1;
k is an integer of 2 to 4; and
Y represents a direct bond or a linking group that has 1 to 8 carbon atoms and may have a hetero atom, and when Y is a direct bond, the compound has an X-X bond and k=2)

[2] The nonaqueous electrolytic solution according to [1], wherein, in Formula (1), all of $R^1$ to $R^5$ are hydrogen atoms.

[3] The nonaqueous electrolytic solution according to [1] or [2], wherein Y is absent in Formula (1) and the compound has an X-X bond, or wherein, in Formula (1), Y is an alkylene group having 1 to 4 carbon atoms.

[4] The nonaqueous electrolytic solution according to any one of [1] to [3], wherein, in Formula (1), $R^6$ is a methyl group or an ethyl group.

[5] The nonaqueous electrolytic solution according to any one of [1] to [4], wherein the content of the compound represented by Formula (1) in 100% by mass of the nonaqueous electrolytic solution is 0.01% to 10% by mass.

[6] The nonaqueous electrolytic solution according to any one of [1] to [5], further comprising an electrolyte.

[7] The nonaqueous electrolytic solution according to any one of [1] to [6], further comprising at least one compound selected from the group consisting of a cyclic carbonate having an unsaturated carbon-carbon bond, a cyclic carbonate having a fluorine atom, and a salt including fluorine.

[8] An energy device comprising negative and positive electrodes capable of occluding and releasing a metal ion and the nonaqueous electrolytic solution according to any one of [1] to [7].

[9] The energy device according to [8], wherein the positive electrode capable of occluding and releasing a metal ion includes at least one or more layered transition metal oxides.

[10] The energy device according to [8] or [9], wherein the negative electrode capable of occluding and releasing a metal ion includes at least one or more carbon compounds.

[11] An electric vehicle comprising the energy device according to any one of [8] to [10] as an energy source.

[12] A compound represented by Formula (1) below.

[Chem. 2]

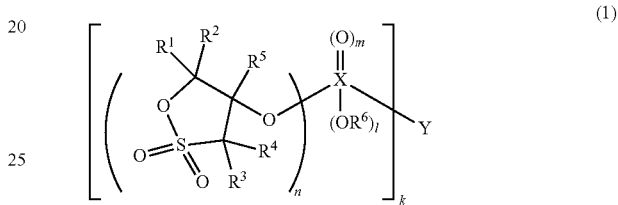

(wherein, in Formula (1),
$R^1$ to $R^5$ each independently represent a hydrogen atom or an alkyl group that has 1 to 3 carbon atoms and may have a substituent;
$R^6$ is an organic group that has 1 to 8 carbon atoms and may have a hetero atom;
X is a carbon atom, a sulfur atom, or a phosphorus atom; when X is a carbon atom, l=0, m=1, and n=1, when X is a sulfur atom, l=0, m=2, and n=1, and when X is a phosphorus atom, l=0, m=1, and n=2 or l=1, m=1, and n=1;
k is an integer of 2 to 4; and
Y is a direct bond or a linking group that has 1 to 8 carbon atoms and may have a hetero atom, and when Y is a direct bond, the compound has an X-X bond and k=2)

[13] A compound represented by Formula (2) below.

[Chem. 3]

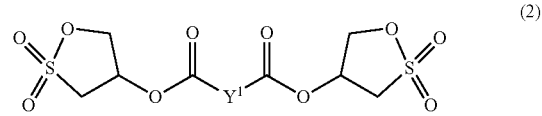

(wherein, in Formula (2), $Y^1$ is a direct bond or a linking group that has 1 to 8 carbon atoms and may have a hetero atom)

[14] A compound represented by Formula (3) below.

[Chem. 4]

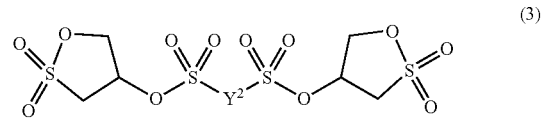

(wherein, in Formula (3), $Y^2$ is a linking group that has 1 to 8 carbon atoms and may have a hetero atom)

Advantageous Effects of Invention

According to the present invention, a nonaqueous electrolytic solution used for producing an energy device that has an improved discharge capacity retention factor and improved resistance characteristics relative to the initial battery, which are determined in the high-temperature cycle test, and is capable of reducing the generation of gas and continuous charge capacity, which are determined in the high-temperature continuous-charging endurance test, may be provided. This enhances the performance and safety of an energy device.

The actions and mechanisms by which the discharge capacity retention factor of an energy device prepared using the nonaqueous electrolytic solution according to the present invention and the resistance characteristics of the energy device relative to the initial battery, which are determined in the high-temperature cycle test, are improved and the generation of gas and continuous charge capacity of the energy device determined in the high-temperature continuous-charging endurance test are reduced are not clear and are considered as follows. Note that the present invention is not limited to the actions and mechanisms described below.

Normally, the ester compounds described in, for example, PTLs 1 to 4 have high electrochemical reactivity. In particular, the ester site can be easily decomposed by a reduction reaction that occurs on the negative electrode. In the case where the decomposition component is a low-molecular-weight alkane skeleton having 1 or 2 carbon atoms, gasification easily occurs on the positive and negative electrodes. The generation of gas results in the expansion of the battery. In addition, the following reduction reaction may cause the degradation of capacity. In the case where the ester site includes an unsaturated bond, the coating film formed as a result of the reduction of the unsaturated bond site inhibits the following reduction reaction and thereby limits the degradation of capacity which occurs in the cycle test. However, the coating film inhibits the movement of Li ions and thereby may increase the resistance at the interfaces between the electrodes and the electrolytic solution relative to the battery that has not been subjected to the test.

Regarding the above issues, in an aspect of the present invention, it was found that the above issues may be addressed by adding the compound represented by Formula (1) to a nonaqueous electrolytic solution.

All of the compounds represented by Formula (1) have a main skeleton including an ester of a polyprotic acid. Furthermore, the ester site includes a cyclic sulfonic acid skeleton. While the ester skeleton is considered to be cleaved by the reduction reaction that occurs on the negative electrode, the main skeleton of the compound represented by Formula (1) is likely to form a polyvalent anion, which combines with electrolyte cations contained in the electrolytic solution to form a polyvalent salt. The polyvalent salt enhances the thermal stability of the coating film deposited on the electrode and thereby limits the side reaction that occurs inside the battery. This increases the capacity retention factor determined in the high-temperature cycle test or the high-temperature continuous-charging endurance test. As a result, the generation of gas caused by the side reaction may be also reduced. Furthermore, when the polyvalent salt enters the coating film deposited on the electrode, it becomes possible to effectively feed Li ions onto the electrode. This limits an increase in resistance and improves the resistance characteristics. The dissociated ester-side skeleton is a cyclic sulfonic acid skeleton having a large molecular weight, which is hard to gasify. This also contributes to the reduction in the generation of a gas. Moreover, the cyclic sulfonic acid skeleton also contributes to the formation of the protective coating film having excellent thermal stability on the negative electrode and thereby limits the reduction in capacity which may be caused due to the side reaction.

Therefore, the compound represented by Formula (1) may improve the discharge capacity retention factor and the resistance characteristics relative to the initial battery, which are determined in the high-temperature cycle test, and reduce the generation of a gas and the continuous charge capacity caused by the side reaction, which are determined in the high-temperature continuous-charging endurance test, without degrading the characteristics of the energy device.

DESCRIPTION OF EMBODIMENTS

Embodiments of the present invention are described below. The present invention is not limited to the following embodiments. The present invention may be implemented with various modifications within the summary and scope of the present invention.

1. Nonaqueous Electrolytic Solution

A nonaqueous electrolytic solution according to the present invention includes a nonaqueous solvent and the compound represented by Formula (1) below.

[Chem. 5]

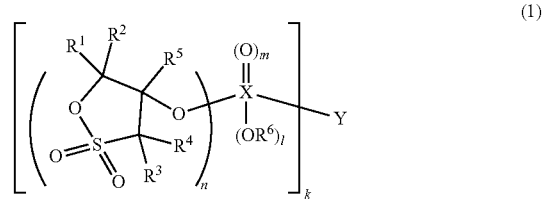

(wherein, in Formula (1),
$R^1$ to $R^5$ each independently represent a hydrogen atom or an alkyl group that has 1 to 3 carbon atoms and may have a substituent;
$R^6$ is an organic group that has 1 to 8 carbon atoms and may have a hetero atom;
X is a carbon atom, a sulfur atom, or a phosphorus atom; when X is a carbon atom, l=0, m=1, and n=1, when X is a sulfur atom, l=0, m=2, and n=1, and when X is a phosphorus atom, l=0, m=1, and n=2, or l=1, m=1, and n=1;
k is an integer of 2 to 4; and
Y represents a direct bond or a linking group that has 1 to 8 carbon atoms and may have a hetero atom, and when Y is a direct bond, the compound has an X-X bond and k=2)

1-1-1. Compound Represented by Formula (1)

The nonaqueous electrolytic solution according to the present invention includes the compound represented by Formula (1) Note that, in the present invention, no distinction is made among optical isomers of the compound represented by Formula (1). The isomers may be used alone or in a mixture of two or more in the present invention.

In Formula (1), $R^1$ to $R^5$ may represent a hydrogen atom or any alkyl group that has 1 to 3 carbon atoms and may have a substituent. $R^1$ to $R^5$ preferably represent a hydrogen atom, an alkyl group having 1 to 3 carbon atoms and no substituent, or an alkyl group having 1 to 3 carbon atoms the H atoms of which are partially replaced with F atoms; more preferably represent a hydrogen atom or an alkyl group having 1 to 3 carbon atoms and no substituent; further preferably represent a hydrogen atom or a methyl group; and most preferably represent a hydrogen atom. It is preferable to select $R^1$ to $R^5$ from the above groups because, in such a case, the number of reaction active sites is small and the compound can be decomposed into a polyvalent acid and a cyclic sulfonic acid skeleton with further efficiency. This makes it easy to achieve the advantageous effects of the present invention, that is, the improvement of the discharge capacity retention factor and the resistance characteristics relative to the initial battery, which are determined in the high-temperature cycle test, and reductions in the generation of a gas and the continuous charge capacity, which are determined in the high-temperature continuous-charging endurance test.

In Formula (1), $R^6$ may be any organic group that has 1 to 8 carbon atoms and may have a hetero atom. $R^6$ is preferably an alkyl group having no substituent or an alkyl group the H atoms of which are partially replaced with F atoms; and is more preferably an alkyl group having no substituent. It is preferable that the number of carbon atoms included in $R^6$ fall within the above range because, in such a case, the number of reaction active sites is small and the compound can be decomposed into a polyvalent acid and a cyclic sulfonic acid skeleton with further efficiency. This makes it easy to achieve the advantageous effects of the present invention, that is, the improvement of the discharge capacity retention factor and the resistance characteristics relative to the initial battery, which are determined in the high-temperature cycle test, and reductions in the generation of a gas and the continuous charge capacity, which are determined in the high-temperature continuous-charging endurance test. The number of carbon atoms included in $R^6$ is 1 to 8, is preferably 4 or less, and is most preferably 2 or less. It is preferable that the number of carbon atoms included in $R^6$ fall within the above range because, in such a case, the solubility of the compound in the electrolytic solution is high and a nonaqueous electrolytic solution containing a larger amount of the compound represented by Formula (1) can be produced. This makes it easy to achieve the advantageous effects of the present invention. Examples of the hetero atom that may be included in $R^6$ include an oxygen atom, a nitrogen atom, a silicon atom, a sulfur atom, and a phosphorus atom.

In Formula (1), X is a carbon atom, a sulfur atom, or a phosphorus atom. When X is a carbon atom, l=0, m=1, and n=1. When X is a sulfur atom, l=0, m=2, and n=1. When X is a phosphorus atom, l=0, m=1, and n=2, or l=1, m=1, and n=1. X is preferably a carbon atom or a sulfur atom.

k is an integer of 2 to 4 and is particularly preferably 2.

In the compound represented by Formula (1), Y is a direct bond or a linking group that has 1 to 8 carbon atoms and may have a hetero atom. When Y is a direct bond, the compound has an X-X bond and k=2. Y is preferably a hydrocarbon group that has a valence of k and does not have a substituent other than an alkyl group or a hydrocarbon group that has a valence of k and does not have a substituent other than an alkyl group, the H atoms of which are partially replaced with F atoms, and is more preferably a hydrocarbon group that has a valence of k and does not have a substituent other than an alkyl group. It is preferable that Y be a direct bond or the above linking group because, in such a case, the number of reaction active sites is small and the compound can be decomposed into a polyvalent acid and a cyclic sulfonic acid skeleton with further efficiency. This makes it easy to achieve the advantageous effects of the present invention, that is, the improvement of the discharge capacity retention factor and the resistance characteristics relative to the initial battery, which are determined in the high-temperature cycle test, and reductions in the generation of a gas and the continuous charge capacity, which are determined in the high-temperature continuous-charging endurance test. When Y in Formula (1) is a linking group, the number of carbon atoms included in Y is 1 to 8, is preferably 6 or less, and is most preferably 4 or less. It is preferable that Y fall within the above range because, in such a case, the solubility of the compound in the electrolytic solution is high and a nonaqueous electrolytic solution containing a larger amount of the compound represented by Formula (1) can be produced. This makes it easy to achieve the advantageous effects of the present invention. Examples of the hetero atom that may be included in Y include an oxygen atom, a nitrogen atom, a silicon atom, a sulfur atom, and a phosphorus atom.

Preferable examples of the compound represented by Formula (1) include the compounds represented by Formulae (2) to (5) below.

[Chem. 6]

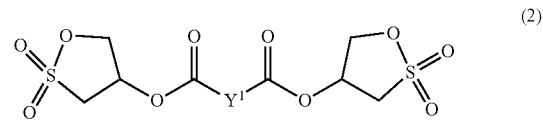

(2)

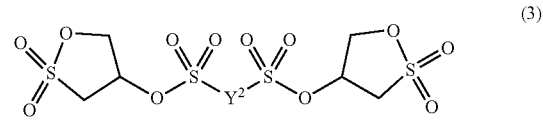

(3)

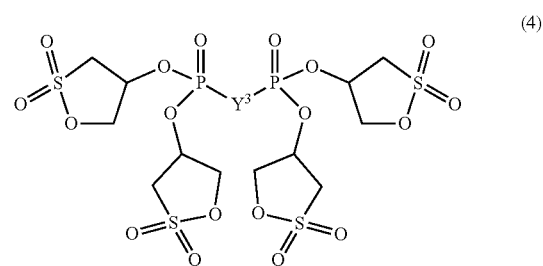

(4)

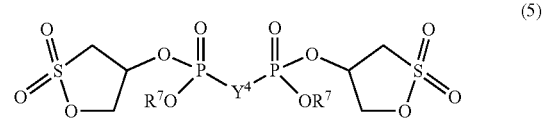

(5)

In Formulae (2) to (5) above, $Y^1$ to $Y^4$ correspond to Y in Formula (1) Thus, the definitions and preferable examples of $Y^1$ to $Y^4$ are the same as the definitions and preferable examples of Y.

$R^7$ in Formula (5) corresponds to $R^6$ in Formula (1) Thus, the definition and preferable examples of $R^7$ are the same as those of $R^6$.

Specific examples of the compound represented by Formula (1) include the following compounds.

[Compounds Including Carbon Atom as X]
[Chem. 7]
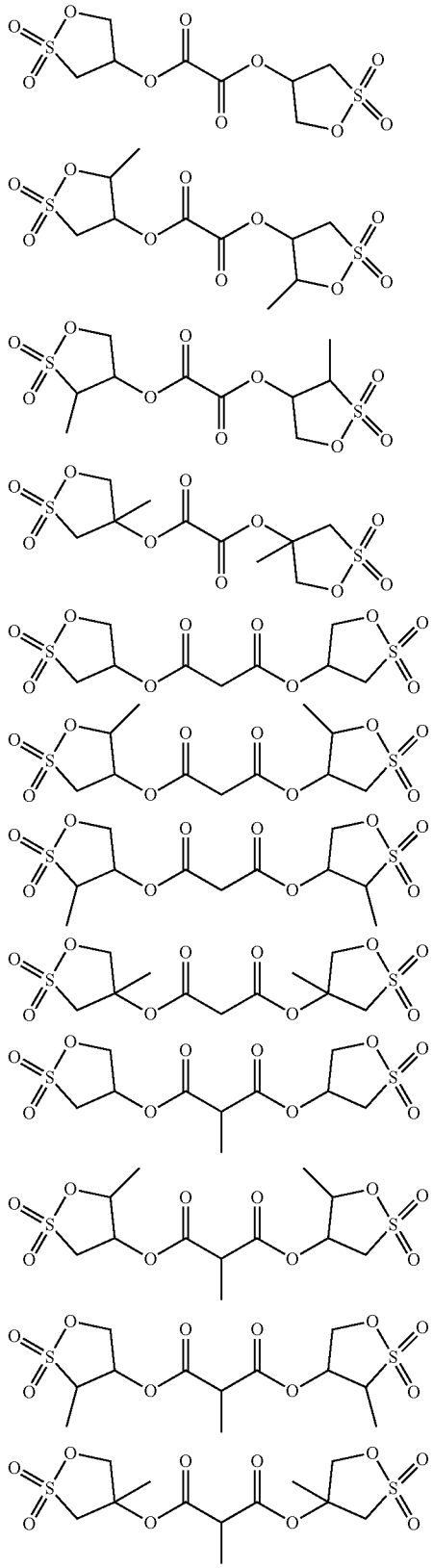
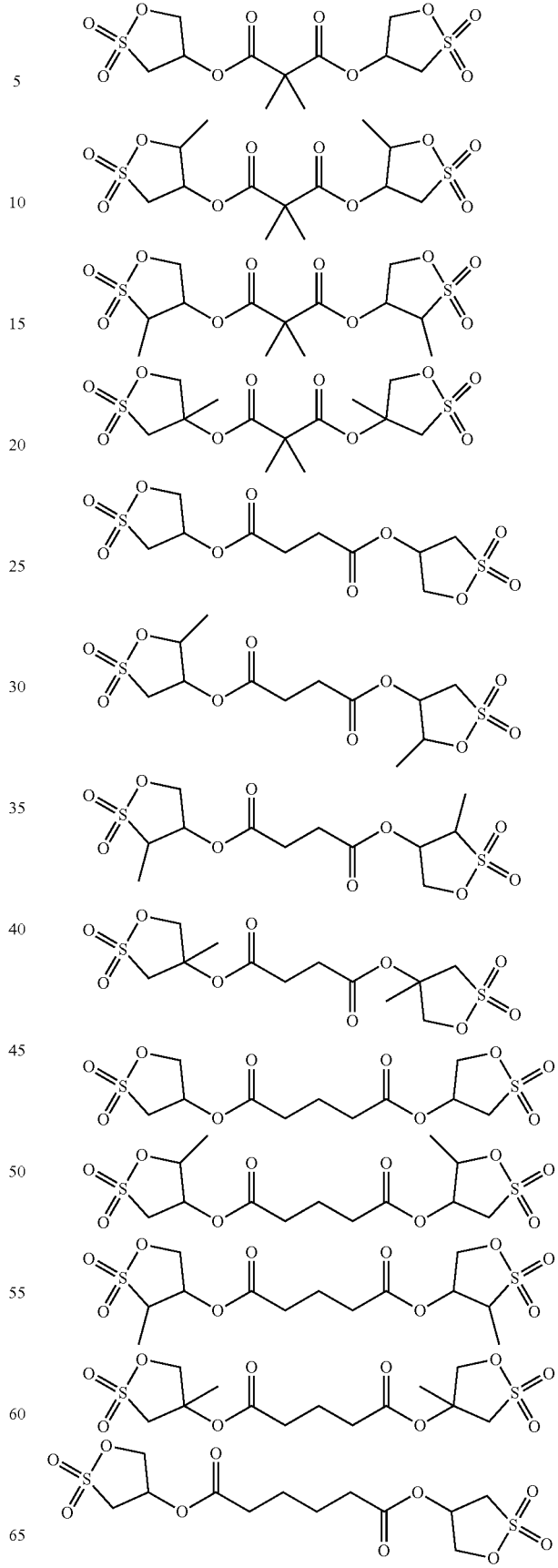
-continued -continued
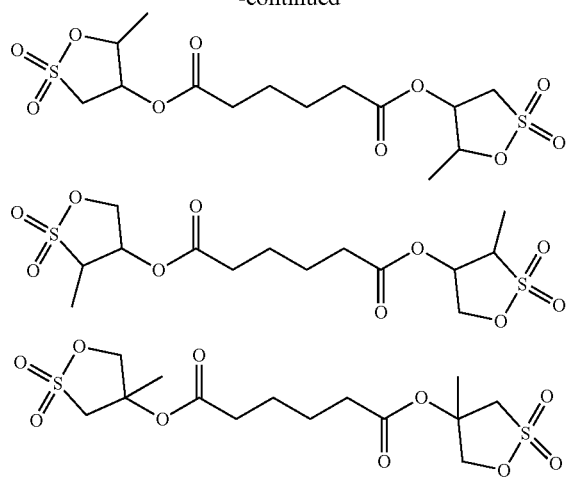
[Compounds Including Sulfur Atom as X]
[Chem. 8]
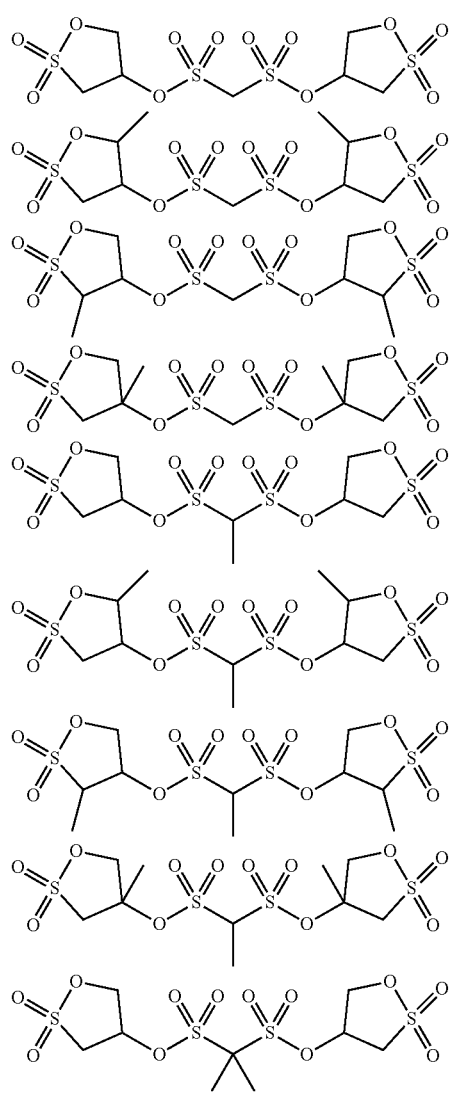
-continued
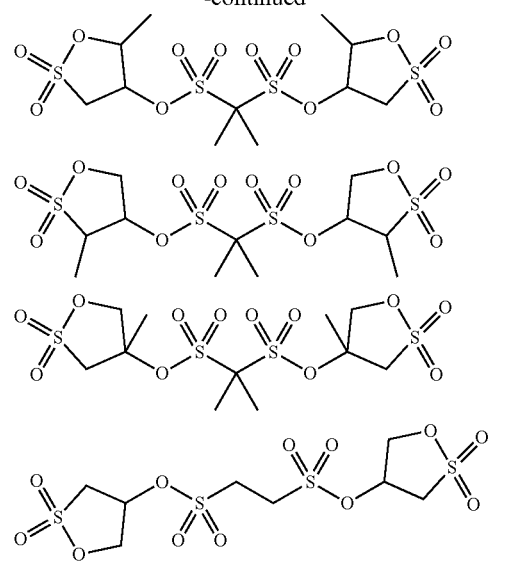

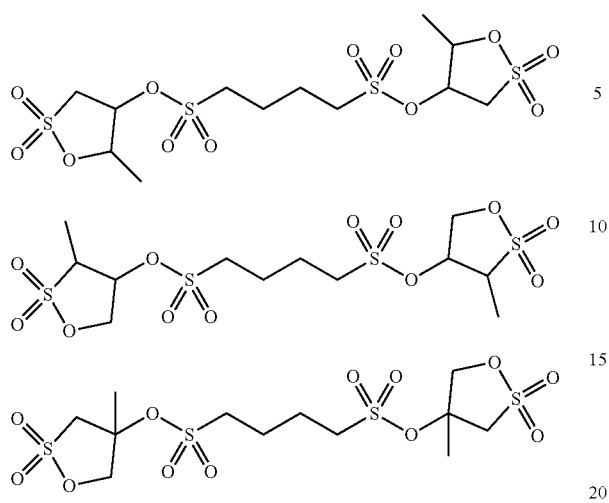
[Compounds Including Phosphorus Atom as X]
[Chem. 9]
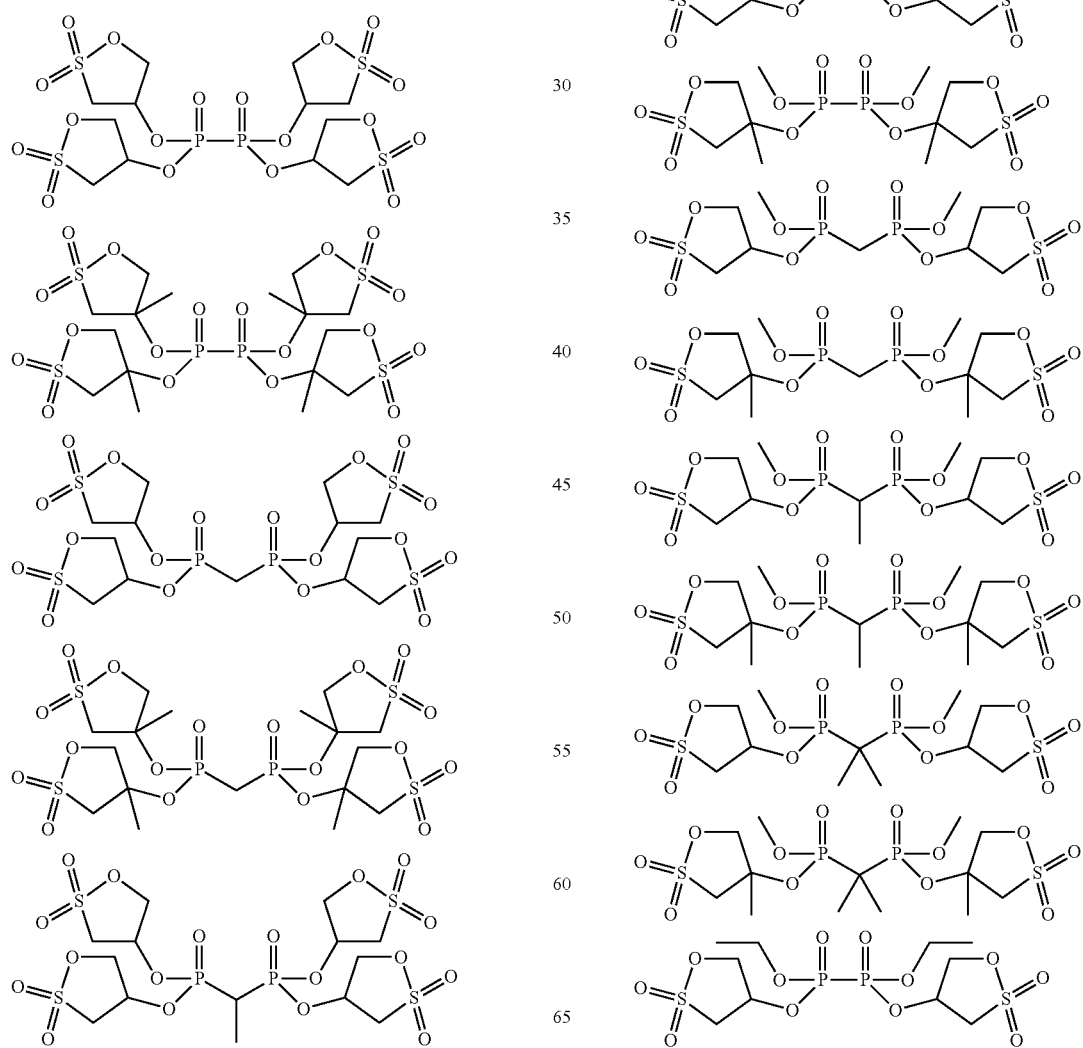

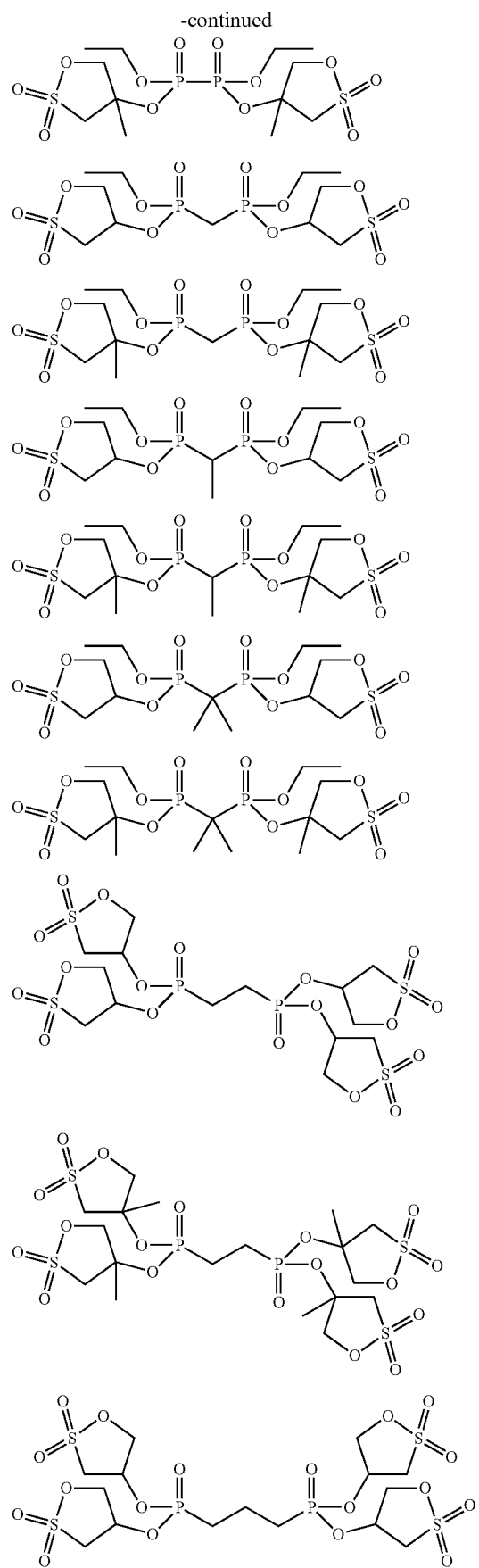
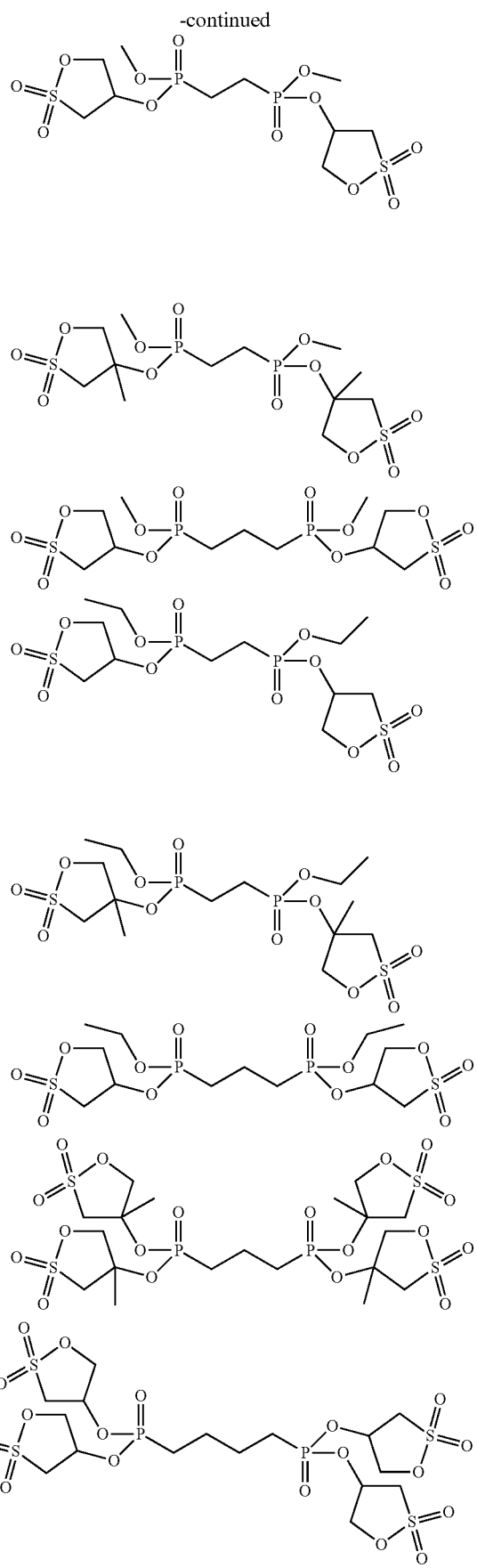

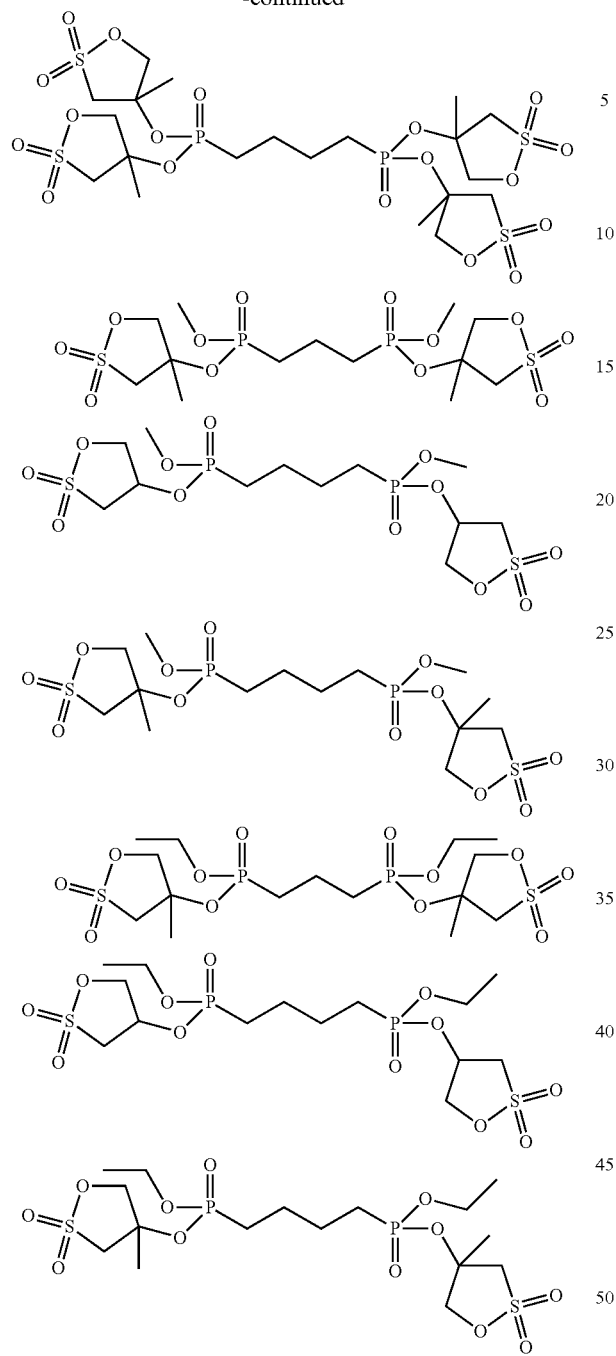
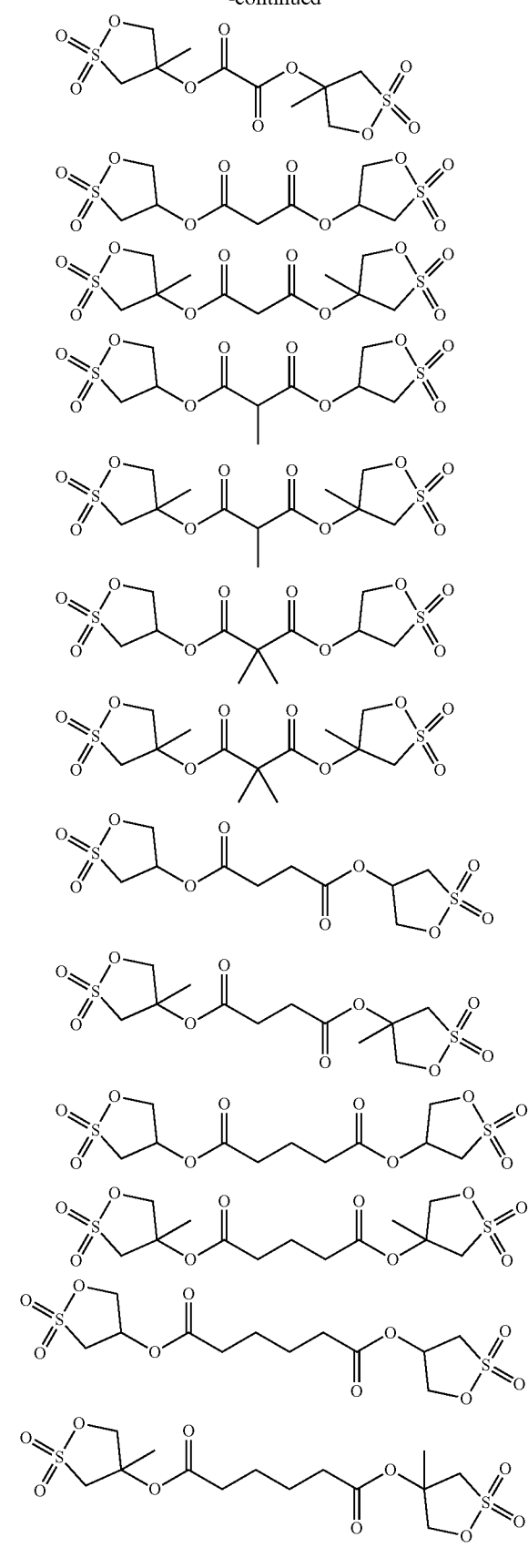
Among the above compounds, the following compounds are preferable from the viewpoint of ease of production.
[Compounds Including Carbon Atom as X]
[Chem. 10]
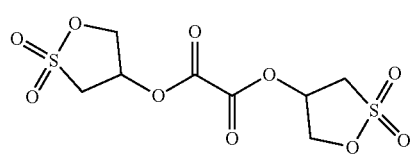

[Compounds Including Sulfur Atom as X]
[Chem. 11]
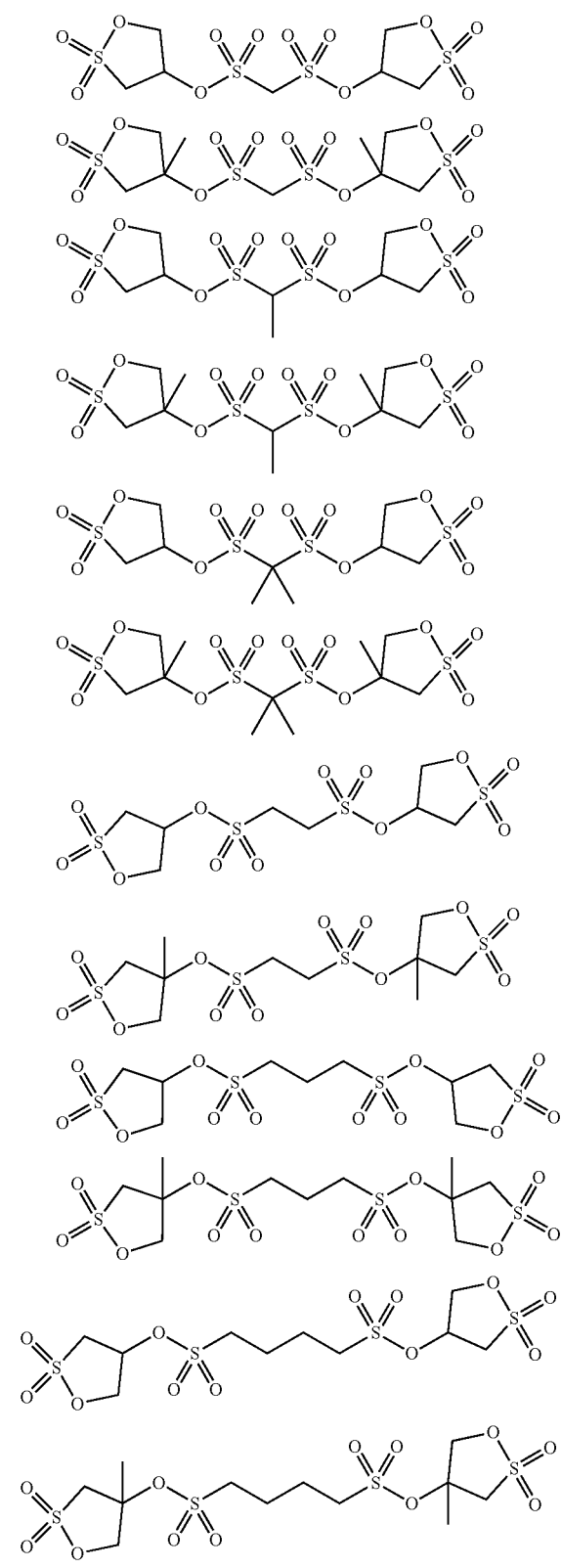
[Compounds Including Phosphorus Atom as X]
[Chem. 12]
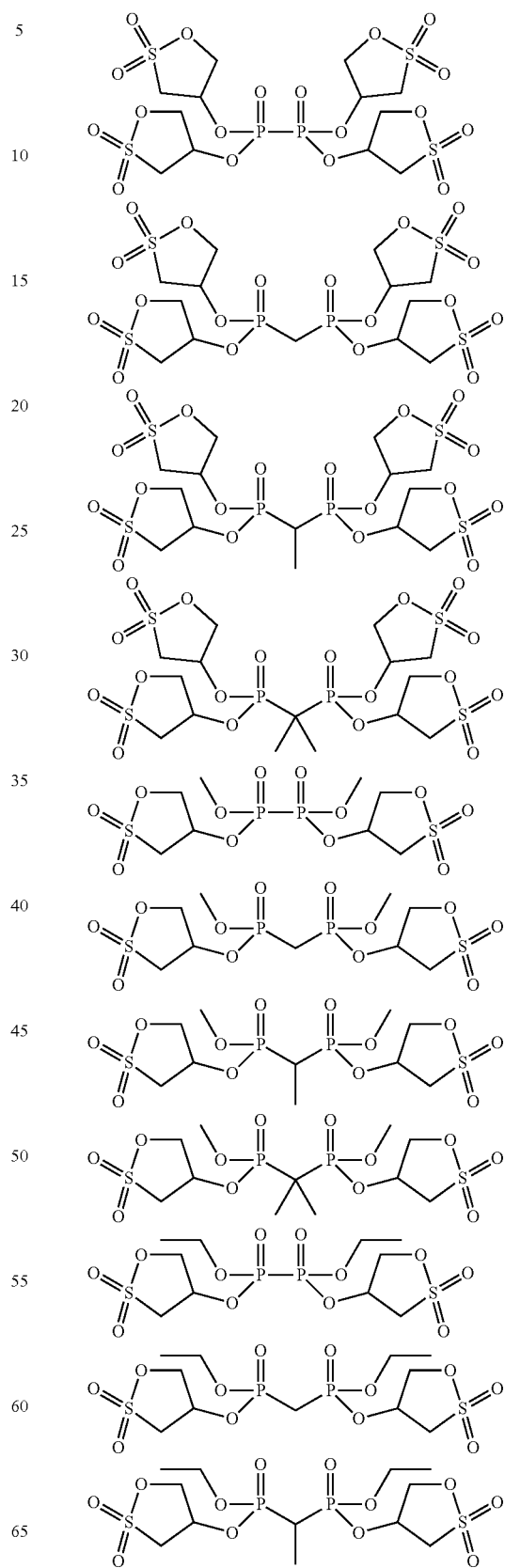

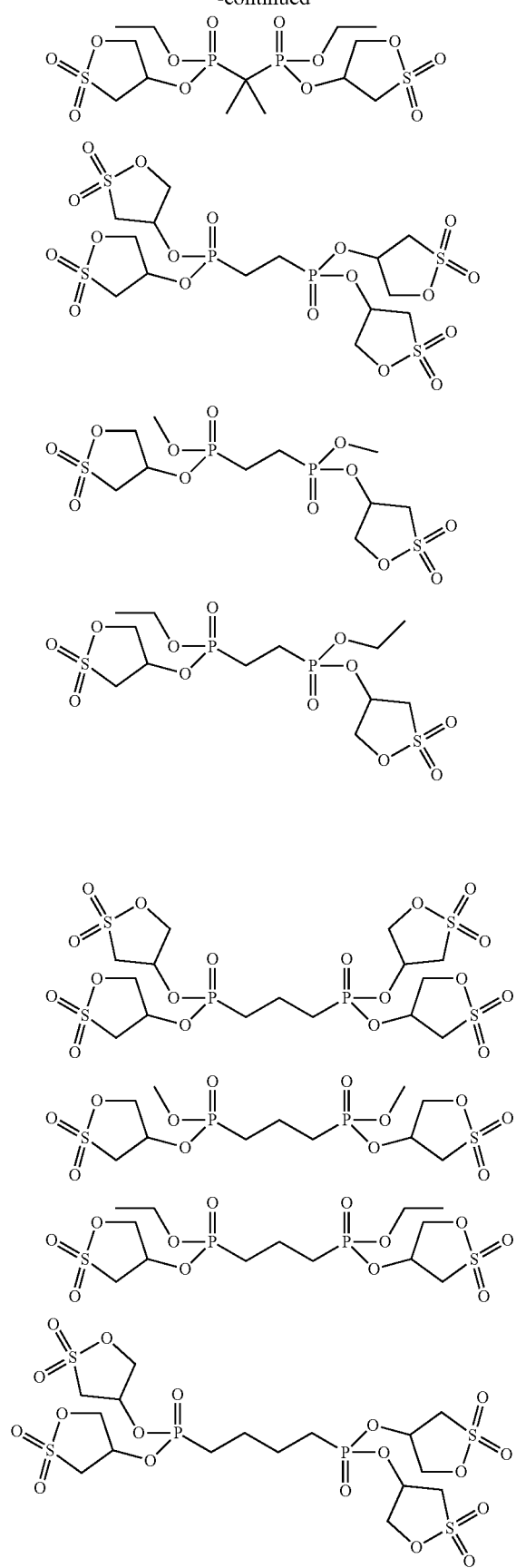
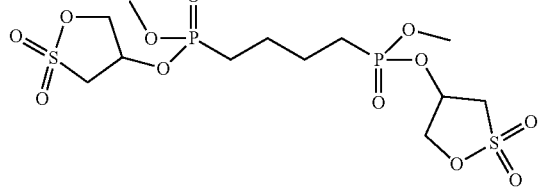
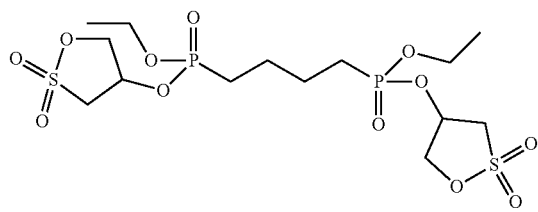
The following compounds are particularly preferable because they have high solubility in the electrolytic solution.
[Chem. 13]
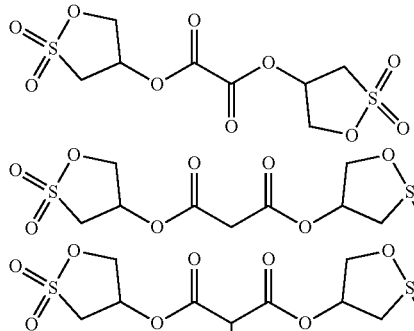
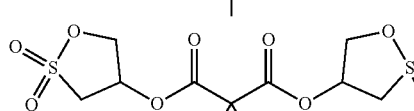
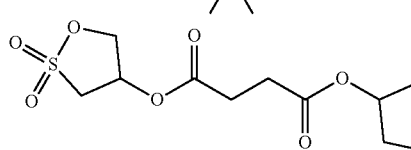
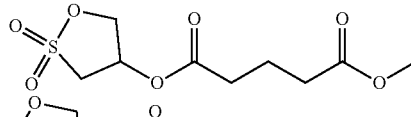
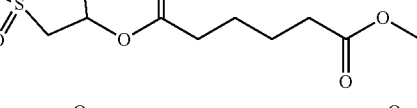
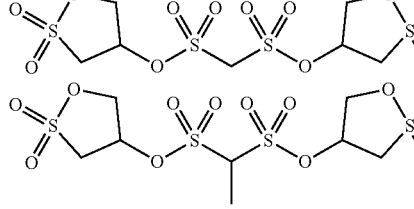

-continued

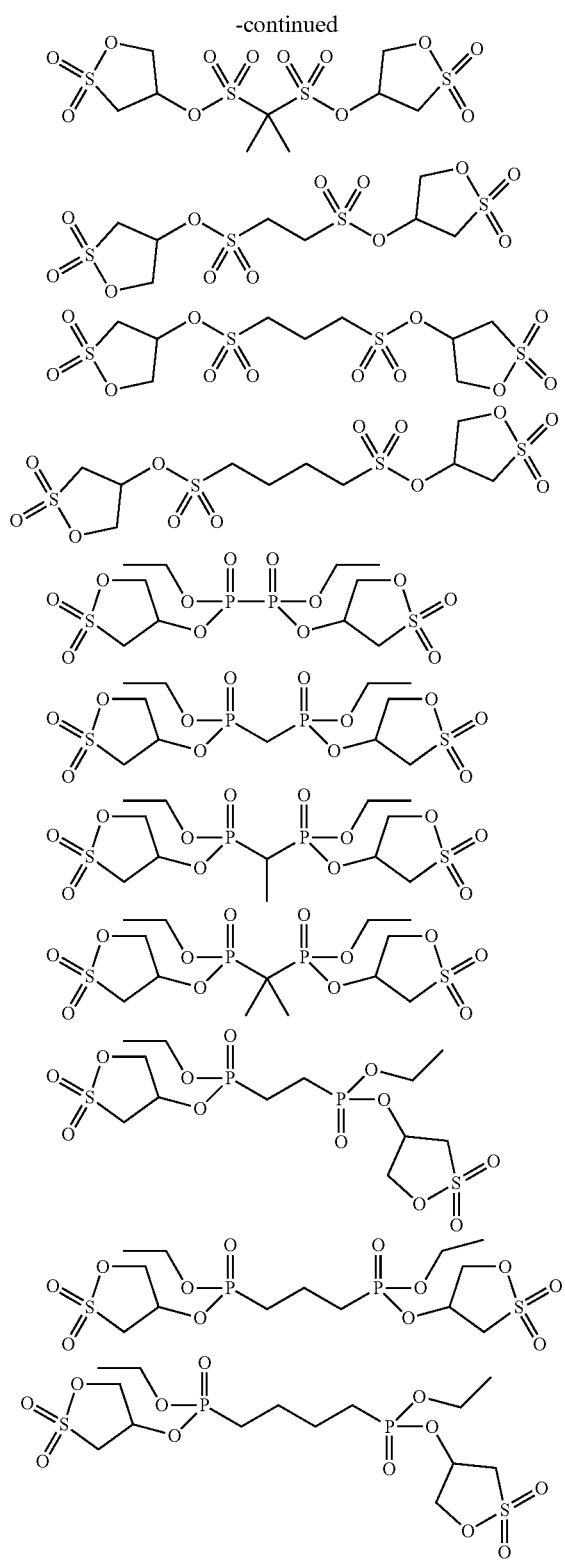

The compounds represented by Formula (1) may be used alone or in combination of two or more. The proportion of the amount of the compound represented by Formula (1) (when two or more compounds are used, the total amount thereof) to the total amount (100 mass %) of the nonaqueous electrolytic solution which is required for achieving the advantageous effects of the present invention is not limited.

The above proportion is preferably 0.001% by mass or more, is more preferably 0.01% by mass or more, is further preferably 0.1% by mass or more, and is particularly preferably 0.3% by mass or more. The above proportion is preferably 10% by mass or less, is more preferably 5% by mass or less, is further preferably 3% by mass or less, and is particularly preferably 2% by mass or less. When the above proportion falls within the above range, it becomes easy to control the improvement of the discharge capacity retention factor and the resistance characteristics relative to the initial battery, which are determined in the high-temperature cycle test, and the reductions in the generation of a gas and the continuous charge capacity, which are determined in the high-temperature continuous-charging endurance test.

When the above compound is added to a nonaqueous electrolytic solution to prepare an energy device and the battery is then disintegrated to obtain the nonaqueous electrolytic solution, the content of the compound in the nonaqueous electrolytic solution is significantly reduced in many cases. Therefore, when the compound is detected in a nonaqueous electrolytic solution drawn from the battery even in a trace amount, it is considered that the nonaqueous electrolytic solution is included in the scope of the present invention. When the compound is used as a nonaqueous electrolytic solution for preparing an energy device and the battery is then disintegrated to obtain the nonaqueous electrolytic solution, although the nonaqueous electrolytic solution includes a trace amount of the compound, the compound may be detected on the other components of the energy device, such as the positive electrode, the negative electrode, and the separator in many cases. Therefore, in the case where the compound is detected on the positive electrode, the negative electrode, and the separator, it is considered that the total amount thereof be included in the nonaqueous electrolytic solution. With the above assumption, the specific compound is preferably included such that the content thereof falls within the range described below.

1-1-3. Method for Producing Compound Represented by Formula (1)

An example of the method for producing the compound represented by Formula (1) is an esterification reaction between the compound represented by Formula (6) and the compound represented by Formula (1-a). Note that the method for producing the compound represented by Formula (1) does not affect the advantageous effects of the present invention and the production method is not limited to the following example.

[Chem. 14]

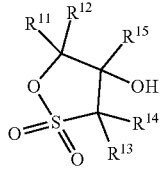

(6)

(in the above formula, $R^{11}$ to $R^{15}$ each independently represent a hydrogen atom or an alkyl group that has 1 to 3 carbon atoms and may have a substituent)

In Formula (6), $R^{11}$ to $R^{15}$ may be a hydrogen atom or any alkyl group that has 1 to 3 carbon atoms and may have a substituent. $R^{11}$ to $R^{15}$ preferably represent a hydrogen atom, an alkyl group having 1 to 3 carbon atoms and no substituent, or an alkyl group having 1 to 3 carbon atoms the H atoms of which are partially replaced with F atoms, more preferably represent a hydrogen atom or an alkyl group having 1 to 3 carbon atoms and no substituent, further preferably represent a hydrogen atom or a methyl group, and most preferably represent a hydrogen atom. It is preferable to select $R^{11}$ to $R^{15}$ from the above groups because, in such a case, the steric hindrance about the OH group, which serves as a reaction point, is small and the reaction may be readily conducted. Note that $R^{11}$ to $R^{15}$ in Formula (6) correspond to $R^1$ to $R^5$ in Formula (1), respectively, which is produced by the synthesis.

[Chem. 15]

(1-a)

(in the above formula, $R^{16}$ is an organic group that has 1 to 8 carbon atoms and may have a hetero atom;

X is a carbon atom, a sulfur atom, or a phosphorus atom;

when X is a carbon atom, l=0, m=1, and n=1, when X is a sulfur atom, l=0, m=2, and n=1, and when X is a phosphorus atom, l=0, m=1, and n=2, or l=1, m=1, and n=1;

k is an integer of 2 to 4;

Z is a halogen atom; and

Y represents an organic group that has 1 to 8 carbon atoms and may have a hetero atom, where Y may be absent and, when Y is absent, the compound has an X-X bond and k=2)

In Formula (1-a), $R^{16}$ may be any organic group that has 1 to 8 carbon atoms and may have a hetero atom. $R^{16}$ is preferably an alkyl group having no substituent or an alkyl group the H atoms of which are partially replaced with F atoms, and is more preferably an alkyl group having no substituent. It is preferable to select $R^{16}$ from the above organic groups because, in such a case, the number of reaction active sites are small and the reaction may be conducted with further efficiency. The number of carbon atoms included in $R^1$ is 1 to 8, is preferably 4 or less, and is most preferably 2 or less. It is preferable that $R^{16}$ fall within the above range because, in such a case, steric hindrance is small and the reaction may be readily conducted.

In Formula (1-a), Z may be any halogen atom. Z is preferably F, Cl, or Br and is more preferably F or Cl. It is preferable that Z be selected from the above halogens because, in such a case, the molecular weight is not increased and manufacturing loads may be reduced accordingly. From the viewpoint of the stability of the compound, Z is further preferably Cl.

In Formula (1-a), Y may be a linking group. In another case, Y may be a direct bond, that is, the compound may have an X-X bond. In the case where Y is a linking group, Y may be any organic group that has 1 to 8 carbon atoms and may have a hetero atom. Y is preferably a hydrocarbon group that has a valence of k and does not have a substituent other than an alkyl group or a hydrocarbon group that has a valence of k and does not have a substituent other than an alkyl group, the H atoms of which are partially replaced with F atoms, and is more preferably an alkylene group that does not have a substituent other than an alkyl group. When Y is selected from the above linking groups, the number of reaction active sites is small and the reaction may be conducted with further efficiency. In the case where Y in Formula (1-a) is a linking group, the number of carbon atoms included in Y is 1 or more and 8 or less and is preferably 6 or less. It is preferable that the number of carbon atoms included in Y fall within the above range because, in such a case, the negative impacts of steric hindrance may be limited and the reaction may be readily conducted.

<Esterification Reaction>

The reaction between the compound represented by Formula (6) and the compound represented by Formula (1-a) may be conducted without a solvent or in a solvent. The reaction is preferably conducted at a low temperature in a nonaqueous solvent that includes a base as a reaction accelerator.

<Esterification Reaction Solvent>

In the case where the reaction is conducted in a solvent, a nonaqueous solvent may be used. It is preferable to use a nonaqueous solvent that does not react with either the compound represented by Formula (6) or the compound represented by Formula (1-a). Examples of such a nonaqueous solvent include aliphatic hydrocarbons, such as pentane, hexane, heptane, octane, and petroleum ether; ethers, such as diethyl ether, diisopropyl ether, t-butyl methyl ether, anisole, tetrahydrofuran, dioxane, ethylene glycol dimethyl ether, and triethylene glycol dimethyl ether; halogenated-containing hydrocarbon, such as methylene chloride, chloroform, carbon tetrachloride, 1,2-dichloroethane, trichloroethane, bromopropane, chlorobenzene, and dichlorobenzene; cyano-containing hydrocarbons, such as acetonitrile, propionitrile, butyronitrile, and benzonitrile; esters, such as ethyl acetate and butyl acetate; aromatic hydrocarbons, such as benzene, toluene, and nitrobenzene; and ketones, such as acetone and methyl ethyl ketone. The above solvents may be used alone or in combination of two or more. Optionally, water may be used in an amount such that decomposition of sulfonyl chlorides does not occur. From the viewpoint of costs, aliphatic hydrocarbons, ethers, cyano-containing hydrocarbons, esters, aromatic hydrocarbons, and ketones are preferable, and aliphatic hydrocarbons, ethers, esters, aromatic hydrocarbons, and ketones are more preferable.

The amount of the solvent used is normally 1 to 50 times by weight and is preferably 1 to 20 times by weight the amount of the compound represented by Formula (1-a) used.

<Base Used for Esterification>

In the case where the base is used, examples of the base include carbonate salts, such as potassium carbonate, sodium carbonate, sodium hydrogencarbonate, and potassium hydrogencarbonate; hydroxide salts, such as sodium hydroxide, potassium hydroxide, and lithium hydroxide; inorganic salts, such as sodium hydride, potassium hydride, metal sodium, and metal potassium; metal alkoxides, such as sodium methoxide, potassium methoxide, sodium ethoxide, and sodium-t-butoxide; amines, such as triethylamine and trimethylamine; pyridines, such as pyridine and picoline; anilines, such as N,N-dimethylaniline; alkyl metal compounds, such as methyllithium, ethyllithium, propyllithium, and butyllithium; and aryl metal compounds, such as phenyllithium. The base may be selected appropriately in accordance with the type of the solvent used. From the viewpoints of solubility in the reaction solvent and ease of handling, amines, pyridines, and anilines are preferable, and amines and pyridines are more preferable.

The amount of the base used is preferably 1 to 10 equivalents and is further preferably 1 to 3 equivalents of the compound represented by Formula (6).

<Esterification Temperature>

The upper limit for the temperature at which the esterification reaction is conducted is preferably 80° C. or less, is more preferably 60° C. or less, and is further preferably 50° C. or less. Since this reaction is an exothermic reaction, setting the upper-limit temperature may reduce the occurrence of runaway reaction and suppress the pyrolysis of the resulting ester. The lower limit for the temperature at which the esterification reaction is conducted is preferably −30° C. or more, is more preferably −25° C. or more, and is further preferably −20° C. or more. Setting the lower-limit temperature may eliminate the risk of interruption or delay of the reaction.

<Esterification Time>

The amount of time during which the esterification reaction is conducted may be 30 minutes or more and is preferably 1 hour or more. Since the compound represented by Formula (1-a) has plural reaction points, if the above reaction time is short, a reaction product in which only a part of the reaction points have been reacted may be included in the resulting product. When the reaction time falls within the above range, the above issue may be readily prevented. On the other hand, the upper limit for the reaction time is not set. In order to prevent the decomposition of the resulting ester and reduction in productivity due to the extension of the reaction time, the reaction time may be set to 48 hours or less, is preferably 24 hours or less, and is more preferably 10 hours or less.

The esterification reaction may be conducted under any of normal pressure, increased pressure, and reduced pressure. The esterification reaction is preferably conducted under normal pressure from the viewpoints of productivity and safety.

The reaction apparatus used for the esterification reaction is not limited. Examples of the reaction apparatus include known metal reaction apparatuses, reaction apparatuses produced by lining the inner surfaces of known metal reaction apparatuses with glass, a resin, or the like, and reaction apparatuses made of glass or a resin. From the viewpoints of strength, safety, etc., metal reaction apparatuses and reaction apparatuses produced by lining the inner surfaces of metal reaction apparatuses with glass are preferable. The material constituting the metal reaction apparatuses may be selected from known metals, such as carbon steel, ferritic stainless steel, martensitic stainless steel, such as SUS410, austenitic stainless steel, such as SUS310, SUS304, or SUS316, clad steel, cast iron, copper, copper alloy, aluminum, Inconel, Hastelloy, and titanium.

<Reagents Used for Reaction>

Commercial reagents may be directly used as reagents for the reaction conducted in the present invention. The reagents may be produced by purifying a commercial reagent or may be produced from another compound. The purities of the reagents are not limited. Since plural reaction points are present in the reaction, it is preferable to use high-purity reagents in which the content of impurities derived from the raw materials is low. The purities of the reagents are preferably 90% by mass or more.

The compound represented by Formula (6) may be produced using a known method. Examples of the method include the method described in International Publication No. 2011/016440.

The compound represented by Formula (1-a) may be a commercial product or produced by purifying a commercial product. When a suitable commercial product is unavailable, the compound represented by Formula (1-a) may be synthesized. In the case where the compound represented by Formula (1-a) is synthesized, for example, the following method may be used.

a) Production method in which oxidative chlorination of a corresponding alkyl thiuronium salt is performed: e.g., Synlett (2013), 24(16), 2165-2169; Journal of the Chemical Society (1952), 3334-40.

b) Production method in which oxidative chlorination of a corresponding thiol is performed: e.g., Inorganica Chimica Acta (2011), 369(1), 45-48; Industrial & Engineering Chemistry Process Design and Development (1964), 3(2), 164-9.

c) Production method in which a corresponding sulfonic acid or a metal salt of the sulfonic acid is chlorinated with thionyl chloride, phosphorous pentachloride, or the like: e.g., Tetrahedron Letters (2009), 50(50), 7028-7031; Journal of Organic Chemistry (1960), 25, 399-402.

1-2. Fluorine-Containing Cyclic Carbonate, Sulfur-Containing Organic Compound, Phosphorus-Containing Organic Compound, Organic Compound Having Cyano Group, Organic Compound Having Isocyanate Group, Silicon-Containing Compound, Aromatic Compound, Cyclic Carbonate Having Unsaturated Carbon-Carbon Bond, Fluorine-Free Carboxylate Ester, Cyclic Compound Having Plural Ether Linkages, Compound Having Isocyanuric Acid Skeleton, Monofluorophosphate Salt, Difluorophosphate Salt, Borate Salt, Oxalate Salt, and Fluorosulfonate Salt The nonaqueous electrolytic solution according to the present invention may include, in addition to the compound represented by Formula (1), at least one compound (Group (II) compounds) selected from the group consisting of a fluorine-containing cyclic carbonate, a sulfur-containing organic compound, a phosphorus-containing organic compound, an organic compound having a cyano group, an organic compound having an isocyanate group, a silicon-containing compound, an aromatic compound, a cyclic carbonate having an unsaturated carbon-carbon bond, a fluorine-free carboxylate ester, a cyclic compound having plural ether linkages, a compound having an isocyanuric acid skeleton, a monofluorophosphate salt, a difluorophosphate salt, a borate salt, an oxalate salt, and a fluorosulfonate salt. This is because, when the nonaqueous electrolytic solution includes the above compounds in combination, the side reactions that may be caused by the compound represented by Formula (1) on the positive and negative electrodes can be suppressed with efficiency.

Among the above components, at least one compound selected from the group consisting of the fluorine-containing cyclic carbonate, the sulfur-containing organic compound, the phosphorus-containing organic compound, the organic compound having a cyano group, the aromatic compound, the cyclic carbonate having an unsaturated carbon-carbon bond, the fluorine-free carboxylate ester, and the cyclic compound having plural ether linkages is preferably used in order to form a quality composite coating film on the negative electrode and thereby enhance the initial battery characteristics and the characteristics of the battery that has been subjected to the endurance test in a balanced manner. At least one compound selected from the group consisting of the fluorine-containing cyclic carbonate, the organic compound having a cyano group, the aromatic compound, the cyclic carbonate having an unsaturated carbon-carbon bond, and the fluorine-free carboxylate ester is more preferably used. At least one compound selected from the group consisting of the fluorine-containing cyclic carbonate, the cyclic carbonate having an unsaturated carbon-carbon bond, and the fluorine-free carboxylate ester is further preferably used. At least one compound selected from the fluorine-containing cyclic carbonate and the cyclic carbonate having an unsaturated carbon-carbon bond is particularly preferably used. This is because, for example, the above compounds, which are capable of forming a coating film having a relatively low molecular weight on the negative electrode, forms a dense coating film on the negative electrode and thereby efficiently limits the degradation of the compound represented by Formula (1) by the side reaction. Limiting the side reaction with effect as described below makes it easy to control the improvement of the discharge capacity retention factor and the resistance characteristics relative to the initial battery, which are determined in the high-temperature cycle test and reductions in the amount of gas generated and the continuous charge capacity, which are determined in the high-temperature continuous-charging endurance test.

The method for adding the above compounds to the nonaqueous electrolytic solution according to the present invention is not limited. Examples of the method include a method in which the compounds are added directly to the electrolytic solution and a method in which the compounds are generated inside the battery or in the electrolytic solution. Examples of the method in which the above compounds are generated include a method in which a compound other than the above compounds is added and the oxidation, hydrolysis, etc. of a component of the battery such as the electrolytic solution, is performed to generate the compounds and a method in which the compounds are generated by preparing a battery and applying an electrical load, such as charging or discharging, to the battery.

When the compounds are added to the nonaqueous electrolytic solution and used to prepare an energy device and the energy device is then disintegrated to obtain the nonaqueous electrolytic solution, the content of the compounds in the nonaqueous electrolytic solution is significantly reduced in many cases. Therefore, when the compounds are detected in the nonaqueous electrolytic solution drawn from the energy device even in a trace amount, it is considered that the nonaqueous electrolytic solution is included in the scope of the present invention. When the compounds are used as a nonaqueous electrolytic solution for preparing an energy device and the energy device is then disintegrated to obtain the nonaqueous electrolytic solution, although the amount of the compounds included in the nonaqueous electrolytic solution is trace, the compounds may be detected on the other components of the energy device, such as the positive electrode, the negative electrode, and the separator, in many cases. Therefore, in the case where the compounds are detected on the above components, it is considered that the total amount thereof be included in the nonaqueous electrolytic solution. With the above assumption, the specific compounds are preferably included such that the content thereof falls within the range described below.

The Group (II) compounds are described below. Note that the descriptions of a monofluorophosphate salt, a difluorophosphate salt, a borate salt, an oxalate salt, and a fluorosulfonate salt apply also to "1-3. Electrolyte". The foregoing descriptions of the compound represented by Formula (1) and examples and preferable examples of the compound apply also to the compound represented by Formula (1) used in combination with the above compounds. When the nonaqueous electrolytic solution includes one of the above compounds, another one of the compounds may be included in the nonaqueous electrolytic solution.

1-2-1. Fluorine-Containing Cyclic Carbonate

Examples of the fluorine-containing cyclic carbonate include a compound produced by fluorination of a cyclic carbonate having an alkylene group having 2 to 6 carbon atoms and derivatives thereof, such as a compound produced by fluorination of ethylene carbonate (hereinafter, such a compound may be referred to as "fluorinated ethylene carbonate") and derivatives thereof. Examples of the derivatives of a compound produced by fluorination of ethylene carbonate include a compound produced by fluorination of ethylene carbonate which is substituted with an alkyl group (e.g., an alkyl group having 1 to 4 carbon atoms). Among the above compounds, a fluorinated ethylene carbonate having 1 to 8 fluorine atoms and derivatives thereof are preferable.

When the electrolytic solution according to the present invention includes the fluorine-containing cyclic carbonate in combination with the compound represented by Formula (1), the endurance characteristics of a battery that includes the electrolytic solution may be improved.

Examples of the fluorinated ethylene carbonate having 1 to 8 fluorine atoms and derivatives thereof include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4-(trifluoromethyl)-ethylene carbonate, and 4,5-difluoro-4,5-dimethylethylene carbonate.

Among these, monofluoroethylene carbonate, 4,4-difluoroethylene carbonate, and 4,5-difluoroethylene carbonate are preferable because they increase the ionic conductivity of the electrolytic solution and ease of formation of a stable interface protective coating film.

Only one type of fluorinated cyclic carbonate may be used alone. Two or more types of fluorinated cyclic carbonates may be used in any combination and ratio. The amount of the fluorinated cyclic carbonate (when two or more types of fluorinated cyclic carbonates are used, the total amount thereof) is preferably 0.001% by mass or more, is more preferably 0.01% by mass or more, is further preferably 0.1% by mass or more, is further more preferably 0.5% by mass or more, is particularly preferably 1% by mass or more, and is most preferably 1.2% by mass or more, relative to 100% by mass of the electrolytic solution. The amount of the fluorinated cyclic carbonate is preferably 10% by mass or less, is more preferably 7% by mass or less, is further preferably 5% by mass or less, is particularly preferably 3% by mass or less, and is most preferably 2% by mass or less, relative to 100% by mass of the electrolytic solution. In the case where the fluorinated cyclic carbonate is used as a nonaqueous solvent, the amount of the fluorinated cyclic carbonate is preferably 1% by volume or more, is more preferably 5% by volume or more, and is further preferably 10% by volume or more; and is preferably 50% by volume or less, is more preferably 35% by volume or less, and is further preferably 25% by volume or less, relative to 100% by volume of the nonaqueous solvent.

Only one type of fluorinated unsaturated cyclic carbonate may be used alone. Two or more types of fluorinated unsaturated cyclic carbonates may be used in any combination and ratio.

The mass ratio between the compound represented by Formula (1) and the fluorine-containing cyclic carbonate, that is, Compound represented by Formula (1):Fluorine-containing cyclic carbonate, may be 1:100 or more, is preferably 10:100 or more, is more preferably 20:100 or more, and is further preferably 25:100 or more; and may be 10000:100 or less, is preferably 500:100 or less, is more preferably 300:100 or less, is further preferably 100:100 or less, is particularly preferably 75:100 or less, and is most preferably 50:100 or less. When the mass ratio falls within the above range, the battery characteristics and, in particular, endurance characteristics may be markedly improved. The mechanisms are not clear; it is considered that mixing the compound represented by Formula (1) with the fluorine-containing cyclic carbonate at the above mass ratio may minimize the side reaction of the additive which occurs on the electrode.

1-2-2. Sulfur-Containing Organic Compound (Except Compound Represented by Formula (1))

The electrolytic solution according to the present invention may further include a sulfur-containing organic compound. The sulfur-containing organic compound may be any organic compound that has at least one sulfur atom in the molecule and is preferably an organic compound that has an S=O group in the molecule, such as a chain sulfonate ester, a cyclic sulfonate ester, a chain sulfate ester, a cyclic sulfate ester, a chain sulfite ester, or a cyclic sulfite ester. Note that a sulfur-containing organic compound that can be classified as a fluorosulfonate salt is not classified as 1-2-2. Sulfur-Containing Organic Compound but as a fluorosulfonate salt, which is the electrolyte described below. When the electrolytic solution according to the present invention includes the sulfur-containing organic compound in combination with the compound represented by Formula (1), the endurance characteristics of a battery that includes the electrolytic solution may be improved.

Among these, a chain sulfonate ester, a cyclic sulfonate ester, a chain sulfate ester, a cyclic sulfate ester, a chain sulfite ester, and a cyclic sulfite ester are preferable. A compound having an $S(=O)_2$ group is more preferable. A chain sulfonate ester and a cyclic sulfonate ester are further preferable. A cyclic sulfonate ester is particularly preferable.

Examples of the sulfur-containing organic compound include the following compounds.

<<Chain Sulfonate Ester>>

Examples of the chain sulfonate ester include fluorosulfonate esters, such as methyl fluorosulfonate and ethyl fluorosulfonate; methanesulfonate esters, such as methyl methanesulfonate, ethyl methanesulfonate, 2-propynyl methanesulfonate, 3-butynyl methanesulfonate, methyl 2-(methanesulfonyloxy)propionate, ethyl 2-(methanesulfonyloxy)propionate, and 2-propynyl 2-(methanesulfonyloxy)propionate; alkenyl sulfonate esters, such as methyl vinylsulfonate, ethyl vinylsulfonate, allyl vinylsulfonate, propargyl vinylsulfonate, methyl allylsulfonate, ethyl allylsulfonate, allyl allylsulfonate, and propargyl allylsulfonate; and alkyl disulfonate esters, such as 1-methoxycarbonylethyl methanedisulfonate, 1-ethoxycarbonylethyl methanedisulfonate, 1-methoxycarbonylethyl 1,2-ethanedisulfonate, 1-ethoxycarbonylethyl 1,2-ethanedisulfonate, 1-methoxycarbonylethyl 1,3-propanedisulfonate, 1-ethoxycarbonylethyl 1,3-propanedisulfonate, 1-methoxycarbonylethyl 1,4-butanedisulfonate, and 1-ethoxycarbonylethyl 1,4-butanedisulfonate.

<<Cyclic Sulfonate Ester>>

Examples of the cyclic sulfonate ester include sultone compounds, such as 1,3-propanesultone, 1-fluoro-1,3-propanesultone, 2-fluoro-1,3-propanesultone, 3-fluoro-1,3-propanesultone, 1-propene-1,3-sultone, 1-fluoro-1-propene-1,3-sultone, 2-fluoro-1-propene-1,3-sultone, 3-fluoro-1-propene-1,3-sultone, 1-methyl-1-propene-1,3-sultone, 2-methyl-1-propene-1,3-sultone, 3-methyl-1-propene-1,3-sultone, 1,4-butanesultone, and 1,5-pentanesultone; and disulfonate compounds, such as methylene methanedisulfonate and ethylene methanedisulfonate.

<<Chain Sulfate Ester>>

Examples of the chain sulfate ester include dialkyl sulfate compounds, such as dimethyl sulfate, ethylmethyl sulfate, and diethyl sulfate.

<<Cyclic Sulfate Ester>>

Examples of the cyclic sulfate ester include alkylene sulfate compounds, such as 1,2-ethylene sulfate, 1,2-propylene sulfate, and 1,3-propylene sulfate.

<<Chain Sulfite Ester>>

Examples of the chain sulfite ester include dialkyl sulfite compounds, such as dimethyl sulfite, ethylmethyl sulfite, and diethyl sulfite.

<<Cyclic Sulfite Ester>>

Examples of the cyclic sulfite ester include alkylene sulfite compounds, such as 1,2-ethylene sulfite, 1,2-propylene sulfite, and 1,3-propylene sulfite.

Among these, methyl 2-(methanesulfonyloxy)propionate, ethyl 2-(methanesulfonyloxy)propionate, 2-propynyl 2-(methanesulfonyloxy)propionate, 1-methoxycarbonylethyl 1,3-propanedisulfonate, 1-ethoxycarbonylethyl 1,3-propanedisulfonate, 1-methoxycarbonylethyl 1,4-butanedisulfonate, 1-ethoxycarbonylethyl 1,4-butanedisulfonate, 1,3-propanesultone, 1-propene-1,3-sultone, 1,4-butanesultone, 1,2-ethylene sulfate, 1,2-ethylene sulfite, methyl methanesulfonate, and ethyl methanesulfonate are preferable in order to enhance initial efficiency; 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propanesultone, 1-propene-1,3-sultone, 1,2-ethylene sulfate, and 1,2-ethylene sulfite are more preferable; and 1,3-propanesultone and 1-propene-1,3-sultone are further preferable.

Only one type of the sulfur-containing organic compound may be used alone. Two or more types of the sulfur-containing organic compounds may be used in any combination and ratio.

1-2-3. Phosphorus-Containing Organic Compound (Except Compound Represented by Formula (1))

The electrolytic solution according to the present invention may further include a phosphorus-containing organic compound. The phosphorus-containing organic compound may be any organic compound that has at least one phosphorus atom in the molecule. A battery that includes the electrolytic solution according to the present invention which includes the phosphorus-containing organic compound may have improved endurance characteristics.

The phosphorus-containing organic compound is preferably a phosphate ester, a phosphonate ester, a phosphinate ester, or a phosphite ester, is more preferably a phosphate ester or a phosphonate ester, and is further preferably a phosphonate ester.

When the electrolytic solution according to the present invention includes the phosphorus-containing organic compound in combination with the compound represented by Formula (1), the endurance characteristics of a battery that includes the electrolytic solution may be improved.

Examples of the phosphorus-containing organic compound include the following compounds.

<<Phosphate Ester>>

Examples of the phosphate ester include compounds having a vinyl group, such as dimethyl vinyl phosphate, diethyl vinyl phosphate, methyl divinyl phosphate, ethyl divinyl phosphate, and trivinyl phosphate; compounds having an allyl group, such as allyl dimethyl phosphate, allyl diethyl phosphate, diallyl methyl phosphate, diallyl ethyl phosphate, and triallyl phosphate; compounds having a propargyl group, such as propargyl dimethyl phosphate, propargyl diethyl phosphate, dipropargyl methyl phosphate, dipropargyl ethyl phosphate, and tripropargyl phosphate; compounds having a 2-acryloyloxymethyl group, such as 2-acryloyloxymethyl dimethyl phosphate, 2-acryloyloxymethyl diethyl phosphate, bis(2-acryloyloxymethyl)methyl phosphate, bis(2-acryloyloxymethyl)ethyl phosphate, and tris(2-acryloyloxymethyl) phosphate; and compounds having a 2-acryloyloxyethyl group, such as 2-acryloyloxyethyl dimethyl phosphate, 2-acryloyloxyethyl diethyl phosphate, bis(2-acryloyloxyethyl)methyl phosphate, bis(2-acryloyloxyethyl)ethyl phosphate, and tris(2-acryloyloxyethyl) phosphate.

<<Phosphonate Ester>>

Examples of the phosphonate ester include trimethyl phosphonoformate, methyl diethylphosphonoformate, triethyl phosphonoformate, ethyl dimethylphosphonoformate, methyl bis(2,2,2-trifluoroethyl) phosphonoformate, ethyl bis(2,2,2-trifluoroethyl) phosphonoformate, trimethyl phosphonoacetate, methyl diethylphosphonoacetate, triethyl phosphonoacetate, ethyl dimethylphosphonoacetate, methyl bis(2,2,2-trifluoroethyl) phosphonoacetate, ethyl bis(2,2,2-trifluoroethyl) phosphonoacetate, allyl dimethylphosphonoacetate, allyl diethylphosphonoacetate, 2-propynyl dimethylphosphonoacetate, 2-propynyl diethylphosphonoacetate, trimethyl 3-phosphonopropionate, and methyl 3-(diethylphosphono) propionate.

Among these, triallyl phosphate, tris(2-acryloyloxyethyl) phosphate, trimethyl phosphonoacetate, triethyl phosphonoacetate, 2-propynyl dimethylphosphonoacetate, and 2-propynyl diethylphosphonoacetate are preferable in order to enhance battery characteristics.

Only one type of the phosphorus-containing organic compound may be used alone. Two or more types of the phosphorus-containing organic compounds may be used in any combination and ratio.

1-2-4. Organic Compound Having Cyano Group

The electrolytic solution according to the present invention may include an organic compound having a cyano group. The organic compound having a cyano group may be any organic compound that has at least one cyano group in the molecule, is preferably the compound represented by Formula (2-4-1) or (2-4-2), and is more preferably the compound represented by Formula (2-4-2). Note that, in the case where the organic compound having a cyano group is also a cyclic compound having plural ether linkages, the organic compound having a cyano group may be classified as a cyclic compound having plural ether linkages.

1-2-4-1. Compound Represented by Formula (2-4-1)

$A^1$-CN                                    (2-4-1)

(where $A^1$ represents a hydrocarbon group having 2 to 20 carbon atoms)

The molecular weight of the compound represented by Formula (2-4-1) is not limited. The molecular weight of the compound represented by Formula (2-4-1) is preferably 55 or more, is more preferably 65 or more, and is further preferably 80 or more; and is preferably 310 or less, is more preferably 185 or less, and is further preferably 155 or less. When the above molecular weight falls within the above range, the solubility of the compound represented by Formula (2-4-1) in the nonaqueous electrolytic solution may be readily maintained and the advantageous effects of the present invention may be readily produced. The method for producing the compound represented by Formula (2-4-1) is not limited. The compound represented by Formula (2-4-1) may be produced using an appropriate method selected from known methods.

Examples of the hydrocarbon group having 2 to 20 carbon atoms in Formula (2-4-1) include an alkyl group, an alkenyl group, an alkynyl group, and an aryl group. Preferable examples thereof include alkyl groups, such as an ethyl group, an n-propyl group, an iso-propyl group, an n-butyl group, a sec-butyl group, an iso-butyl group, a tert-butyl group, an n-pentyl group, a tert-amyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group; alkenyl groups, such as a vinyl group, a 1-propenyl group, an isopropenyl group, a 1-butenyl group, and a 1-pentenyl group; alkynyl groups, such as an ethynyl group, a 1-propynyl group, a 1-butynyl group, and a 1-pentynyl group; and aryl groups, such as a phenyl group, a tolyl group, an ethylphenyl group, an n-propylphenyl group, an i-propylphenyl group, an n-butylphenyl group, a sec-butylphenyl group, an i-butylphenyl group, a tert-butylphenyl group, a trifluoromethylphenyl group, a xylyl group, a benzyl group, a phenethyl group, a methoxyphenyl group, an ethoxyphenyl group, and a trifluoromethoxyphenyl group.

Among these, a linear or branched alkyl group having 2 to 15 carbon atoms and an alkenyl group having 2 to 4 carbon atoms are more preferable, a linear or branched alkyl group having 2 to 12 carbon atoms is further preferable, and a linear or branched alkyl group having 4 to 11 carbon atoms is particularly preferable in order to increase the proportion of cyano groups in the entire molecule and markedly enhance the battery characteristics.

Examples of the compound represented by Formula (2-4-1) include propionitrile, butyronitrile, pentanenitrile, hexanenitrile, heptanenitriles, octanenitrile, pelargononitrile, decanenitrile, undecanenitrile, dodecanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, and 2-hexenenitrile.

Among these, from the viewpoints of the stability of the compound, the battery characteristics, and productivity, pentanenitrile, octanenitrile, decanenitrile, dodecanenitrile, and crotononitrile are preferable; pentanenitrile, decanenitrile, dodecanenitrile, and crotononitrile are more preferable; and pentanenitrile, decanenitrile, and crotononitrile are preferable.

1-2-4-2. Compound Represented by Formula (2-4-2)

NC-$A^2$-CN                                    (2-4-2)

(where $A^2$ is an organic group that has 1 to 10 carbon atoms and is constituted by one or more atoms selected from the group consisting of a hydrogen atom, a carbon atom, a nitrogen atom, an oxygen atom, a sulfur atom, a phosphorus atom, and a halogen atom)

Examples of the organic group that has 1 to 10 carbon atoms and is constituted by one or more atoms selected from the group consisting of a hydrogen atom, a carbon atom, a nitrogen atom, an oxygen atom, a sulfur atom, a phosphorus atom, and a halogen atom include an organic group constituted by carbon atoms and hydrogen atoms and an organic group that may include a nitrogen atom, an oxygen atom, a sulfur atom, a phosphorus atom, or a halogen atom. Examples of the organic group that may include a nitrogen atom, an oxygen atom, a sulfur atom, a phosphorus atom, or a halogen atom include an organic group formed by replacing a part of the carbon atoms included in the skeleton of a group consisting of carbon atoms and hydrogen atoms with any of the above atoms and an organic group that has a substituent consisting of any of the above atoms.

The molecular weight of the compound represented by Formula (2-4-2) is not limited. The molecular weight of the compound represented by Formula (2-4-2) is preferably 65 or more, is more preferably 80 or more, and is further preferably 90 or more; and is preferably 270 or less, is more preferably 160 or less, and is further preferably 135 or less. When the above molecular weight falls within the above range, the solubility of the compound represented by Formula (2-4-2) in the nonaqueous electrolytic solution may be readily maintained and the advantageous effects of the present invention may be readily produced. The method for producing the compound represented by Formula (2-4-2) is not limited. The compound represented by Formula (2-4-2) may be produced using an appropriate method selected from known methods.

Examples of $A^2$ included in the compound represented by Formula (2-4-2) include an alkylene group and derivatives thereof, an alkenylene group and derivatives thereof, a cycloalkylene group and derivatives thereof, an alkynylene group and derivatives thereof, a cycloalkenylene group and derivatives thereof, an arylene group and derivatives thereof, a carbonyl group and derivatives thereof, a sulfonyl group and derivatives thereof, a sulfinyl group and derivatives thereof, a phosphonyl group and derivatives thereof, a phosphinyl group and derivatives thereof, an amide group and derivatives thereof, an imide group and derivatives thereof, an ether group and derivatives thereof, a thioether group and derivatives thereof, a borinic acid group and derivatives thereof, and a borane group and derivatives thereof.

Among these, an alkylene group and derivatives thereof, an alkenylene group and derivatives thereof, a cycloalkylene group and derivatives thereof, an alkynylene group and derivatives thereof, and an arylene group and derivatives thereof are preferable in order to enhance the battery characteristics. It is more preferable that $A^2$ be an alkylene group that has 2 to 5 carbon atoms and may have a substituent.

Examples of the compound represented by Formula (2-4-2) include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile, and 3,9-bis(2-cyanoethyl)-2,4,8,10-tetraoxaspiro[5,5]undecane.

Among these, malononitrile, succinonitrile, glutaronitrile, adiponitrile, pimelonitrile, suberonitrile, azelanitrile, sebaconitrile, undecanedinitrile, dodecanedinitrile, and 3,9-bis(2-cyanoethyl)-2,4,8,10-tetraoxaspiro[5,5]undecane, and fumaronitrile are preferable in order to enhance high-temperature storage endurance characteristics. Succinonitrile, glutaronitrile, adiponitrile, pimelonitrile, suberonitrile, glutaronitrile, and 3,9-bis(2-cyanoethyl)-2,4,8,10-tetraoxaspiro[5,5]undecane are more preferable because they markedly enhance the high-temperature storage endurance characteristics and reduce the degradation caused by the side reactions that occur on the electrodes. Normally, the lower the molecular weight of a dinitrile compound, the higher the proportion of a cyano group in the molecule and the higher the viscosity of the molecule. On the other hand, the higher the molecular weight of a dinitrile compound, the higher the boiling point of the compound. Therefore, in order to enhance the work efficiency, succinonitrile, glutaronitrile, adiponitrile, and pimelonitrile are further preferable.

Only one type of the organic compound having a cyano group may be used alone. Two or more types of the organic compounds having a cyano group may be used in any combination and ratio.

1-2-5. Organic Compound Having Isocyanate Group

The electrolytic solution according to the present invention may include an organic compound having an isocyanate group. The organic compound having an isocyanate group may be any organic compound having at least one isocyanate group in the molecule. The number of the isocyanate groups per molecule is preferably 1 or more and 4 or less, is more preferably 2 or more and 3 or less, and is further preferably 2.

When the electrolytic solution according to the present invention includes the compound having an isocyanate group in combination with the compound represented by Formula (1), the endurance characteristics of a battery that includes the electrolytic solution may be improved.

Examples of the organic compound having an isocyanate group include the following compounds:

organic compounds having one isocyanate group, such as methyl isocyanate, ethyl isocyanate, propyl isocyanate, isopropyl isocyanate, and butyl isocyanate; and organic compounds having two isocyanate groups, such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,2-bis(isocyanatomethyl)cyclohexane, 1,3-bis(isocyanatomethyl)cyclohexane, 1,4-bis(isocyanatomethyl)cyclohexane, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate, and 2,4,4-trimethylhexamethylene diisocyanate.

Among these, organic compounds having two isocyanate groups, such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, 2,2,4-trimethylhexamethylene diisocyanate, and 2,4,4-trimethylhexamethylene diisocyanate, are preferable in order to enhance storage characteristics. Hexamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, 2,2,4-trimethylhexamethylene diisocyanate, and 2,4,4-trimethylhexamethylene diisocyanate are more preferable. 1,3-Bis(isocyanatomethyl)cyclohexane, dicyclohexylmethane-4,4'-diisocyanate, bicyclo[2.2.1]heptane-2,5-diylbis(methylisocyanate), and bicyclo[2.2.1]heptane-2,6-diylbis(methylisocyanate) are further preferable.

Only one type of the organic compound having an isocyanate group may be used alone. Two or more types of the organic compounds having an isocyanate group may be used in any combination and ratio.

1-2-6. Silicon-Containing Compound

The electrolytic solution according to the present invention may include a silicon-containing compound. The silicon-containing compound may be any compound having at least one silicon atom in the molecule. When the electrolytic solution according to the present invention includes the silicon-containing compound in combination with the compound represented by Formula (1), endurance characteristics may be improved.

Examples of the silicon-containing compound include the following compounds:

boric acid compounds, such as tris(trimethylsilyl) borate, tris(trimethoxysilyl) borate, tris(triethylsilyl) borate, tris(triethoxysilyl) borate, tris(dimethylvinylsilyl) borate, and tris(diethylvinylsilyl) borate; phosphoric acid compounds, such as tris(trimethylsilyl) phosphate, tris(triethylsilyl) phosphate, tris(tripropylsilyl) phosphate, tris(triphenylsilyl) phosphate, tris(trimethoxysilyl) phosphate, tris(triethoxysilyl) phosphate, tris(triphenoxysilyl) phosphate, tris(dimethylvinylsilyl) phosphate, and tris(diethylvinylsilyl) phosphate; phosphorous acid compounds, such as tris(trimethylsilyl) phosphite, tris(triethylsilyl) phosphite, tris(tripropylsilyl) phosphite, tris(triphenylsilyl) phosphite, tris(trimethoxysilyl) phosphite, tris(triethoxysilyl) phosphite, tris(triphenoxysilyl) phosphite, tris(dimethylvinylsilyl) phosphite, and tris(diethylvinylsilyl) phosphite; sulfonic acid compounds, such as trimethylsilyl methanesulfonate and trimethylsilyl tetrafluoromethanesulfonate; and disilane compounds, such as hexamethyldisilane, hexaethyldisilane, 1,1,2,2-tetramethyldisilane, 1,1,2,2-tetraethyldisilane, 1,2-diphenyltetramethyldisilane, and 1,1,2,2-tetraphenyldisilane.

Among these, tris(trimethylsilyl) borate, tris(trimethylsilyl) phosphate, tris(trimethylsilyl) phosphite, trimethylsilyl methanesulfonate, trimethylsilyl tetrafluoromethanesulfonate, hexamethyldisilane, hexaethyldisilane, 1,2-diphenyltetramethyldisilane, and 1,1,2,2-tetraphenyldisilane are preferable. Tris(trimethylsilyl) borate, tris(trimethylsilyl) phosphate, tris(trimethylsilyl) phosphite, and hexamethyldisilane are more preferable.

Only one type of the silicon-containing compound may be used alone. Two or more types of the silicon-containing compounds may be used in any combination and ratio.

1-2-7. Aromatic Compound

The electrolytic solution according to the present invention may include an aromatic compound. The aromatic compound may be any organic compound that has at least one aromatic ring in the molecule and is preferably the aromatic compound represented by Formula (2-7-1) or (2-7-2).

1-2-7-1. Aromatic Compound Represented by Formula (2-7-1)

[Chem. 16]

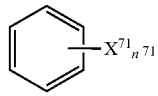

(2-7-1)

(where the substituent $X^{71}$ represents a halogen atom or an organic group that may have a halogen atom or a hetero atom. Examples of the organic group having a hetero atom include a linear, branched, or cyclic saturated hydrocarbon group having 1 to 12 carbon atoms, a group having a carboxylate ester structure, and a group having a carbonate structure. The number $n^{71}$ of the substituents $X^{71}$ is 1 to 6. When the aromatic compound has plurality substituents, the substituents may be identical to or different from one another and may form a ring)

Among these, a linear, branched, or cyclic saturated hydrocarbon group having 3 to 12 carbon atoms and a group having a carboxylate ester structure are preferable from the viewpoint of the battery characteristics.

The number $n^{71}$ of the substituents $X^{71}$ is preferably 1 to 5, is more preferably 1 to 3, is further preferably 1 or 2, and is particularly preferably 1.

$X^{71}$ represents a halogen atom or an organic group that may include a halogen atom or a hetero atom.

Examples of the halogen atom include chlorine and fluorine. The halogen atom is preferably fluorine.

Examples of the organic group that does not have a hetero atom include linear, branched, and cyclic saturated hydrocarbon groups having 3 to 12 carbon atoms. The linear or branched saturated hydrocarbon group may have a ring structure. Specific examples of the linear, branched, and cyclic saturated hydrocarbon groups having 1 to 12 carbon atoms include a methyl group, an ethyl group, a propyl group, an isopropyl group, a cyclopentyl group, and a cyclohexyl group. The number of carbon atoms is preferably 3 to 12, is more preferably 3 to 10, is further preferably 3 to 8, is further more preferably 3 to 6, and is most preferably 3 to 5.

Examples of the hetero atom constituting the organic group having a hetero atom include an oxygen atom, a sulfur atom, a phosphorus atom, and a silicon atom. Examples of an organic group having an oxygen atom include a group having a carboxylate ester structure and a group having a carbonate structure. Examples of an organic group having a sulfur atom include a group having a sulfonate ester structure. Examples of an organic group having a phosphorus atom include a group having a phosphate ester structure and a group having a phosphonate ester structure. Examples of an organic group having a silicon atom include a group having a silicon-carbon structure.

Examples of the aromatic compound represented by Formula (2-7-1) include the following compounds:

Examples of the aromatic compound represented by Formula (2-7-1) in which $X^{71}$ is a halogen atom or an organic group that may have a halogen atom include chlorobenzene, fluorobenzene, difluorobenzene, trifluorobenzene, tetrafluorobenzene, pentafluorobenzene, hexafluorobenzene, and benzotrifluoride. Fluorobenzene and hexafluorobenzene are preferable. Fluorobenzene is more preferable.

Examples of the aromatic compound represented by Formula (2-7-1) in which $X^{71}$ is a hydrocarbon group having 1 to 12 carbon atoms include 2,2-diphenylpropane, cyclopentylbenzene, cyclohexylbenzene, 1,1-diphenylcyclohexane, tert-butylbenzene, and tert-amylbenzene. Cyclohexylbenzene, tert-butylbenzene, and tert-amylbenzene are preferable.

Examples of the aromatic compound represented by Formula (2-7-1) in which $X^{71}$ is a group having a carboxylate ester structure include phenyl acetate, benzyl acetate, 2-phenylethyl acetate, methyl phenylacetate, ethyl phenylacetate, methyl 2,2-dimethyl-phenylacetate, and ethyl 2,2-dimethyl-phenylacetate. Methyl 2,2-dimethyl-phenylacetate and ethyl 2,2-dimethyl-phenylacetate are preferable.

Examples of the aromatic compound represented by Formula (2-7-1) in which $X^{71}$ is a group having a carbonate structure include diphenyl carbonate and methyl phenyl carbonate. Methyl phenyl carbonate is preferable.

1-2-7-2. Aromatic Compound Represented by Formula (2-7-2)

[Chem. 17]

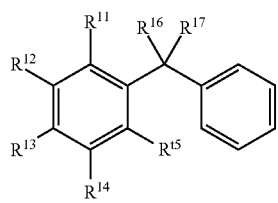

(2-7-2)

(where $R^{11}$ to $R^{15}$ each independently represent hydrogen, a halogen, or an unsubstituted or halogen-substituted hydrocarbon group having 1 to 20 carbon atoms; $R^{16}$ and $R^{17}$ each independently represent a hydrocarbon group having 1 to 12 carbon atoms; and at least two of $R^{11}$ to $R^{17}$ may be bonded to one another to form a ring. Formula (2-7-2) satisfies at least one of the following conditions (A) and (B):

(A) at least one of $R^1$ to $R^{15}$ is a halogen or an unsubstituted or halogen-substituted hydrocarbon group having 1 to 20 carbon atoms (B) the total number of carbon atoms included in $R^{11}$ to $R^{17}$ is 3 to 20)

In the case where at least two of $R^{11}$ to $R^{17}$ are bonded to one another to form a ring, it is preferable that two of $R^{11}$ to $R^{17}$ be bonded to each other to form a ring.

$R^{16}$ and $R^{17}$ each independently represent a hydrocarbon group having 1 to 12 carbon atoms (e.g., an alkyl group or an aryl group). $R^{16}$ and $R^{17}$ may be bonded to each other to form a ring (e.g., a cyclic group that is a hydrocarbon group). In order to enhance initial efficiency, solubility, and storage characteristics, it is preferable that $R^{16}$ and $R^{17}$ represent a hydrocarbon group having 1 to 12 carbon atoms or $R^{16}$ and $R^{17}$ be bonded to each other to form a cyclic group that is a hydrocarbon group. It is more preferable that $R^{16}$ and $R^{17}$ represent a methyl group or an ethyl group or $R^{16}$ and $R^{17}$ be bonded to each other to form a cyclohexyl group or a cyclopentyl group. It is further preferable that $R^{16}$ and $R^{17}$ represent a methyl group or an ethyl group or $R^{16}$ and $R^{17}$ be bonded to each other to form a cyclohexyl group.

$R^{11}$ to $R^{15}$ each independently represent hydrogen, a halogen, or an unsubstituted or halogen-substituted hydrocarbon group having 1 to 20 carbon atoms (e.g., an alkyl group, an aryl group, or an aralkyl group). Any two of $R^{11}$ to $R^{15}$ may be bonded to each other to form a ring (e.g., a cyclic group that is a hydrocarbon group). In order to enhance initial efficiency, solubility, and storage characteristics, it is preferable that $R^{11}$ to $R^{15}$ represent hydrogen, fluorine, or an unsubstituted or halogen-substituted hydrocarbon group having 1 to 12 carbon atom. It is more preferable that $R^{11}$ to $R^{15}$ represent hydrogen, fluorine, a tert-butyl group, or a 1-methyl-1-phenyl-ethyl group. It is further preferable that $R^{11}$ to $R^{15}$ represent hydrogen, a tert-butyl group, or a 1-methyl-1-phenyl-ethyl group.

One of $R^{11}$ to $R^{15}$ may be bonded to $R^{16}$ to form a ring (e.g., a cyclic group that is a hydrocarbon group). It is preferable that $R^{11}$ be bonded to $R^{16}$ to form a ring (e.g., a cyclic group that is a hydrocarbon group). In such a case, $R^{17}$ is preferably an alkyl group. Examples of the compound represented by (2-7-2) in which $R^{17}$ is a methyl group and $R^{11}$ is bonded to $R^{16}$ to form a ring include 1-phenyl-1,3,3-trimethylindan and 2,3-dihydro 1,3-dimethyl-1-(2-methyl-2-phenylpropyl)-3-phenyl-1H-indan.

Formula (2-7-2) satisfies at least one of the conditions (A) and (B):

(A) at least one of $R^{11}$ to $R^{15}$ is a halogen or an unsubstituted or halogen-substituted hydrocarbon group having 1 to 20 carbon atoms.

(B) the total number of carbon atoms included in $R^{11}$ to $R^{17}$ is 3 to 20.

Formula (2-7-2) preferably satisfies the condition (A) in order to limit the oxidation of the positive electrode which may occur within the range of normal battery operation voltage. Formula (2-7-2) preferably satisfies the condition (B) from the viewpoint of solubility in the electrolytic solution. Formula (2-7-2) may satisfy both conditions (A) and (B).

In regard to the condition (A), as long as at least one of $R^{11}$ to $R^{15}$ is a halogen or an unsubstituted or halogen-substituted hydrocarbon group having 1 to 20 carbon atoms, the others may be hydrogen atoms or may form a ring. From the viewpoint of solubility in the electrolytic solution, the number of carbon atoms included in the unsubstituted or halogen-substituted hydrocarbon group is preferably 1 to 10, is more preferably 1 to 5, is further preferably 1 to 3, is further more preferably 1 or 2, and is most preferably 1.

In regard to the condition (B), as long as the total number of carbon atoms included in R to $R^7$ is 3 to 20, at least two of $R^{11}$ to $R^{17}$ may be bonded to one another to form a ring. In the case where at least two of $R^{11}$ to $R^{17}$ are bonded to one another to form a ring, a part of the carbon atoms constituting the ring which do not correspond to $R^{11}$ to $R^{17}$ (as for $R^{11}$ to $R^{15}$, the carbon atoms constituting the benzene ring to which $R^{11}$ to $R^{15}$ are bonded and, as for $R^{15}$ and $R^{17}$, the carbon atoms at the benzylic position) are not taken into account in the calculation of the total number of carbon atoms. The total number of the carbon atoms is preferably 3 to 14 and is more preferably 3 to 10 from the viewpoint of solubility in the electrolytic solution. For example, examples of the compound represented by (2-7-2) in which $R^7$ is a methyl group and $R^{11}$ is bonded to $R^{16}$ to form a ring include 1-phenyl-1,3,3-trimethylindan and 2,3-dihydro 1,3-dimethyl-1-(2-methyl-2-phenylpropyl)-3-phenyl-1H-indan. These compounds satisfy the condition (B).

Examples of the aromatic compound represented by Formula (2-7-2) include the following compounds:

compounds represented by (2-7-2) in which $R^{16}$ and $R^{17}$ each independently represent a hydrocarbon group having 1 to 20 carbon atoms (note that the total number of carbon atoms included in $R^1$ and $R^7$ is 3 to 20) and $R^{11}$ to $R^{15}$ are hydrogen atoms (these compounds satisfy the condition (B));

[Chem. 18]

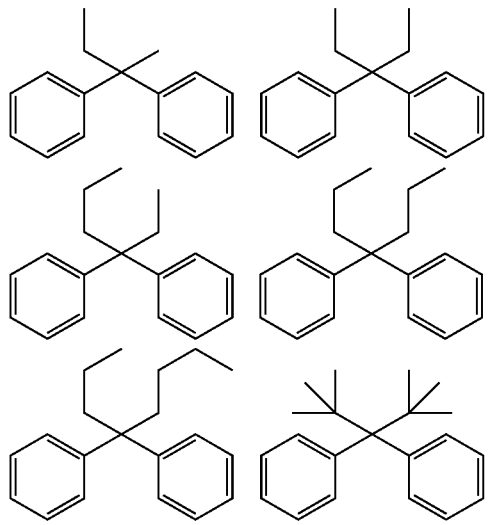

compounds represented by (2-7-2) in which $R^{16}$ and $R^{17}$ are bonded to each other to form a ring and $R^{11}$ to $R^{15}$ are hydrogen atoms (these compounds satisfy the condition (B));

[Chem. 19]

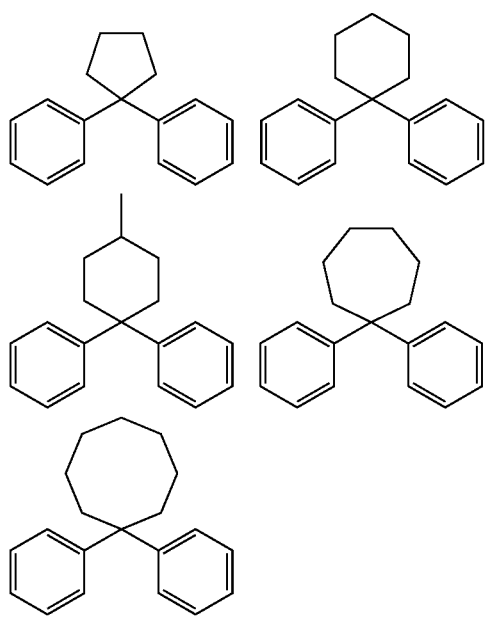

compounds represented by (2-7-2) in which at least one of $R^{11}$ to $R^{15}$ is a halogen or an unsubstituted or halogen-substituted hydrocarbon group having 1 to 20 carbon atoms (these compounds satisfy the condition (A)); and

[Chem. 20]

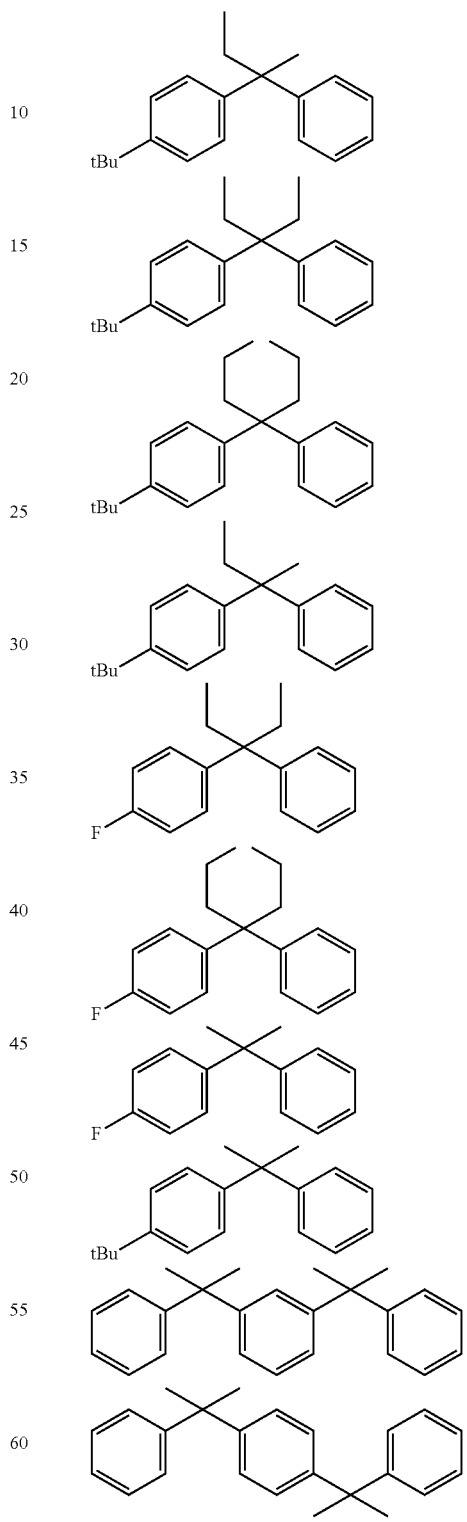

compounds represented by (2-7-2) in which $R^{17}$ is a hydrocarbon group having 1 to 20 carbon atoms (e.g., an alkyl group having 1 to 20 carbon atoms; preferably a methyl group) and R and R¹⁶ are bonded to each other to form a ring (these compounds satisfy the condition (B)).
[Chem. 21]
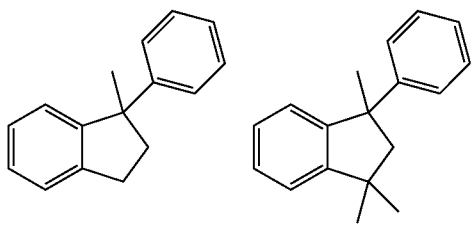
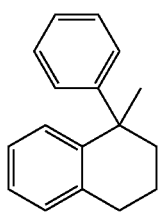
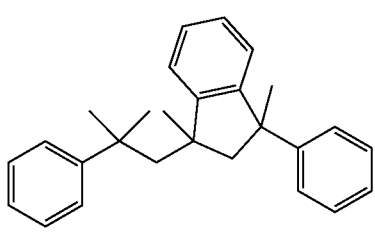
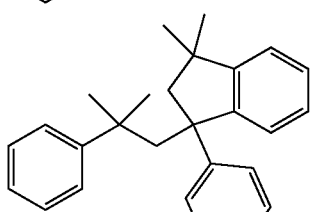
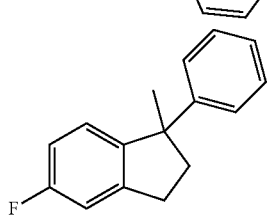
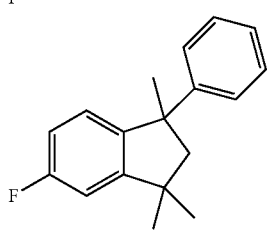 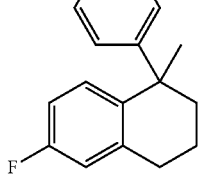
Among these, the following compounds are preferable from the viewpoint of initial reducibility on the negative electrode.
[Chem. 22]
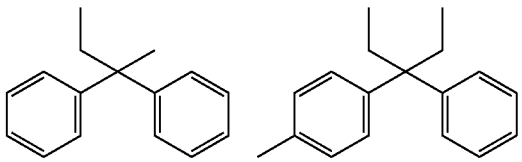
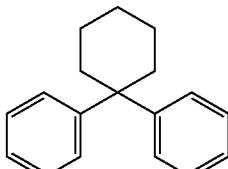
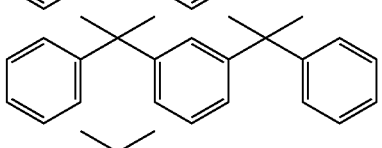
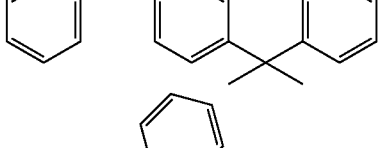
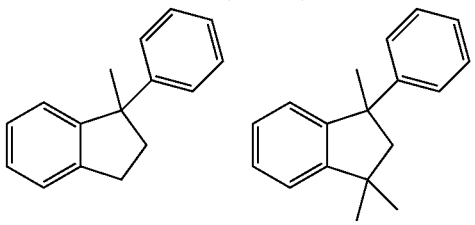
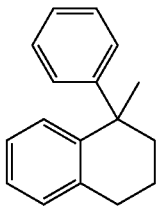
The following compounds are particularly preferable.
[Chem. 23]
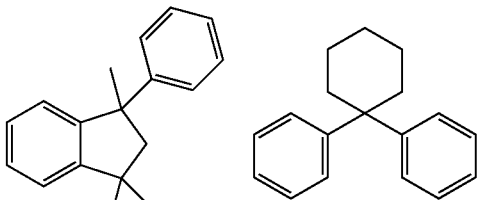
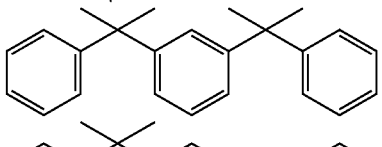
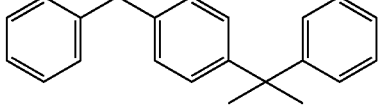
The following compound is most preferable.

[Chem. 24]

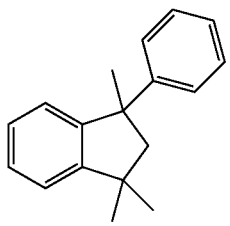

The above aromatic compounds may be used alone or in combination of two or more.

1-2-8. Cyclic Carbonate Having Unsaturated Carbon-Carbon Bond

The cyclic carbonate having an unsaturated carbon-carbon bond (hereinafter, may be referred to as "unsaturated cyclic carbonate") may be any unsaturated carbonate that is a cyclic carbonate having a carbon-carbon double bond or a carbon-carbon triple bond and is preferably a cyclic carbonate having a carbon-carbon double bond. Note that a cyclic carbonate having an aromatic ring is classified as an unsaturated cyclic carbonate.

Examples of the unsaturated cyclic carbonate include vinylene carbonates; ethylene carbonates including a substituent having an aromatic ring, a carbon-carbon double bond, or a carbon-carbon triple bond; phenyl carbonates; vinyl carbonates; allyl carbonates; and catechol carbonates.

Examples of the vinylene carbonates include vinylene carbonate, methyl vinylene carbonate, 4,5-dimethyl vinylene carbonate, phenyl vinylene carbonate, 4,5-diphenyl vinylene carbonate, vinyl vinylene carbonate, 4,5-divinyl vinylene carbonate, allyl vinylene carbonate, 4,5-diallyl vinylene carbonate, 4-fluorovinylene carbonate, 4-fluoro-5-methyl vinylene carbonate, 4-fluoro-5-phenyl vinylene carbonate, 4-fluoro-5-vinyl vinylene carbonate, and 4-allyl-5-fluorovinylene carbonate.

Specific examples of the ethylene carbonates including a substituent having an aromatic ring, a carbon-carbon double bond, or a carbon-carbon triple bond include vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, and 4-methyl-5-allylethylene carbonate.

Among these, examples of unsaturated cyclic carbonates that are particularly preferably used in combination include vinylene carbonate, methyl vinylene carbonate, 4,5-dimethyl vinylene carbonate, vinyl vinylene carbonate, 4,5-vinyl vinylene carbonate, allyl vinylene carbonate, 4,5-diallyl vinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate. Vinylene carbonate, vinylethylene carbonate, and ethynylethylene carbonate are preferable because they are capable of forming a further stable interface protective coating film.

Vinylene carbonate and vinylethylene carbonate are more preferable. Vinylene carbonate is further preferable.

The method for producing the unsaturated cyclic carbonate is not limited. The unsaturated cyclic carbonate may be produced using an appropriate method selected from known methods.

Only one type of the unsaturated cyclic carbonate may be used alone. Two or more types of the unsaturated cyclic carbonates may be used in any combination and ratio. The amount of the unsaturated cyclic carbonate used is not limited and may be set such that the advantageous effects of the present invention are impaired significantly. The amount of the unsaturated cyclic carbonate used may be 0.001% by mass or more, is preferably 0.01% by mass or more, is more preferably 0.1% by mass or more, and is further preferably 0.5% by mass or more; and may be 10% by mass or less, is preferably 5% by mass or less, is more preferably 4% by mass or less, is further preferably 3% by mass or less, and is particularly preferably 2% by mass or less relative to 100% by mass of the nonaqueous electrolytic solution. When the content of the unsaturated cyclic carbonate falls within the above range, the cycle characteristics of the nonaqueous electrolytic solution secondary battery may be readily enhanced to a sufficient degree. Furthermore, the degradation of high-temperature storage characteristics, an increase in the amount of the gas generated, and a reduction in discharge capacity retention factor may be readily prevented.

The mass ratio between the compound represented by Formula (1) and the cyclic carbonate having an unsaturated carbon-carbon bond (when two or more types of the cyclic carbonates are used, the total amount thereof), that is, Compound represented by Formula (1): Cyclic carbonate having unsaturated carbon-carbon bond, may be 1:100 or more, is preferably 10:100 or more, is more preferably 20:100 or more, and is further preferably 25:100 or more; and may be 10000:100 or less, is preferably 500:100 or less, is more preferably 300:100 or less, is further preferably 100:100 or less, is particularly preferably 75:100 or less, and is most preferably 50:100 or less. When the above mass ratio falls within the above range, the battery characteristics and, in particular, endurance characteristics may be markedly enhanced. The mechanisms are not clear; it is considered that mixing the compound represented by Formula (1) with the above cyclic carbonate at the above mass ratio minimizes the side reactions of the additives which occur on the electrodes.

1-2-9. Fluorine-Free Carboxylate Ester

The electrolytic solution according to the present invention may include a fluorine-free carboxylate ester. When the electrolytic solution according to the present invention includes the fluorine-free carboxylate ester in combination with the compound represented by Formula (1), endurance characteristics may be improved. The fluorine-free carboxylate ester may be any carboxylate ester that does not have any fluorine atom in the molecule, is preferably a fluorine-free chain carboxylate ester, and is more preferably a fluorine-free saturated chain carboxylate ester. The total number of carbon atoms included in the fluorine-free chain carboxylate ester is preferably 3 or more, is more preferably 4 or more, and is further preferably 5 or more; and is preferably 7 or less, is more preferably 6 or less, and is further preferably 5 or less.

Examples of the fluorine-free chain carboxylate ester include the following compounds:
saturated chain carboxylate esters, such as methyl acetate, ethyl acetate, n-propyl acetate, methyl propionate, ethyl propionate, n-propyl propionate, methyl isobutyrate, ethyl isobutyrate, n-propyl isobutyrate, methyl pivalate, ethyl pivalate, and n-propyl pivalate; and unsaturated chain carboxylate esters, such as methyl acrylate, ethyl acrylate, n-propyl acrylate, methyl methacrylate, ethyl methacrylate, and n-propyl methacrylate.

Among these, methyl acetate, ethyl acetate, n-propyl acetate, methyl propionate, ethyl propionate, n-propyl propionate, methyl pivalate, ethyl pivalate, and n-propyl pivalate are preferable in order to reduce the side reaction that occurs on the negative electrode. Methyl acetate, ethyl acetate, n-propyl acetate, methyl propionate, ethyl propionate, and n-propyl propionate are more preferable in order to reduce the viscosity of the electrolytic solution and thereby increase ionic conductivity. Methyl acetate, methyl propionate, ethyl propionate, and n-propyl propionate are further preferable. Methyl acetate, ethyl propionate, and n-propyl propionate are particularly preferable.

Only one type of the fluorine-free carboxylate ester may be used alone. Two or more types of the fluorine-free carboxylate esters may be used in any combination and ratio.

The amount of the fluorine-free carboxylate ester (when two or more types of the fluorine-free carboxylate esters are used, the total amount thereof) used may be 0.001% by mass or more, is preferably 0.01% by mass or more, is more preferably 0.1% by mass or more, is further preferably 0.3% by mass or more, and is particularly preferably 0.6% by mass or more; and may be 10% by mass or less, is preferably 5% by mass or less, is more preferably 3% by mass or less, is further preferably 2% by mass or less, and is particularly preferably 1% by mass or less relative to 100% by mass of the electrolytic solution. In the case where the fluorine-free carboxylate ester is used as a nonaqueous solvent, the amount of the fluorine-free carboxylate ester used is preferably 1% by volume or more, is more preferably 5% by volume or more, is further preferably 10% by volume or more, and is further more preferably 20% by volume or more; and may be 50% by volume or less, is more preferably 45% by volume or less, and is further preferably 40% by volume or less relative to 100% by mass of the nonaqueous solvent. When the content of the fluorine-free carboxylate ester falls within the above range, an increase in the resistance of the negative electrode may be limited and output characteristics, rate characteristics, low-temperature characteristics, cycle characteristics, and high-temperature storage characteristics may be readily controlled.

The mass ratio between the compound represented by Formula (1) and the fluorine-free carboxylate ester, that is, Compound represented by Formula (1):Fluorine-free carboxylate ester, may be 1:100 or more, is preferably 10:100 or more, is more preferably 20:100 or more, and is further preferably 25:100 or more; and may be 10000:100 or less, is preferably 500:100 or less, is more preferably 300:100 or less, is further preferably 100:100 or less, is particularly preferably 75:100 or less, and is most preferably 50:100 or less. When the above mass ratio falls within the above range, the battery characteristics and, in particular, endurance characteristics may be markedly enhanced. The mechanisms are not clear; it is considered that mixing the compound represented by Formula (1) with the above fluorine-free carboxylate ester at the above mass ratio minimizes the side reactions of the additives which occur on the electrodes.

1-2-10. Cyclic Compound Having Plural Ether Linkages

The cyclic compound having plural ether linkages may be any cyclic compound having plural ether linkages in the molecule and is preferably the compound represented by Formula (2-10). The cyclic compound having plural ether linkages may enhance the high-temperature storage characteristics of the battery. When the electrolytic solution according to the present invention includes the cyclic compound having plural ether linkages in combination with the compound represented by Formula (1), the endurance characteristics of a battery that includes the electrolytic solution may be improved.

[Chem. 25]

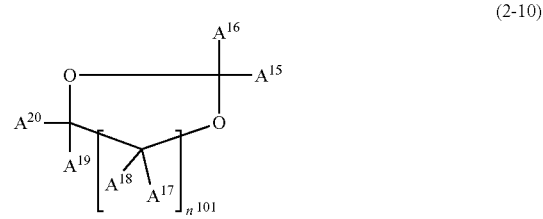

(2-10)

(where $A^{15}$ to $A^{20}$ each independently represent a hydrogen atom, a fluorine atom, or a hydrocarbon group that has 1 to 5 carbon atoms and may have a substituent; $n^{101}$ is an integer of 1 to 4; and when $n^{10}$ is an integer of 2 or more, the plural $A^{17}$ or $A^{18}$ groups may be identical to or different from one another)

Any two of $A^{15}$ to $A^{20}$ may be bonded to each other to form a ring. In such a case, it is preferable that $A^{17}$ and $A^{18}$ form a ring structure. The total number of carbon atoms included in $A^1$ to $A^{20}$ is preferably 0 to 8, is more preferably 0 to 4, is further preferably 0 to 2, and is particularly preferably 0 or 1.

Examples of the substituent include a halogen atom; an alkyl group, an alkenyl group, an alkynyl group, an aryl group, and an alkoxy group that may be substituted with a fluorine atom; and a cyano group, an isocyanato group, an ether group, a carbonate group, a carbonyl group, a carboxyl group, an alkoxycarbonyl group, an acyloxy group, a sulfonyl group, a phosphanetriyl group, and a phosphoryl group. Among these, a halogen atom and an alkoxy group; an alkyl group, an alkenyl group, and an alkynyl group that may be substituted with a fluorine atom; and an isocyanato group, a cyano group, an ether group, a carbonyl group, an alkoxycarbonyl group, and an acyloxy group are preferable. An alkyl group that is not substituted with a fluorine atom, a cyano group, and an ether group are more preferable.

In Formula (2-10), $n^{101}$ is preferably an integer of 1 to 3 and is more preferably an integer of 1 or 2. $n^{101}$ is further preferably 2.

Examples of the hydrocarbon group having 1 to 5 carbon atoms represented by $A^{15}$ to $A^{20}$ include monovalent hydrocarbon groups, such as an alkyl group, an alkenyl group, an alkynyl group, and an aryl group; and divalent hydrocarbon groups, such as an alkylene group, an alkenylene group, an alkynylene group, and an arylene group. Among these, an alkyl group and an alkylene group are preferable, and an alkyl group is more preferable. Specific examples thereof include alkyl groups having 1 to 5 carbon atoms, such as a methyl group, an ethyl group, an n-propyl group, an i-propyl group, an n-butyl group, a sec-butyl group, an i-butyl group, a tert-butyl group, an n-pentyl group, an isopentyl group, a sec-pentyl group, an neopentyl group, a 1-methylbutyl group, a 2-methylbutyl group, a 1,1-dimethylpropyl group, and a 1,2-dimethylpropyl group; alkenyl groups having 2 to 5 carbon atoms, such as a vinyl group, a 1-propenyl group, a 2-propenyl group, an isopropenyl group, a 1-butenyl group, a 2-butenyl group, a 3-butenyl group, a 1-pentenyl group, a 2-pentenyl group, a 3-pentenyl group, and a 4-pentenyl group; alkynyl groups having 2 to 5 carbon atoms, such as an ethynyl group, a 1-propynyl group, a 2-propynyl group, a 1-butynyl group, a 2-butynyl group, a 3-butynyl group, a 1-pentynyl group, a 2-pentynyl group, a 3-pentynyl group, and a 4-pentynyl group; alkylene groups having 1 to 5 carbon atoms, such as a methylene group, an ethylene group, a trimethylene group, a tetramethylene group, and a pentamethylene group; alkenylene groups having 2 to 5 carbon atoms, such as a vinylene group, a 1-propenylene group, a 2-propenylene group, a 1-butenylene group, a 2-butenylene group, a 1-pentenylene group, and a 2-pentenylene group; and alkynylene groups having 2 to 5 carbon atoms, such as an ethynylene group, a propynylene group, a 1-butynylene group, a 2-butynylene group, a 1-pentynylene group, and a 2-pentynylene group. Among these, alkylene groups having 1 to 5 carbon atoms, such as a methylene group, an ethylene group, a trimethylene group, a tetramethylene group, and a pentamethylene group, are preferable. Alkylene groups having 2 to 5 carbon atoms, such as an ethylene group, a trimethylene group, a tetramethylene group, and a pentamethylene group, are more preferable. Alkylene groups having 3 to 5 carbon atoms, such as a trimethylene group, a tetramethylene group, and a pentamethylene group, are further preferable.

The hydrogen atom, the fluorine atom, and the hydrocarbon group having 1 to 5 carbon atoms represented by $A^{15}$ to $A^{20}$ are a hydrogen atom, a fluorine atom, and a group consisting of the above-described substituent and the above-described hydrocarbon group having 1 to 5 carbon atoms. $A^{15}$ to $A^{20}$ preferably represent a hydrogen atom, a hydrocarbon group that has 1 to 5 carbon atoms and no substituent, or an alkylene group having an ether structure formed by replacing a part of the carbon chain of an alkylene group with an ether group and more preferably represent a hydrogen atom.

Examples of the cyclic compound having plural ether linkages include the following compounds.

[Chem. 26]

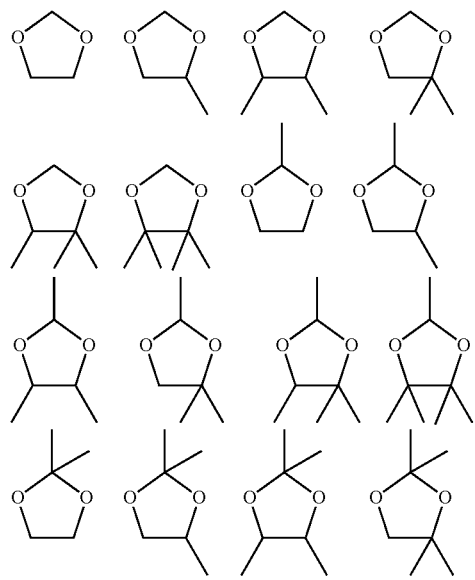
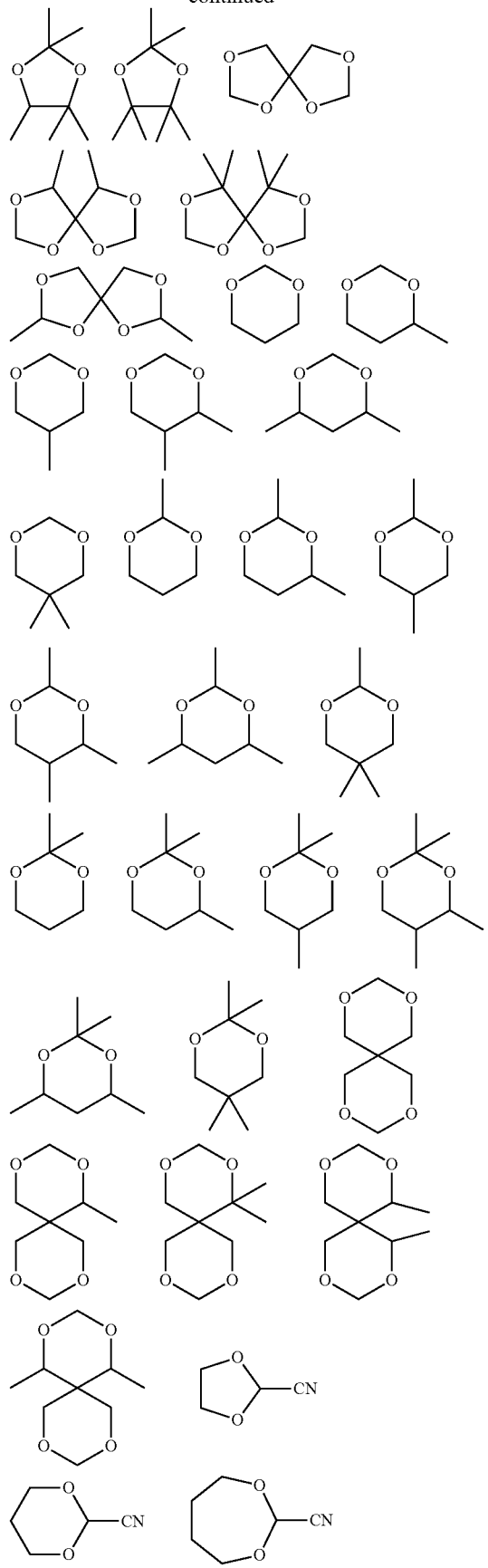

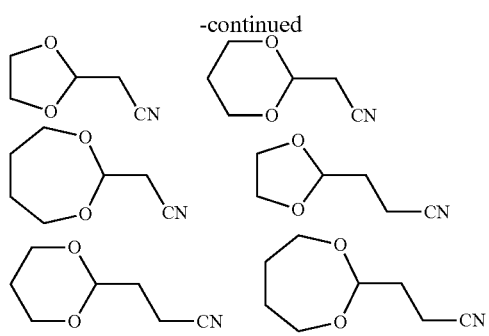

Among these, the following compounds are preferable.

[Chem. 27]

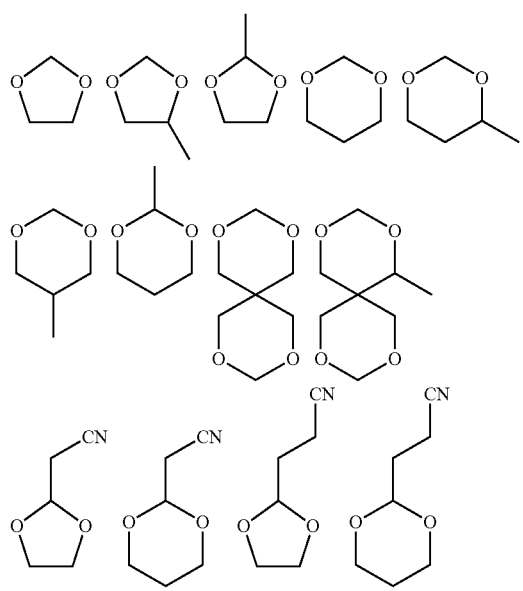

The following compounds are more preferable.

[Chem. 28]

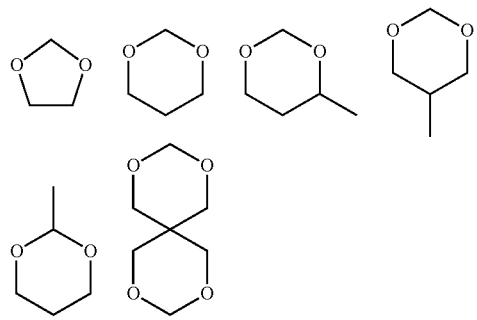

Only one type of the cyclic compound having plural ether linkages may be used alone. Two or more types of the cyclic compounds having plural ether linkages may be used in any combination and ratio.

1-2-11. Compound Having Isocyanuric Acid Skeleton

The electrolytic solution according to the present invention may further include a compound having an isocyanuric acid skeleton. The compound having an isocyanuric acid skeleton may be any organic compound that has at least one isocyanuric acid skeleton in the molecule. A battery that includes the electrolytic solution according to the present invention which includes the compound having an isocyanuric acid skeleton may have improved endurance characteristics.

Examples of the compound having an isocyanuric acid skeleton include compounds having the following structures.

[Chem. 29]

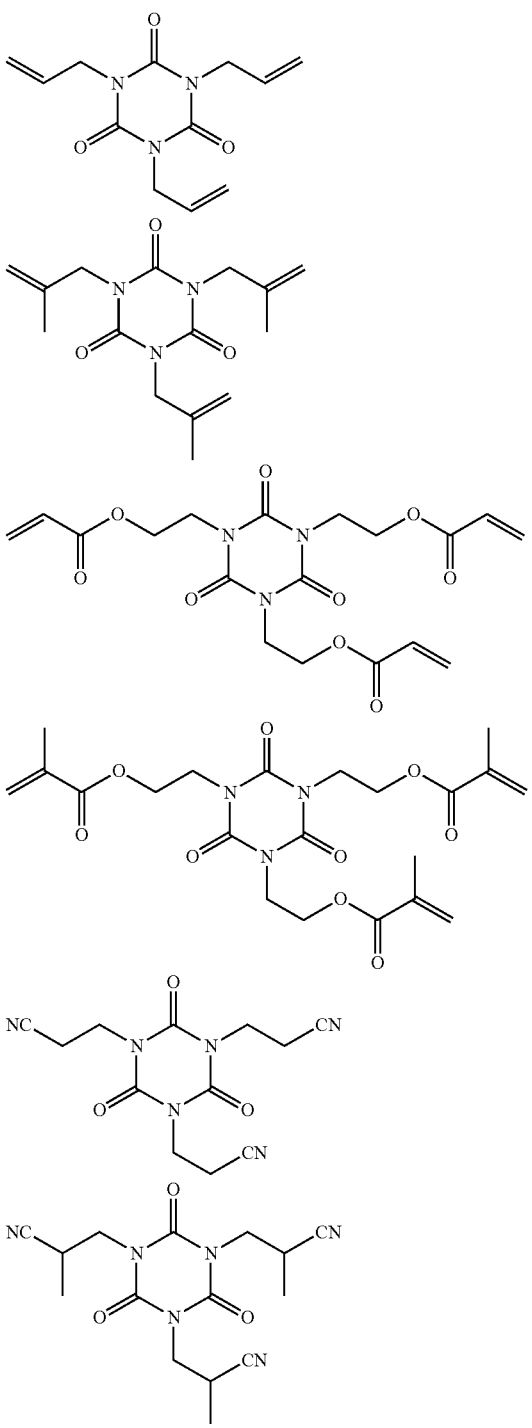

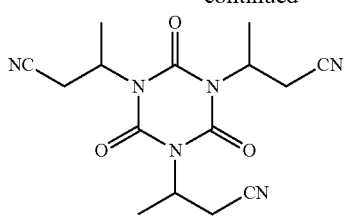

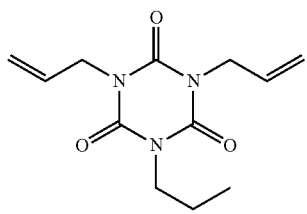

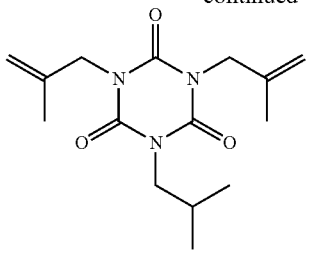

Compounds having the following structures are preferable.

[Chem. 30]

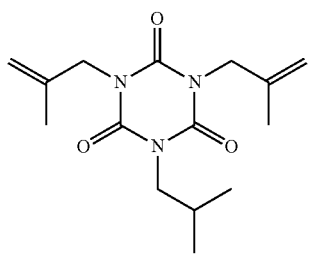

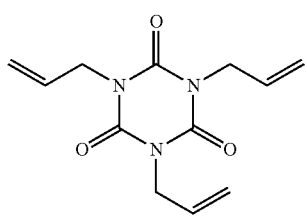

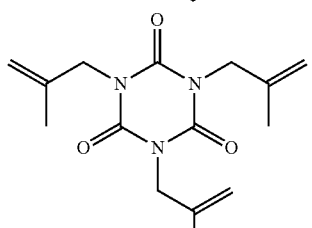

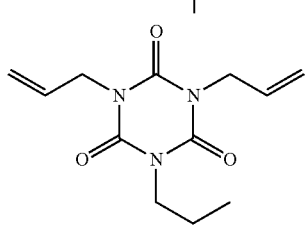

Among the preferable compounds, a compound having the following structure is preferable from the viewpoint of the capability of forming a coating film on the negative electrode.

[Chem. 31]

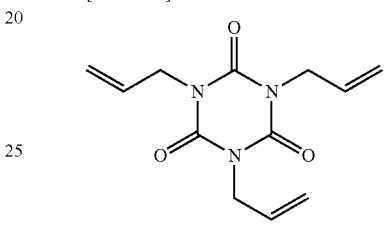

Only one type of the compound having an isocyanuric acid skeleton may be used alone. Two or more types of the compounds having an isocyanuric acid skeleton may be used in any combination and ratio.

1-2-12. Monofluorophosphate Salt and Difluorophosphate Salt

The electrolytic solution according to the present invention may further include a monofluorophosphate salt and a difluorophosphate salt. The monofluorophosphate salt may be any salt having at least one monofluorophosphoric acid structure in the molecule. The difluorophosphate salt may be any salt having at least one difluorophosphoric acid structure in the molecule. When the electrolytic solution according to the present invention includes one or more salts selected from the monofluorophosphate salt and the difluorophosphate salt in combination with the compound represented by Formula (1), the endurance characteristics of a battery that includes the electrolytic solution may be improved.

The countercation for the monofluorophosphate salt and the difluorophosphate salt is not limited. Examples of the countercation include lithium, sodium, potassium, magnesium, calcium, and ammonium represented by $NR^{121}R^{122}R^{123}R^{124}$ (where $R^{121}$ to $R^{124}$ each independently represent a hydrogen atom or an organic group having 1 to 12 carbon atoms). The organic group included in the ammonium which has 1 to 12 carbon atoms and is represented by $R^{121}$ to $R^{124}$ is not limited. Examples of the organic group include an alkyl group that may be substituted with a fluorine atom, a cycloalkyl group that may be substituted with a halogen atom or an alkyl group, an aryl group that may be substituted with a halogen atom or an alkyl group, and a nitrogen atom-containing heterocyclic group that may have a substituent. Among these, $R^{121}$ to $R^{124}$ preferably each independently represent a hydrogen atom, an alkyl group, a cycloalkyl group, or a nitrogen atom-containing heterocyclic group. The countercation is preferably lithium, sodium, or potassium. Among these, lithium is preferable.

Examples of the monofluorophosphate salt and the difluorophosphate salt include lithium monofluorophosphate, sodium monofluorophosphate, potassium monofluorophosphate, lithium difluorophosphate, sodium difluorophosphate, and potassium difluorophosphate. Lithium monofluorophosphate and lithium difluorophosphate are preferable. Lithium difluorophosphate is more preferable.

Only one type of the monofluorophosphate salt or the difluorophosphate salt may be used alone. Two or more types of the monofluorophosphate salts and the difluorophosphate salts may be used in any combination and ratio.

The amount of one or more salts selected from the monofluorophosphate salt and the difluorophosphate salt used (when two or more types of the monofluorophosphate salts and the difluorophosphate salts are used, the total amount thereof) may be 0.001% by mass or more, is preferably 0.01% by mass or more, is more preferably 0.1% by mass or more, is further preferably 0.2% by mass or more, and is particularly preferably 0.3% by mass or more; and may be 5% by mass or less, is preferably 3% by mass or less, is more preferably 2% by mass or less, is further preferably 1.5% by mass or less, and is particularly preferably 1% by mass or less. When the above content falls within the above range, initial irreversible capacity may be markedly increased.

The mass ratio between the compound represented by Formula (1) and one or more salts selected from the monofluorophosphate salt and the difluorophosphate salt (when two or more types of the monofluorophosphate salts and the difluorophosphate salts are used, the total amount thereof), that is, Compound represented by Formula (1): Monofluorophosphate salt and Difluorophosphate salt, is preferably 1:99 to 99:1, is more preferably 10:90 to 90:10, and is particularly preferably 20:80 to 80:20. When the above mass ratio falls within the above range, the intended characteristics of the battery may be enhanced without degrading the other battery characteristics.

1-2-13. Borate Salt

The electrolytic solution according to the present invention may further include a borate salt. The borate salt may be any salt that has at least one boron atom in the molecule. Note that a borate salt that can be classified as an oxalate salt is classified not as "1-2-13. Borate Salt" but as "1-2-14. Oxalate Salt" below. When the electrolytic solution according to the present invention includes the borate salt in combination with the compound represented by Formula (1), the endurance characteristics of a battery that includes the electrolytic solution may be improved.

Examples of the countercation for the borate salt include lithium, sodium, potassium, magnesium, calcium, rubidium, cesium, and barium. Among these, lithium is preferable.

As a borate salt, a lithium salt is preferably used and a lithium salt containing boric acid may also be suitably used. Examples thereof include $LiBF_4$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$. Among these, $LiBF_4$ is more preferable because it may enhance initial charge-discharge efficiency, high-temperature cycle characteristics, etc.

Only one type of the borate salt may be used alone. Two or more types of the borate salts may be used in any combination and ratio.

The content of the borate salt used (when two or more types of the borate salts are used, the total content thereof) may be 0.05% by mass or more, is preferably 0.1% by mass or more, is more preferably 0.2% by mass or more, is further preferably 0.3% by mass or more, and is particularly preferably 0.4% by mass or more; and may be 10.0% by mass or less, is preferably 5.0% by mass or less, is more preferably 3.0% by mass or less, is further preferably 2.0% by mass or less, and is particularly preferably 1.0% by mass or less. When the content of the borate salt used falls within the above range, the occurrence of the side reaction on the negative electrode of the battery may be reduced and an increase in resistance may be limited.

The mass ratio between the compound represented by Formula (1) and the borate salt, that is, Compound represented by Formula (1) (when two or more types of the compounds are used, the total amount thereof):Borate salt, is preferably 1:99 to 99:1, is more preferably 10:90 to 90:10, and is particularly preferably 20:80 to 80:20. When the above mass ratio falls within the above range, the occurrence of the side reactions on the positive and negative electrodes of the battery may be reduced and an increase in resistance may be limited.

In the case where the borate salt and $LiPF_6$ are used as electrolytes, the ratio of the molar content of the borate salt in the nonaqueous electrolytic solution to the molar content of $LiPF_6$ in the nonaqueous electrolytic solution is preferably 0.001 or more and 12 or less, is more preferably 0.01 to 1.1, is further preferably 0.01 to 1.0, and is more preferably 0.01 to 0.7. When the above ratio falls within the above range, the occurrence of the side reactions on the positive and negative electrodes of the battery may be reduced and the charge-discharge efficiency of the battery may be increased.

1-2-14. Oxalate Salt

The electrolytic solution according to the present invention may further include an oxalate salt. The oxalate salt may be any compound having at least one oxalic acid structure in the molecule. When the electrolytic solution according to the present invention includes the oxalate salt in combination with the compound represented by Formula (1), the endurance characteristics of a battery that includes the electrolytic solution may be improved.

The oxalate salt is preferably the metal salt represented by Formula (2-14-1). This salt is a salt that includes an oxalato complex as an anion.

[Chem. 32]

$$M^1{}_a[M^2(C_2O_4)_b R_c^{91}]_d \qquad (2\text{-}14\text{-}1)$$

(where $M^1$ is an element selected from the group consisting of Groups 1 and 2 of the Periodic Table and aluminum (Al);

$M^2$ is an element selected from the group consisting of transition metals and Groups 13, 14, and 15 of the Periodic Table;

$R^{91}$ is a group selected from the group consisting of a halogen, an alkyl group having 1 to 11 carbon atoms, and a halogen-substituted alkyl group having 1 to 11 carbon atoms;

a and b are positive integers;

c is 0 or a positive integer; and d is an integer of 1 to 3)

$M^1$ is preferably lithium, sodium, potassium, magnesium, or calcium and is particularly preferably lithium from the viewpoint of the characteristics of the lithium secondary battery that includes the electrolytic solution according to the present invention.

$M^2$ is particularly preferably boron or phosphorus from the viewpoint of the electrochemical stability produced when added to a lithium secondary battery.

Examples of $R^{91}$ include fluorine, chlorine, a methyl group, a trifluoromethyl group, an ethyl group, a pentafluoroethyl group, a propyl group, an isopropyl group, a butyl group, a sec-butyl group, and a tert-butyl group. Fluorine and a trifluoromethyl group are preferable.

Examples of the metal salt represented by Formula (2-14-1) include the following compounds:

lithium oxalatoborate salts, such as lithium difluorooxalatoborate and lithium bis(oxalato)borate; and lithium oxalatophosphate salts, such as lithium tetrafluorooxalatophosphate, lithium difluorobis(oxalato)phosphate, and lithium tris(oxalato)phosphate; among these, lithium bis(oxalato)borate and lithium difluorobis(oxalato)phosphate are preferable, and lithium bis(oxalato) borate is more preferable.

Only one type of the oxalate salt may be used alone. Two or more types of the oxalate salts may be used in any combination and ratio.

1-2-15. Fluorosulfonate Salt

The electrolytic solution according to the present invention may further include a fluorosulfonate salt. The fluorosulfonate salt may be any salt having at least one fluorosulfonic acid structure in the molecule. When the electrolytic solution according to the present invention includes the fluorosulfonate salt in combination with the compound represented by Formula (1), the endurance characteristics of a battery that includes the electrolytic solution may be improved.

The countercation for the fluorosulfonate salt is not limited. Examples of the countercation include lithium, sodium, potassium, rubidium, cesium, magnesium, calcium, barium, and ammonium represented by $NR^{121}R^{122}R^{123}R^{124}$ (where $R^{121}$ to $R^{124}$ each independently represent a hydrogen atom or an organic group having 1 to 12 carbon atoms). Examples and preferable examples of $R^{121}$ to $R^{124}$ are the same as those described in Section 1-2-12 above. The countercation is preferably lithium, sodium, or potassium. Among these, lithium is preferable.

Examples of the fluorosulfonate salt include lithium fluorosulfonate, sodium fluorosulfonate, potassium fluorosulfonate, rubidium fluorosulfonate, and cesium fluorosulfonate. Lithium fluorosulfonate is preferable. Imide salts having a fluorosulfonic acid structure, such as lithium bis(fluorosulfonyl)imide, may also be used as a fluorosulfonate salt.

Only one type of the fluorosulfonate salt may be used alone. Two or more types of the fluorosulfonate salts may be used in any combination and ratio.

The content of the fluorosulfonate salt (when two or more fluorosulfonate salts are used, the total content thereof) may be 0.05% by mass or more, is preferably 0.1% by mass or more, is more preferably 0.2% by mass or more, is further preferably 0.3% by mass or more, and is particularly preferably 0.4% by mass or more; and may be 10% by mass or less, is preferably 8% by mass or less, is more preferably 5% by mass or less, is further preferably 2% by mass or less, and is particularly preferably 1% by mass or less. When the content of the fluorosulfonate salt used falls within the above range, the occurrence of the side reactions in the battery may be reduced and an increase in resistance may be limited.

The mass ratio between the compound represented by Formula (1) and the fluorosulfonate salt, that is, Compound represented by Formula (1): Fluorosulfonate salt, is preferably 1:99 to 99:1, is more preferably 10:90 to 90:10, and is particularly preferably 20:80 to 80:20. When the above mass ratio falls within the above range, the occurrence of the side reactions in the battery may be reduced in an appropriate manner and the degradation of high-temperature endurance characteristics may be limited.

1-3. Electrolyte

The nonaqueous electrolytic solution according to the present invention preferably further include an electrolyte. The electrolyte that can be used in the present invention is not limited; known electrolytes may be used. The salts described in "1-2-12. Monofluorophosphate Salt and Difluorophosphate Salt", "1-2-13. Borate Salt", "1-2-14. Oxalate Salt", and "1-2-15. Fluorosulfonate Salt" may also be used as an electrolyte. A lithium salt is commonly used in lithium secondary batteries. Specific examples thereof include inorganic lithium salts, such as $LiPF_6$, $LiBF_4$, $LiClO_4$, $LiAlF_4$, $LiSbF_6$, $LiTaF_6$, and $LiWF_7$;

lithium tungstates, such as $LiWOF_5$; carboxylic acid lithium salts, such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; monofluorophosphate salts and difluorophosphate salts, such as lithium monofluorophosphate and lithium difluorophosphate; sulfonic acid lithium salts, such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$; lithium imide salts, such as $LiN(FCO)_2$, $LiN(FCO)$ $(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonyl imide, lithium cyclic 1,3-perfluoropropanedisulfonyl imide, and $LiN(CF_3SO_2)(C_4F_9SO_2)$; lithium methide salts, such as $LiC(FSO_2)_3$, $LiC(CF_3SO_2)_3$, and $LiC(C_2F_5SO_2)_3$; lithium (malonato) borate salts, such as lithium bis(malonato)borate and lithium difluoro(malonato)borate; lithium (malonato)phosphate salts, such as lithium tris(malonato)phosphate, lithium difluorobis(malonato)phosphate, and lithium tetrafluoro(malonato)phosphate; other fluorine-containing organic lithium salts, such as $LiPF_4(CF_3)_2$, $LiPF_4(C_2F_5)_2$, $LiPF_4(CF_3SO_2)_2$, $LiPF_4(C_2F_5SO_2)_2$, $LiPF_3(CF_3)_3$, $LiPF_3(C_2F_5)_3$, $LiPF_3(CF_3SO_2)_3$, $LiPF_3(C_2F_5SO_2)_3$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$; lithium oxalatoborate salts, such as lithium difluorooxalatoborate and lithium bis(oxalato)borate; and lithium oxalatophosphate salts, such as lithium tetrafluorooxalatophosphate, lithium difluorobis(oxalato)phosphate, and lithium tris(oxalato)phosphate.

Among these, for example, $LiPF_6$, $LiSbF_6$, $LiTaF_6$, $FSO_3Li$, lithium monofluorophosphate, lithium difluorophosphate, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonyl imide, lithium cyclic 1,3-perfluoropropanedisulfonyl imide, $LiC(FSO_2)_3$, $LiC(CF_3SO_2)_3$, $LiC(C_2F_5SO_2)_3$, $LiPF_3(CF_3)_3$, $LiPF_3(C_2F_5)_3$, $LiBF_3CF_3$, $LiBF_3C_2F_5$, lithium difluorooxalatoborate, lithium bis(oxalato)borate, and lithium difluorobis(oxalato)phosphate are preferable because they enhance output characteristics, high-rate charge-discharge characteristics, high-temperature storage characteristics, cycle characteristics, etc. $LiPF_6$, $FSO_3Li$, lithium monofluorophosphate, lithium difluorophosphate, $LiN(FSO_2)_2$, $LiN(CF_3SO_2)_2$, lithium difluorooxalatoborate, lithium bis(oxalato)borate, and lithium difluorobis(oxalato)phosphate are more preferable. $LiPF_6$, $FSO_3Li$, lithium monofluorophosphate, lithium difluorophosphate, $LiN(FSO_2)_2$, and lithium bis(oxalato)borate are further preferable because they enhance output characteristics, high-rate charge-discharge characteristics, high-temperature storage characteristics, cycle characteristics, etc. to a further degree. $LiPF_6$ is most preferable from the viewpoint of the redox stability of the electrolyte.

The concentration of the above electrolyte in the nonaqueous electrolytic solution is not limited and may be set such that the advantageous effects of the present invention are not impaired. In order to adjust the electric conductivity of the electrolytic solution to fall within a suitable range and maintain suitable battery performance, the total molar concentration of lithium in the nonaqueous electrolytic solution is preferably 0.25 mol/L or more and is more preferably 0.5 mol/L or more; and is preferably 3.0 mol/L or less, is more preferably 2.5 mol/L or less, and is further preferably 2.0 mol/L or less. When the concentration of the electrolyte falls within the above range, the amount of lithium, which are charged particles, is not excessively reduced, the viscosity of the electrolytic solution may be adjusted to fall within an adequate range, and consequently, a suitable electric conductivity may be readily maintained.

The ratio of the molar content of the compound represented by Formula (1) in the nonaqueous electrolytic solution to the molar content of the electrolyte in the nonaqueous electrolytic solution which is required for achieving the advantageous effects of the present invention is not limited. The above ratio is normally 0.001 or more, is preferably 0.005 or more, is more preferably 0.0075 or more, is further preferably 0.0080 or more, and is particularly preferably 0.0085 or more; and is normally 0.950 or less, is preferably 0.850 or less, is more preferably 0.750 or less, is further preferably 0.300 or less, and is particularly preferably 0.200 or less. When the above ratio falls within the above range, the battery characteristics and, in particular, continuous charge endurance characteristics may be markedly enhanced. The mechanisms is not clear; it is considered that mixing the compound represented by Formula (1) with the electrolyte enables the compound represented by Formula (1) to readily combine with the product of decomposition of the electrolyte to form a complex with efficiency. The ratio of the molar content of the compound represented by Formula (1) or (2) to the molar content of the electrolyte is the quotient of the molar content of the compound represented by Formula (1) (when two or more compounds are used in combination, the total content thereof) divided by the molar content of the electrolyte and is a measure of the number of molecules of the compound represented by Formula (1) per molecule of the electrolyte.

The above electrolytes may be used alone or in combination of two or more. In the case where two or more electrolytes are used in combination, it is preferable that at least one of the electrolytes be a salt selected from the group consisting of a monofluorophosphate salt, a difluorophosphate salt, a borate salt, an oxalate salt, and a fluorosulfonate salt. It is more preferable that at least one of the electrolytes be a salt selected from the group consisting of a monofluorophosphate salt, a difluorophosphate salt, an oxalate salt, and a fluorosulfonate salt. Among these, a lithium salt is preferable. The content of the salt selected from the group consisting of a monofluorophosphate salt, a difluorophosphate salt, a borate salt, an oxalate salt, and a fluorosulfonate salt may be 0.01% by mass or more and is preferably 0.1% by mass or more; and may be 20% by mass or less and is preferably 10% by mass or less.

In the case where two or more electrolytes are used in combination, the electrolytes preferably include one or more salts selected from the group consisting of a monofluorophosphate salt, a difluorophosphate salt, a borate salt, an oxalate salt, and a fluorosulfonate salt and one or more salts other than the above salts. Examples of the other salts include the above-described examples of a lithium salt. In particular, $LiPF_6$, $LiN(FSO_2)(CF_3SO_2)$, $LiN(CF_3SO_2)_2$, $LiN(C_2F_5SO_2)_2$, lithium cyclic 1,2-perfluoroethanedisulfonyl imide, lithium cyclic 1,3-perfluoropropanedisulfonyl imide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, and $LiPF_3(C_2F_5)_3$ are preferable. $LiPF_6$ is further preferable. The content of the other salts may be 0.01% by mass or more and is preferably 0.1% by mass or more; and may be 20% by mass or less, is preferably 15% by mass or less, and is more preferably 10% by mass or less in order to maintain the balance between the electric conductivity and viscosity of the electrolytic solution at an adequate level.

1-4. Nonaqueous Solvent

The nonaqueous solvent according to the present invention is not limited; known organic solvents may be used as a nonaqueous solvent. Specific examples of the nonaqueous solvent include a cyclic carbonate that does not have any fluorine atom, a chain carbonate, a cyclic carboxylate ester, the chain carboxylate ester described above in "1-2-9. Fluorine-Free Carboxylate Ester", an ether compound, and a sulfone compound.

Hereinafter, the volume of the nonaqueous solvent is a volume measured at 25° C. As for a nonaqueous solvent that is solid at 25° C., such as ethylene carbonate, a volume measured at the melting point is used as the volume of the nonaqueous solvent.

1-4-1. Cyclic Carbonate That Does Not Have Fluorine Atom

Examples of the cyclic carbonate that does not have any fluorine atom include a cyclic carbonate having an alkylene group having 2 to 4 carbon atoms.

Specific examples of the cyclic carbonate that does not have any fluorine atom and has an alkylene group having 2 to 4 carbon atoms include ethylene carbonate, propylene carbonate, and butylene carbonate. Among these, ethylene carbonate and propylene carbonate are particularly preferable in order to increase the degree of dissociation of lithium ions and thereby enhance the battery characteristics.

Only one type of the cyclic carbonate that does not have any fluorine atom may be used alone. Two or more types of the cyclic carbonates that do not have any fluorine atom may be used in any combination and ratio.

The amount of the cyclic carbonate that does not have any fluorine atom is not limited and may be set such that the advantageous effects of the present invention are not impaired significantly. In the case where only one type of the cyclic carbonate that does not have any fluorine atom is used alone, the amount of the cyclic carbonate that does not have any fluorine atom is 5% by volume or more and is more preferably 10% by volume or more relative to 100% by volume of the nonaqueous solvent. When the content of the cyclic carbonate that does not have any fluorine atom falls within the above range, a reduction in the electric conductivity of the nonaqueous electrolytic solution, which may be caused due to a reduction in the dielectric constant of the nonaqueous electrolytic solution, may be prevented and consequently, the large-current discharge characteristics of the nonaqueous electrolytic solution secondary battery, the stability toward the negative electrode, and cycle characteristics may be readily adjusted to fall within adequate ranges. The content of the cyclic carbonate that does not have any fluorine atom is 95% by volume or less, is more preferably 90% by volume or less, and is further preferably 85% by volume or less. When the content of the cyclic carbonate that does not have any fluorine atom falls within the above range, the viscosity of the nonaqueous electrolytic solution falls within an adequate range, a reduction in ionic conductivity may be limited, and the rate characteristics of the nonaqueous electrolytic solution secondary battery may be readily adjusted to fall within a suitable range.

1-4-2. Chain Carbonate

The chain carbonate is preferably a chain carbonate having 3 to 7 carbon atoms and is more preferably a dialkyl carbonate having 3 to 7 carbon atoms.

Examples of the chain carbonate include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, tert-butyl methyl carbonate, ethyl-n-propyl carbonate, n-butyl ethyl carbonate, isobutyl ethyl carbonate, and tert-butyl ethyl carbonate. Among these, dimethyl carbonate, diethyl carbonate, di-n-propyl carbonate, diisopropyl carbonate, n-propyl isopropyl carbonate, ethyl methyl carbonate, and methyl-n-propyl carbonate are preferable. Dimethyl carbonate, diethyl carbonate, and ethyl methyl carbonate are particularly preferable.

Chain carbonates having a fluorine atom (hereinafter, may be referred to as "fluorinated chain carbonate") may also be suitably used.

The number of fluorine atoms included in the fluorinated chain carbonate is 1 or more and is not limited. The number of the fluorine atoms is commonly 6 or less and is preferably 4 or less. In the case where the fluorinated chain carbonate has plural fluorine atoms, the fluorine atoms may be bonded to the same carbon atom or may be bonded to different carbon atoms.

Examples of the fluorinated chain carbonate include fluorinated dimethyl carbonate and derivatives thereof, fluorinated ethyl methyl carbonate and derivatives thereof, and fluorinated diethyl carbonate and derivatives thereof.

Examples of the fluorinated dimethyl carbonate and derivatives thereof include fluoromethyl methyl carbonate, difluoromethyl methyl carbonate, trifluoromethyl methyl carbonate, bis(fluoromethyl) carbonate, bis(difluoro)methyl carbonate, and bis(trifluoromethyl) carbonate.

Examples of the fluorinated ethyl methyl carbonate and derivatives thereof include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the fluorinated diethyl carbonate and derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, and bis(2,2,2-trifluoroethyl) carbonate.

Only one type of the chain carbonate may be used alone. Two or more types of the chain carbonates may be used in any combination and ratio. The amount of the chain carbonate used is preferably 5% by volume or more, is more preferably 10% by volume or more, and is further preferably 15% by volume or more relative to 100% by volume of the nonaqueous solvent. When the lower limit is set to the content of the chain carbonate as described above, the viscosity of the nonaqueous electrolytic solution is adjusted to fall within an adequate range, a reduction in ionic conductivity may be limited, and the large-current discharge characteristics of the nonaqueous electrolytic solution secondary battery may be readily adjusted to fall within a suitable range. The amount of the chain carbonate used is preferably 90% by volume or less and is more preferably 85% by volume or less relative to 100% by volume of the nonaqueous solvent. When the upper limit is set as described above, a reduction in the electric conductivity of the nonaqueous electrolytic solution, which may be caused due to a reduction in the dielectric constant of the nonaqueous electrolytic solution, may be prevented and consequently, the large-current discharge characteristics of the nonaqueous electrolytic solution secondary battery may be readily adjusted to fall within a suitable range.

1-4-3. Cyclic Carboxylate Ester

The cyclic carboxylate ester is preferably a cyclic carboxylate ester having 3 to 12 carbon atoms. Specific examples of the cyclic carboxylate ester include gamma-butyrolactone, gamma-valerolactone, gamma-caprolactone, and epsilon-caprolactone. Among these, gamma-butyrolactone is particularly preferable in order to increase the degree of dissociation of lithium ions and thereby enhance the battery characteristics.

Only one type of the cyclic carboxylate ester may be used alone. Two or more types of the cyclic carboxylate esters may be used in any combination and ratio.

1-4-4. Ether Compound

The ether compound is preferably a chain ether having 3 to 10 carbon atoms or a cyclic ether having 3 to 6 carbon atoms. A part of the hydrogen atoms included in the chain ether or cyclic ether may be replaced with fluorine atoms.

Examples of the chain ether having 3 to 10 carbon atoms include diethyl ether, di(2,2,2-trifluoroethyl) ether, ethyl (2,2,2-trifluoroethyl) ether, ethyl (1,1,2,2-tetrafluoroethyl) ether, ethyl-n-propyl ether, di-n-propyl ether, dimethoxymethane, ethoxymethoxymethane, methoxy(2-fluoroethoxy)methane, methoxy(2,2,2-trifluoroethoxy)methane, methoxy(1,1,2,2-tetrafluoroethoxy)methane, diethoxymethane, dimethoxyethane, methoxyethoxyethane, diethoxyethane, ethylene glycol di-n-propyl ether, ethylene glycol di-n-butyl ether, and diethylene glycol dimethyl ether.

Examples of the cyclic ether having 3 to 6 carbon atoms include tetrahydrofuran, 2-methyltetrahydrofuran, 3-methyltetrahydrofuran, and 1,4-dioxane; and compounds produced by fluorinating the above compounds.

Among these, dimethoxymethane, diethoxymethane, ethoxymethoxymethane, ethylene glycol di-n-propyl ether, ethylene glycol di-n-butyl ether, and diethylene glycol dimethyl ether are preferable because they have a high capability of solvating lithium ions and enhance ion dissociating power. Dimethoxymethane, diethoxymethane, and ethoxymethoxymethane are particularly preferable because they have a low viscosity and increase ionic conductivity.

Only one type of the ether compound may be used alone. Two or more types of the ether compounds may be used in any combination and ratio.

1-4-5. Sulfone Compound

The sulfone compound is preferably a cyclic sulfone having 3 to 6 carbon atoms or a chain sulfone having 2 to 6 carbon atoms. The number of sulfonyl groups per molecule is preferably 1 or 2.

Examples of the cyclic sulfone having 3 to 6 carbon atoms include monosulfone compounds, such as trimethylene sulfones, tetramethylene sulfones, and hexamethylene sulfones; and disulfone compounds, such as trimethylene disulfones, tetramethylene disulfones, and hexamethylene disulfones.

Among these, from the viewpoint of dielectric constant and viscosity, tetramethylene sulfones, tetramethylene disulfones, hexamethylene sulfones, and hexamethylene disulfones are more preferable. Tetramethylene sulfones (sulfolanes) are particularly preferable.

The sulfolanes are preferably sulfolane and/or sulfolane derivatives (hereinafter, sulfolane may be referred to as "sulfolanes"). The sulfolane derivatives are preferably compounds produced by replacing one or more hydrogen atoms bonded to the carbon atoms constituting the sulfolane ring with fluorine atoms or alkyl groups.

Among these, 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, and 5-fluoro-3-(trifluoromethyl)sulfolane are preferable because they have a high ionic conductivity and may enhance input-output characteristics.

Examples of the chain sulfone having 2 to 6 carbon atoms include dimethyl sulfone, ethyl methyl sulfone, diethyl sulfone, n-propyl methyl sulfone, isopropyl methyl sulfone, n-butyl methyl sulfone, tert-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl-n-propyl sulfone, trifluoromethyl isopropyl sulfone, trifluoroethyl-n-butyl sulfone, trifluoroethyl-tert-butyl sulfone, trifluoromethyl-n-butyl sulfone, and trifluoromethyl-tert-butyl sulfone. The above chain sulfones are preferable because they have a high ionic conductivity and may enhance input-output characteristics.

Only one type of the sulfone compound may be used alone. Two or more types of the sulfone compounds may be used in any combination and ratio.

1-4-6. Composition of Nonaqueous Solvent

As a nonaqueous solvent according to the present invention, only one type of the above-described examples of the nonaqueous solvent may be used alone. Two or more types of the examples of the nonaqueous solvent may be used in any combination and ratio.

One of the preferable combinations of the nonaqueous solvents is a combination consisting primarily of the cyclic carbonate that does not have any fluorine atom and the chain carbonate.

In particular, the total proportion of the cyclic carbonate that does not have any fluorine atom and the chain carbonate in the nonaqueous solvent is preferably 70% by volume or more, is more preferably 80% by volume or more, and is further preferably 90% by volume or more. Furthermore, the ratio of the amount of the cyclic carbonate that does not have any fluorine atom to the total amount of the cyclic carbonate and the chain carbonate is preferably 5% by volume or more, is more preferably 10% by volume or more, and is further preferably 15% by volume or more; and is preferably 50% by volume or less, is more preferably 35% by volume or less, is further preferably 30% by volume or less, and is particularly preferably 25% by volume or less.

When the nonaqueous solvents are used in the above combination, the balance between the cycle characteristics of a battery prepared using the nonaqueous solvents and the high-temperature storage characteristics (in particular, the capacity that remains subsequent to storage at high temperatures and high-rate discharge capacity) of the battery may be improved.

Preferable examples of the combination of the cyclic carbonate that does not have any fluorine atom and the chain carbonate include ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate.

Among the above combinations of the cyclic carbonate that does not have any fluorine atom and the chain carbonate, combinations in which the chain carbonate is an asymmetric chain alkyl carbonate are further preferable. Combinations that include ethylene carbonate, a symmetric chain carbonate, and an asymmetric chain carbonate, such as a combination of ethylene carbonate, dimethyl carbonate, and an ethyl methyl carbonate, a combination of ethylene carbonate, diethyl carbonate, and ethyl methyl carbonate, and a combination of ethylene carbonate, dimethyl carbonate, diethyl carbonate, and ethyl methyl carbonate, are particularly preferable because they improve the balance between cycle characteristics and large-current discharge characteristics.

Among these, combinations in which the asymmetric chain carbonate is ethyl methyl carbonate are preferable. The number of the carbon atoms included in the alkyl group constituting the chain carbonate is preferably 1 or 2. It is also preferable to use the above combinations of ethylene carbonate and chain carbonates in further combination with propylene carbonate. In the case where propylene carbonate is used, the volume ratio between ethylene carbonate and propylene carbonate is preferably 99:1 to 40:60 and is particularly preferably 95:5 to 50:50. The proportion of propylene carbonate in the entire nonaqueous solvent is preferably 0.1% by volume or more, is more preferably 1% by volume or more, and is further preferably 2% by volume or more; and is preferably 20% by volume or less, is more preferably 8% by volume or less, and is further preferably 5% by volume or less.

It is preferable that the concentration of propylene carbonate fall within the above range because, in such a case, low-temperature characteristics may be enhanced while the characteristics produced by the combination of ethylene carbonate and the chain carbonate are maintained.

In the case where dimethyl carbonate is added to the nonaqueous solvent, the proportion of dimethyl carbonate in the entire nonaqueous solvent is preferably 10% by volume or more, is more preferably 20% by volume or more, is further preferably 25% by volume or more, and is particularly preferably 30% by volume or more; and is preferably 90% by volume or less, is more preferably 80% by volume or less, is further preferably 75% by volume or less, and is particularly preferably 70% by volume or less. In such a case, the rate characteristics of the battery may be enhanced.

Among these, it is preferable that the nonaqueous solvent include dimethyl carbonate and ethyl methyl carbonate such that the content of the dimethyl carbonate is higher than that of the ethyl methyl carbonate because, in such a case, the characteristics of the battery subsequent to storage at high temperatures may be enhanced while the electric conductivity of the electrolytic solution is maintained.

The volume ratio of dimethyl carbonate to ethyl methyl carbonate in the entire nonaqueous solvent (Dimethyl carbonate/Ethyl methyl carbonate) is preferably 1.1 or more, is more preferably 1.5 or more, and is further preferably 2.5 or more in order to increase the electric conductivity of the electrolytic solution and enhance the characteristics of the battery after storage. The above volume ratio (Dimethyl carbonate/Ethyl methyl carbonate) is preferably 40 or less, is more preferably 20 or less, is further preferably 10 or less, and is particularly preferably 8 or less in order to enhance battery characteristics at low temperatures.

Another solvent, such as a cyclic carboxylate ester, a chain carboxylate ester, a cyclic ether, a chain ether, a sulfur-containing organic solvent, phosphorus-containing organic solvent, or an aromatic fluorine-containing solvent, may be added to the combination consisting primarily of the cyclic carbonate that does not have any fluorine atom and the chain carbonate.

1-5. Auxiliary Agents

The electrolytic solution battery according to the present invention may include an appropriate auxiliary agent other than the above compounds in accordance with the intended purpose. Examples of the auxiliary agent include the other auxiliary agents described below.

1-5-1. Other Auxiliary Agents

The electrolytic solution according to the present invention may include other known auxiliary agents. Examples of the other auxiliary agents include carbonate compounds, such as erythritan carbonate, spiro-bis-dimethylene carbonate, and methoxyethyl-methyl carbonate; carboxylic anhydrides, such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds, such as 3,9-divinyl-2,4,8,10-tetraoxaspiro[5.5]undecane; sulfur-containing compounds, such as N,N-dimethylmethanesulfone amide and N,N-diethylmethanesulfone amide; phosphorus-containing compounds, such as trimethyl phosphite, triethyl phosphite, triphenyl phosphite, trimethyl phosphate, triethyl phosphate, triphenyl phosphate, methyl dimethylphosphinate, ethyl diethylphosphinate, trimethylphosphine oxide, and triethylphosphine oxide; nitrogen-containing compounds, such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds, such as heptane, octane, nonane, decane, and cycloheptane; and 2-propynyl 2-(diethoxyphosphoryl)acetate, 1-methyl-2-propynyl 2-(diethoxyphosphoryl)acetate, 1,1-dimethyl-2-propynyl 2-(diethoxyphosphoryl)acetate, pentafluorophenyl methanesulfonate, pentafluorophenyl trifluoromethanesulfonate, pentafluorophenyl acetate, pentafluorophenyl trifluoroacetate, methyl pentafluorophenyl carbonate, 2-propynyl 2-(methanesulfonyloxy)propionate, 2-methyl 2-(methanesulfonyloxy)propionate, 2-ethyl 2-(methanesulfonyloxy)propionate, 2-propynyl methanesulfonyloxyacetate, 2-methyl methanesulfonyloxyacetate, 2-ethyl methanesulfonyloxyacetate, lithium ethyl methyloxycarbonylphosphonate, lithium ethyl ethyloxycarbonylphosphonate, lithium ethyl 2-propynyloxycarbonylphosphonate, lithium ethyl 1-methyl-2-propynyloxycarbonylphosphonate, lithium ethyl 1,1-dimethyl-2-propynyloxycarbonylphosphonate, lithium methyl sulfate, lithium ethyl sulfate, lithium 2-propynyl sulfate, lithium 1-methyl-2-propynyl sulfate, lithium 1,1-dimethyl-2-propynyl sulfate, lithium 2,2,2-trifluoroethyl sulfate, methyl trimethylsilyl sulfate, ethyl trimethylsilyl sulfate, 2-propynyl trimethylsilyl sulfate, dilithium ethylene disulfate, 2-butyne-1,4-diyl dimethanesulfonate, 2-butyne-1,4-diyl diethanesulfonate, 2-butyne-1,4-diyl diformate, 2-butyne-1,4-diyl diacetate, 2-butyne-1,4-diyl dipropionate, 4-hexadiyne-1,6-diyl dimethanesulfonate, 2-propynyl methanesulfonate, 1-methyl-2-propynyl methanesulfonate, 1,1-dimethyl-2-propynyl methanesulfonate, 2-propynyl ethanesulfonate, 2-propynyl vinylsulfonate, methyl 2-propynyl carbonate, ethyl 2-propynyl carbonate, bis(2-propynyl) carbonate, methyl 2-propynyl oxalate, ethyl 2-propynyl oxalate, bis(2-propynyl) oxalate, 2-propynyl acetate, 2-propynyl formate, 2-propynyl methacrylate, di(2-propynyl) glutarate, 2,2-dioxide-1,2-oxathiolane-4-yl acetate, 2,2-dioxide-1,2-oxathiolane-4-yl propionate, 5-methyl-1,2-oxathiolane-4-one 2,2-dioxide, 5,5-dimethyl-1,2-oxathiolane-4-one 2,2-dioxide, 2-isocyanatoethyl acrylate, 2-isocyanatoethyl methacrylate, 2-isocyanatoethyl crotonate, 2-(2-isocyanatoethoxy)ethyl acrylate, 2-(2-isocyanatoethoxy)ethyl methacrylate, 2-(2-isocyanatoethoxy)ethyl crotonate, 2-allylsuccinic anhydride, 2-(1-pentene-3-yl)succinic anhydride, 2-(1-hexene-3-yl)succinic anhydride, 2-(1-heptene-3-yl)succinic anhydride, 2-(1-octene-3-yl)succinic anhydride, 2-(1-nonene-3-yl)succinic anhydride, 2-(3-butene-2-yl)succinic anhydride, 2-(2-methylallyl)succinic anhydride, and 2-(3-methyl-3-butene-2-yl)succinic anhydride. The above auxiliary agents may be used alone or in combination of two or more. The addition of the above auxiliary agents may enhance the capacity retention characteristics and cycle characteristics subsequent to storage at high temperatures.

The amount of the other auxiliary agents is not limited and may be set such that the advantageous effects of the present invention are not impaired significantly. The amount of the other auxiliary agents is preferably 0.01% by mass or more and 5% by mass or less relative to 100% by mass of the nonaqueous electrolytic solution. When the content of the other auxiliary agents falls within the above range, the advantageous effects of the other auxiliary agents may be readily produced to a sufficient degree and the degradation of the battery characteristics, such as high-rate discharge characteristics, may be readily prevented. The content of the other auxiliary agents is more preferably 0.1% by mass or more and is further preferably 0.2% by mass or more; and is more preferably 3% by mass or less and is further preferably 1% by mass or less.

The above-described nonaqueous electrolytic solution is used for producing an energy device that includes positive and negative electrodes capable of occluding and releasing metal ions. Details of the energy device are described below. The nonaqueous electrolytic solution may be particularly suitably used for producing nonaqueous electrolytic solution secondary batteries.

2. Energy Device

An energy device that includes the nonaqueous electrolytic solution according to the present invention includes a positive electrode, a negative electrode, and a nonaqueous electrolytic solution produced by dissolving an electrolyte that is the compound represented by Formula (1) or (2) in a nonaqueous solvent.

The energy device that includes the nonaqueous electrolytic solution according to the present invention is preferably a lithium battery, a polyvalent cation battery, a metal/air secondary battery, a secondary battery that includes a s-block metal which is other than the above batteries, a lithium-ion capacitor, or an electric double-layer capacitor, is more preferably a lithium battery or a lithium ion capacitor, and is further preferably a lithium battery. It is also preferable that the nonaqueous electrolytic solution included in the above energy devices be apparently solidified with a high-molecular compound, a filler, or the like, that is, be "gel electrolyte". The lithium salt according to the present invention may also be used as electrolyte salt of the solid electrolyte.

2-1. Lithium Battery

A lithium battery produced using the nonaqueous electrolytic solution according to the present invention includes a positive electrode including a current collector and a positive electrode active material layer disposed on the current collector; a negative electrode including a current collector and a negative electrode active material layer disposed on the current collector, the negative electrode being capable of occluding and releasing ions; and the nonaqueous electrolytic solution according to the present invention. Note that the term "lithium battery" used herein refers collectively to a lithium primary battery and a lithium secondary battery.

2-1-1. Battery Structure

The structure of the lithium battery according to the present invention is the same as the structures of the lithium batteries known in the related art, except the nonaqueous electrolytic solution according to the present invention. The lithium battery commonly has a structure in which the positive and negative electrodes are stacked on top of each other with a porous membrane (separator) interposed therebetween, the porous membrane being impregnated with the nonaqueous electrolytic solution according to the present invention, and the above components are housed in a casing (package). Thus, the shape of the lithium battery according to the present invention is not limited and may be cylindrical, rectangular, laminated film-shaped, coin-shaped, large-sized, or the like.

2-1-2. Nonaqueous Electrolytic Solution

The above-described nonaqueous electrolytic solution according to the present invention is used as a nonaqueous electrolytic solution. A nonaqueous electrolytic solution other than the nonaqueous electrolytic solution according to the present invention may be used in combination with the nonaqueous electrolytic solution according to the present invention such that a deviation from the scope of the present invention is not made.

2-1-3. Negative Electrode

The negative electrode includes a current collector and a negative electrode active material layer disposed on the current collector. The negative electrode active material layer includes a negative electrode active material. The negative electrode active material is described below.

The negative electrode active material included in a lithium primary battery is not limited and may be any negative electrode active material capable of electrochemically releasing lithium ions. Specific examples of such a negative electrode active material include metal lithium.

The negative electrode active material included in a lithium secondary battery is not limited and may be any negative electrode active material capable of electrochemically occluding and releasing metal ions (e.g., lithium ions). Specific examples of such a negative electrode active material include a carbonaceous material, an alloy material, and a lithium-containing metal composite oxide material. The above materials may be used alone or in any combination of two or more.

<Negative Electrode Active Material>

Examples of the negative electrode active material include a carbonaceous material, an alloy material, and a lithium-containing metal composite oxide material.

The carbonaceous material used as a negative electrode active material is preferably selected from the following materials, because they maintain the balance between initial irreversible capacity and high-current density charge-discharge characteristics at an adequate level.

(1) natural graphite (2) carbonaceous material produced by heating an artificial carbonaceous substance and an artificial graphite substance at 400° C. to 3200° C. one or more times (3) carbonaceous material that includes a negative electrode active material layer that is composed of at least two or more carbonaceous substances having different crystallinities and/or that includes an interface at which the carbonaceous substances having different crystallinities come into contact with each other (4) carbonaceous material that includes a negative electrode active material layer that is composed of at least two or more carbonaceous substances having different orientations and/or that includes an interface at which the carbonaceous substances having different orientations come into contact with each other The carbonaceous materials (1) to (4) may be used alone. Alternatively, two or more types of the carbonaceous materials (1) to (4) may be used in any combination and ratio.

Examples of the artificial carbonaceous substance and the artificial graphite substance described in (2) above include natural graphite, coal-derived coke, petroleum-derived coke, coal-derived pitch, petroleum-derived pitch, substances produced by oxidizing these pitches, needle coke, pitch coke, carbon materials produced by partially graphitizing these substances, furnace black, acetylene black, substances produced by pyrolysis of an organic substance, such as a pitch-based carbon fiber, carbonizable organic substances and carbides thereof, a solution prepared by dissolving a carbonizable organic substance in a low-molecular-weight organic solvent, such as benzene, toluene, xylene, quinoline, or n-hexane, and carbides thereof.

The alloy material used as a negative electrode active material is not limited and may be any alloy material selected from elemental lithium, an elemental metal and an alloy constituting a lithium alloy, and compounds thereof, such as an oxide, a carbide, a nitride, a silicide, a sulfide, and a phosphide, which is capable of occluding and releasing lithium. The elemental metal and the alloy constituting a lithium alloy are preferably materials including the metal or metalloid element belonging to Group 13 or 14 (i.e., except carbon) and are more preferably elemental metals of aluminum, silicon, and tin (hereinafter, these elements may be referred to simply as "specific metal elements") and alloys or compounds containing these atoms. The above materials may be used alone. Alternatively, two or more types of the above materials may be used in any combination and ratio.

Examples of a negative electrode active material including at least one atom selected from the specific metal elements include an elemental metal that is any one of the specific metal elements; an alloy of two or more of the specific metal elements; an alloy of one or two or more of the specific metal elements with one or two or more of the other metal elements; a compound including one or two or more of the specific metal elements; and a composite compound of the above compound, such as an oxide, a carbide, a nitride, a silicide, a sulfide, or a phosphide of the compound. Using the above elemental metal, alloy, or metal compound as a negative electrode active material may increase the capacity of the battery.

Compounds formed as a result of the above composite compounds being bonded to a few types of elements, such as elemental metals, alloys, or non-metallic elements, in a complicated manner may also be used. Specifically, for example, an alloy of silicon or tin with a metal that does not serve as a negative electrode may be used. For example, when tin is used, a complicated compound including five or six elements selected from tin, a metal that serves as a negative electrode other than silicon, a metal that does not serve as a negative electrode, and a non-metallic element may be used.

Among the above negative electrode active materials, an elemental metal that is any one of the specific metal elements, an alloy of two or more of the specific metal elements, and oxides, carbides, nitrides, etc. of the specific metal elements are preferable in order to increase the capacity of the battery per unit mass. Elemental metals, alloys, oxides, carbides, nitrides, etc. of silicon and/or tin are particularly preferable from the viewpoint of the capacity per unit mass and environmental loads.

The lithium-containing metal composite oxide material used as a negative electrode active material is not limited and may be any lithium-containing metal composite oxide material capable of occluding and releasing lithium. From the viewpoint of high-current density charge-discharge characteristics, a material containing titanium and lithium is preferable. A lithium-containing composite metal oxide material containing titanium is more preferable. Furthermore, a composite oxide of lithium and titanium (hereinafter, may be referred to simply as "lithium titanium composite oxide"). That is, it is particularly preferable to add a lithium titanium composite oxide having a spinel structure to the negative electrode active material of the nonaqueous electrolytic solution secondary battery because, in such a case, the output resistance of the battery may be significantly reduced.

A lithium titanium composite oxide in which lithium or titanium is replaced with another metal element, that is, for example, at least one element selected from the group consisting of Na, K, Co, Al, Fe, Ti, Mg, Cr, Ga, Cu, Zn, and Nb, is also preferable.

It is preferable that the metal oxide be the lithium titanium composite oxide represented by Formula (A) and, in Formula (A), 0.7≤x≤1.5, 1.5≤y≤2.3, and 0≤z≤1.6 because, in such a case, the structure during doping and de-doping of lithium ions is stable.

$$Li_xTi_yM_zO_4 \quad (A)$$

[in Formula (A), M represents at least one element selected from the group consisting of Na, K, Co, Al, Fe, Ti, Mg, Cr, Ga, Cu, Zn, and Nb]

Among compositions represented by Formula (A) above, the following structures are particularly preferable in order to maintain the balance among battery performance capabilities at a suitable level.

(a) 1.2≤x≤1.4, 1.5≤y≤1.7, and z=0
(b) 0.9≤x≤1.1, 1.9≤y≤2.1, and z=0
(c) 0.7≤x≤0.9, 2.1≤y≤2.3, and z=0

Particularly preferable, typical compositions of the compound are (a) $Li_{4/3}Ti_{5/3}O_4$, (b) $Li_1Ti_2O_4$, and (c) $Li_{4/5}Ti_{11/5}O_4$ Preferable examples of the structure in which Z≠0 include $Li_{4/3}Ti_{4/3}Al_{1/3}O_4$.

<Structure of Negative Electrode and Method for Preparing Negative Electrode>

The electrode may be produced using any of known methods which do not significantly impair the advantageous effects of the present invention. The electrode may be formed by, for example, mixing the negative electrode active material with a binder, a solvent, and optionally, a thickener, a conductant agent, a filler, and the like to form a slurry, applying the slurry to a current collector, and performing drying, followed by pressing.

In the case where the alloy material is used, a thin-film layer (negative electrode active material layer) including the above negative electrode active material may be formed by vapor deposition, sputtering, plating, or the like.

(Current Collector)

The current collector on which the negative electrode active material is held may be selected from known current collectors. Examples of the negative electrode current collector include metal materials, such as aluminum, copper, nickel, stainless steel, and nickel-plated steel. Copper is particularly preferable from the viewpoints of ease of working and costs.

Examples of the shape of the current collector made of a metal material include a metal foil, a metal cylinder, a metal coil, a metal plate, a metal thin-film, an expanded metal, a perforated metal, and a metal foam. Among these, a metal thin-film is preferable, and a copper foil is more preferable. A rolled copper foil produced by rolling and an electrolytic copper foil produced by electrolysis are further preferable. Both of the above foils may be used as a current collector.

(Binding Agent)

The binder used for binding the negative electrode active material may be any material stable toward the nonaqueous electrolytic solution and the solvent used for producing the electrode.

Specific examples of the binding agent include resin high-molecular compounds, such as polyethylene, polypropylene, polyethylene terephthalate, polymethyl methacrylate, aromatic polyamide, polyimide, cellulose, and nitrocellulose; rubber-like high-molecular compounds, such as an SER (styrene butadiene rubber), an isoprene rubber, a butadiene rubber, a fluorine rubber, an NER (acrylonitrile-butadiene rubber), and an ethylene-propylene rubber; a styrene-butadiene-styrene block copolymer and a hydrogenated styrene-butadiene-styrene block copolymer; thermoplastic elastomer-like high-molecular compounds, such as an EPDM (ethylene-propylene-diene terpolymer), a styrene-ethylene-butadiene-styrene copolymer, a styrene-isoprene-styrene block copolymer, and a hydrogenated product thereof; soft resinous high-molecular compounds, such as syndiotactic-1,2-polybutadiene, polyvinyl acetate, an ethylene-vinyl acetate copolymer, and a propylene-α-olefin copolymer; fluorine-based high-molecular compounds, such as polyvinylidene fluoride, polytetrafluoroethylene, fluorinated polyvinylidene fluoride, and a polytetrafluoroethylene-ethylene copolymer; and high-molecular compositions conductive to alkali metal ions (in particular, lithium ions). The above binding agents may be used alone. Alternatively, two or more types of the above binding agents may be used in any combination and ratio.

The proportion of the binder to the negative electrode active material is preferably 0.1% by mass or more, is further preferably 0.5% by mass or more, and is particularly preferably 0.6% by mass or more; and is preferably 20% by mass or less, is more preferably 15% by mass or less, is further preferably 10% by mass or less, and is particularly preferably 8% by mass or less. When the proportion of the binder to the negative electrode active material falls within the above range, the battery capacity and the strength of the negative electrode may be maintained at sufficient levels.

In particular, in the case where the rubber-like high-molecular compound, such as SBR, is used as a primary constituent, the proportion of the binder to the negative electrode active material is normally 0.1% by mass or more, is preferably 0.5% by mass or more, and is further preferably 0.6% by mass or more; and is normally 5% by mass or less, is preferably 3% by mass or less, and is further preferably 2% by mass or less. In the case where a fluorine-based high-molecular compound, such as polyvinylidene fluoride, is used as a primary constituent, the proportion of the binder to the negative electrode active material is normally 1% by mass or more, is preferably 2% by mass or more, and is further preferably 3% by mass or more; and is normally 15% by mass or less, is preferably 10% by mass or less, and is further preferably 8% by mass or less.

(Thickener)

The thickener may be used normally for adjusting the viscosity of the slurry. Specific examples of the thickener include, but are not limited to, carboxymethyl cellulose, methyl cellulose, hydroxymethyl cellulose, ethyl cellulose, polyvinyl alcohol, oxidized starch, phosphorylated starch, casein, and salts thereof. The above thickeners may be used alone. Alternatively, two or more types of the above thickeners may be used in any combination and ratio.

In the case where the thickener is optionally used, the proportion of the thickener to the negative electrode active material is normally 0.1% by mass or more, is preferably 0.5% by mass or more, and is further preferably 0.6% by mass or more; and is normally 5% by mass or less, is preferably 3% by mass or less, and is further preferably 2% by mass or less. When the proportion of the thickener to the negative electrode active material falls within the above range, a reduction in the battery capacity and an increase in resistance may be limited while ease of coating is maintained at a suitable level.

(Electrode Density)

The structure of the electrode produced using the negative electrode active material is not limited. The density of the negative electrode active material present on the current collector is preferably 1 g·cm$^{-3}$ or more, is further preferably 1.2 g·cm$^{-3}$ or more, and is particularly preferably 1.3 g·cm$^{-3}$ or more; and is preferably 2.2 g cm$^{-3}$ or less, is more preferably 2.1 g·cm$^{-3}$ or less, is further preferably 2.0 g·cm$^{-3}$ or less, and is particularly preferably 1.9 g·cm$^{-3}$ or less. When the density of the negative electrode active material present on the current collector falls within the above range, the fracture of particles of the negative electrode active material may be prevented, and consequently, an increase in initial irreversible capacity and the degradation of high-current density charge-discharge characteristics, which may be caused due to a reduction in the permeability of the nonaqueous electrolytic solution to the vicinity of the interface between the current collector and the negative electrode active material, may be limited, while a reduction in the battery capacity and an increase in resistance are limited.

(Thickness of Negative Electrode Plate)

The thickness of the negative electrode plate is not limited and may be determined in accordance with the positive electrode plate used. The thickness of the mixture layer which excludes the thickness of the metal foil used as a core is normally 15 μm or more, is preferably 20 μm or more, and is more preferably 30 μm or more; and is normally 300 μm or less, is preferably 280 μm or less, and is more preferably 250 μm or less.

(Coating of Surface of Negative Electrode Plate)

A substance having a composition different from the composition of the negative electrode plate may be deposited on the surface of the negative electrode plate. Examples of the surface-deposited substance include oxides, such as aluminum oxide, silicon oxide, titanium oxide, zirconium oxide, magnesium oxide, calcium oxide, boron oxide, antimony oxide, and bismuth oxide; sulfate salts, such as lithium sulfate, sodium sulfate, potassium sulfate, magnesium sulfate, calcium sulfate, and aluminum sulfate; and carbonate salts, such as lithium carbonate, calcium carbonate, and magnesium carbonate.

2-1-4. Positive Electrode

<Positive Electrode Active Material>

A positive electrode active material included in the positive electrode is described below.

(Composition)

The positive electrode active material included in a lithium primary battery is not limited and may be any material capable of electrochemically occluding lithium ions. Specific examples of such a material include graphite fluoride, manganese dioxide, thionyl chloride, iron disulfide, and copper oxide.

The positive electrode active material included in a lithium secondary battery is not limited and may be any material capable of electrochemically occluding and releasing metal ions (e.g., lithium ions). For example, a substance containing lithium and at least one transition metal is preferable. Specific examples of such a substance include a lithium-transition metal composite oxide and a lithium-containing transition metal phosphoric acid compound.

The transition metal included in the lithium-transition metal composite oxide is preferably, for example, V, Ti, Cr, Mn, Fe, Co, Ni, or Cu. Specific examples of the lithium-transition metal composite oxide include a lithium-cobalt composite oxide, such as $LiCoO_2$; a lithium-nickel composite oxide, such as $LiNiO_2$; a lithium-manganese composite oxide, such as $LiMnO_2$, $LiMn_2O_4$, or $Li_2MnO_4$; a lithium-nickel-manganese-cobalt composite oxide, such as $LiNi_{1/3}Mn_{1/3}Co_{1/3}O_2$ or $LiNi_{0.5}Mn_{0.3}Co_{0.2}O_2$; and compounds produced by replacing a part of the transition metal atoms primarily constituting the above lithium-transition metal composite oxides with other elements, such as Na, K, B, F, Al, Ti, V, Cr, Mn, Fe, Co, Li, Ni, Cu, Zn, Mg, Ga, Zr, Si, Nb, Mo, Sn, and W. Examples of the compounds produced by the above substitution include $LiNi_{0.5}Mn_{0.5}O_2$, $LiNi_{0.5}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$, and $LiMn_{1.5}Ni_{0.5}O_4$.

The transition metal included in the lithium-containing transition metal phosphoric acid compound is preferably, for example, V, Ti, Cr, Mn, Fe, Co, Ni, or Cu. Specific examples of the lithium-containing transition metal phosphoric acid compound include iron phosphates, such as $LiFePO_4$, $Li_3Fe_2(PO_4)_3$, and $LiFeP_2O_7$; cobalt phosphates, such as $LiCoPO_4$; and compounds produced by replacing a part of the transition metal atoms primarily constituting the above lithium transition metal phosphoric acid compounds with other elements, such as Al, Ti, V, Cr, Mn, Fe, Co, Li, Ni, Cu, Zn, Mg, Ga, Zr, Nb, and Si.

It is preferable to add lithium phosphate to the positive electrode active material in order to enhance continuous charge characteristics. The use of lithium phosphate is not limited. It is preferable to mix the positive electrode active material with lithium phosphate. The amount of lithium phosphate is, as for the lower limit, preferably 0.1% by mass or more, is more preferably 0.3% by mass or more, and is further preferably 0.5% by mass or more; and as for the upper limit, is preferably 10% by mass or less, is more preferably 8% by mass or less, and is further preferably 5% by mass or less of the total amount of the positive electrode active material and lithium phosphate.

(Surface Coating)

A substance having a composition different from the composition of the positive electrode active material may be deposited on the surface of the positive electrode active material. Examples of the surface-deposited substance include oxides, such as aluminum oxide, silicon oxide, titanium oxide, zirconium oxide, magnesium oxide, calcium oxide, boron oxide, antimony oxide, and bismuth oxide; sulfate salts, such as lithium sulfate, sodium sulfate, potassium sulfate, magnesium sulfate, calcium sulfate, and aluminum sulfate; carbonate salts, such as lithium carbonate, calcium carbonate, and magnesium carbonate; and carbon.

The above surface-deposited substances may be deposited on the surface of the positive electrode active material by, for example, a method of dissolving or suspending the substance in a solvent, impregnating the positive electrode active material with the resulting solution or suspension, and subsequently performing drying; a method of dissolving or suspending a precursor of the surface-deposited substance in a solvent, impregnating the positive electrode active material with the resulting solution or suspension, and subsequently conducting a reaction by heating or the like; or a method of adding the substance to a precursor of the positive electrode active material and baking the substance and the precursor simultaneously. In the case where carbon is to be deposited on the surface of the positive electrode active material, alternatively, a carbonaceous substance may be mechanically adhered onto the surface in the form of active carbon or the like in the subsequent step.

The amount of the surface-deposited substance is, as for the lower limit, by mass, preferably 0.1 ppm or more, is more preferably 1 ppm or more, and is further preferably 10 ppm or more; and as for the upper limit, is preferably 20% or less, is more preferably 10% or less, and is further preferably 5% or less of the amount of the positive electrode active material. The surface-deposited substance may suppress the oxidation reaction of the electrolytic solution which occurs on the surface of the positive electrode active material and thereby enhance the durability of the battery. If the amount of the surface-deposited substance is excessively small, the above advantageous effects may fail to be produced at a sufficient level. If the amount of the surface-deposited substance is excessively large, the substance may block the entry and exit of lithium ions and consequently increase resistance. In the present invention, a positive electrode active material provided with a substance deposited on the surface of the positive electrode active material, the substance having a composition different from that of the positive electrode active material, is referred to also as "positive electrode active material".

(Shape)

Examples of the shape of particles of the positive electrode active material include the shapes of the particles of common positive electrode active materials, such as block-like, polyhedric, spherical, elliptical sphere-like, plate-like, acicular, and columnar. The primary particles may be aggregated with one another to form secondary particles.

(Tap Density)

The tap density of the positive electrode active material is preferably 0.5 g/cm$^3$ or more, is more preferably 0.8 g/cm$^3$ or more, and is further preferably 1.0 g/cm$^3$ or more. When the tap density of the positive electrode active material falls within the above range, the amounts of disperse medium, conductant agent, and binding agent required for forming the positive electrode active material layer may be reduced and, as a result, the filling ratio of the positive electrode active material and the battery capacity may be maintained at adequate levels. A positive electrode active material layer having a high density may be formed by using a composite oxide powder having a high tap density. Commonly, it is preferable to maximize the tap density. Although the upper limit for the tap density is not specified, the tap density is preferably 4.0 g/cm$^3$ or less, is more preferably 3.7 g/cm$^3$ or less, and is further preferably 3.5 g/cm$^3$ or less. When the tap density falls within the above range, the degradation of rate characteristics may be limited.

In the present invention, the tap density of the positive electrode active material is determined by charging 5 to 10 g of a powder of the positive electrode active material into a 10-ml glass graduated cylinder, tapping the cylinder 200 times at a stroke of about 20 mm, and calculating the pack density of the powder (tap density) in units of g/cc.

(Method for Producing Positive Electrode Active Material)

For producing the positive electrode active material, common methods for producing inorganic compounds may be used. Various methods may be used for preparing, in particular, spherical or elliptical sphere-like active material particles. An example of the methods is a method of dissolving or pulverizing and dispersing a substance that is a raw material for the transition metal in a solvent such as water, adjusting the pH of the resulting solution or dispersion while performing stirring to prepare and recover spherical precursor particles, drying the precursor particles as needed, subsequently adding a Li source, such as LiOH, $Li_2CO_3$, or $LiNO_3$, to the precursor, and baking the resulting mixture at a high temperature to form an active material.

For producing the positive electrode, the above positive electrode active materials may be used alone. Alternatively, one or more types of the positive electrode active materials having different compositions may be used in any combination and ratio. Examples of preferable combinations of positive electrode active materials include a combination of $LiCoO_2$ and $LiMn_2O_4$, such as $LiNi_{0.33}Co_{0.33}Mn_{0.33}O_2$, or a compound formed by replacing a part of the Mn atoms with another transition metal or the like; and a combination of $LiCoO_2$ or a compound formed by replacing a part of the Co atoms with another transition metal or the like.

<Structure of Positive Electrode and Method for Preparing Positive Electrode>

The structure of the positive electrode is described below. In the present invention, the positive electrode may be prepared by forming a positive electrode active material layer that includes the positive electrode active material and a binding agent on a current collector. The positive electrode that includes the positive electrode active material may be produced by the conventional method. Specifically, the positive electrode may be produced by mixing the positive electrode active material with a binding agent and optional constituents, such as a conductant agent and a thickener, by a dry process, forming the resulting mixture into a sheet-like shape, and pressure bonding the sheet-like body to a positive electrode current collector, or by dissolving or dispersing the above materials in a liquid medium to form a slurry, applying the slurry to a positive electrode current collector, and performing drying to form a positive electrode active material layer on the current collector.

The content of the positive electrode active material in the positive electrode active material layer is preferably 80% by mass or more, is more preferably 82% by mass or more, and is particularly preferably 84% by mass or more. As for the upper limit, the above content is preferably 99% by mass or less and is more preferably 98% by mass or less. When the above content falls within the above range, the electric capacity of the positive electrode active material included in the positive electrode active material layer may be maintained at an adequate level while the strength of the positive electrode is maintained. The positive electrode active material layer prepared by coating and drying is preferably subjected to compaction by hand press, roller press, or the like in order to increase the pack density of the positive electrode active material. The density of the positive electrode active material layer is, as for the lower limit, preferably 1.5 g/cm$^3$ or more, is more preferably 2 g/cm$^3$, and is further preferably 2.2 g/cm$^3$ or more; and as for the upper limit, is preferably 5 g/cm$^3$ or less, is more preferably 4.5 g/cm$^3$ or less, and is further preferably 4 g/cm$^3$ or less. When the above density falls within the above range, suitable charge-discharge characteristics may be achieved while an increase in electric resistance is limited.

(Conductant Agent)

Known conductant agents may be used as a conductant agent. Specific examples of the conductant agents include metal materials, such as copper and nickel; and carbon materials (e.g., graphite materials, such as natural graphite and artificial graphite; carbon black materials, such as acetylene black; and amorphous carbon materials, such as needle coke). The above conductant agents may be used alone. Alternatively, two or more types of the conductant agents may be used in any combination and ratio. The content of the conductant agent in the positive electrode active material layer is normally 0.01% by mass or more, is preferably 0.1% by mass or more, and is more preferably 1% by mass or more; and as for the upper limit, is normally 50% by mass or less, is preferably 30% by mass or less, and is more preferably 15% by mass or less. When the above content falls within the above range, a sufficiently high electrical conductivity and a sufficiently high battery capacity may be maintained.

(Binding Agent)

The binding agent used for producing the positive electrode active material layer is not limited. In the case where a coating method is used, the binding agent may be any material capable of being dissolved or dispersed in the liquid medium used in the production of the electrode. Specific examples of the binding agent include resin high-molecular compounds, such as polyethylene, polypropylene, polyethylene terephthalate, polymethyl methacrylate, polyimide, aromatic polyamide, cellulose, and nitrocellulose; rubber-like high-molecular compounds, such as an SBR (styrene butadiene rubber), an NBR (acrylonitrile-butadiene rubber), a fluorine rubber, an isoprene rubber, a butadiene rubber, and an ethylene-propylene rubber; a styrene-butadiene-styrene block copolymer and a hydrogenated styrene-butadiene-styrene block copolymer; thermoplastic elastomer-like high-molecular compounds, such as an EPDM (ethylene-propylene-diene terpolymer), a styrene-ethylene-butadiene-ethylene copolymer, a styrene-isoprene-styrene block copolymer, and the hydrogenated products thereof; soft resinous high-molecular compounds, such as syndiotactic-1,2-polybutadiene, polyvinyl acetate, an ethylene-vinyl acetate copolymer, and a propylene-α-olefin copolymer; fluorine-based high-molecular compounds, such as polyvinylidene fluoride (PVdF), polytetrafluoroethylene, fluorinated polyvinylidene fluoride, and a polytetrafluoroethylene-ethylene copolymer; and high-molecular compositions conductive to alkali metal ions (in particular, lithium ions). The above substances may be used alone. Alternatively, two or more types of the above substances may be used in any combination and ratio.

The proportion of the binding agent in the positive electrode active material layer is normally 0.1% by mass or more, is preferably 1% by mass or more, and is further preferably 1.5% by mass or more; and as for the upper limit, is normally 80% by mass or less, is preferably 60% by mass or less, is further preferably 40% by mass or less, and is most preferably 10% by mass or less. If the proportion of the binding agent is excessively low, the positive electrode active material may fail to be retained in a sufficient manner and consequently, the positive electrode may fail to have a sufficiently high mechanical strength. In such a case, the battery performance, such as cycle characteristics, may become degraded. On the other hand, if the above proportion is excessively large, the battery capacity and electrical conductivity may be reduced.

(Current Collector)

The material constituting the positive electrode current collector is not limited; known materials may be used. Specific examples thereof include metal materials, such as aluminum, stainless steel, nickel-plated, titanium, and tantalum; and carbon materials, such as carbon cloth and carbon paper. Among these, metal materials are preferable. Aluminum are particularly preferable.

(Electrode Area)

In the case where the electrolytic solution according to the present invention is used, the area of the positive electrode active material layer is preferably set to be larger than the area of the outer surface of the package casing of the battery in order to enhance the stability under a high-output high-temperature condition. Specifically, the area ratio of the total area of the positive electrode to the surface area of the package of the secondary battery is preferably 15 times or more and is more preferably 40 times or more. In the case where the package casing has a rectangular shape with a bottom, the area of the outer surface of the package casing is the total area calculated from the height, width, and thickness of a casing portion excluding the protrusions serving as terminals, in which electric power generating components are charged. In the case where the package casing has a cylindrical shape with a bottom, the area of the outer surface of the package casing is the geometric surface area of a cylinder that resembles, in shape, the casing portion excluding the protrusions serving as terminals, in which electric power generating components are charged. The total area of the positive electrode is the geometric surface area of the positive electrode mixture layer arranged to face the mixture layer including the negative electrode active material. In the case where the positive electrode mixture layer is disposed on both sides of the current collector foil, the total area of the positive electrode is the total sum of the areas of the surfaces of the positive electrode mixture layers which are calculated individually.

(Thickness of Positive Electrode Plate)

The thickness of the positive electrode plate is not limited. The thickness of the mixture layer which excludes the thickness of the metal foil used as a core is, as for the lower limit, preferably 10 µm or more and is more preferably 20 µm or more; and as for the upper limit, is preferably 500 µm or less and is more preferably 450 µm or less per side of the current collector in order to increase capacity and output.

(Coating of Surface of Positive Electrode Plate)

A substance having a composition different from the composition of the positive electrode plate may be deposited on the surface of the positive electrode plate. Examples of the surface-deposited substance include oxides, such as aluminum oxide, silicon oxide, titanium oxide, zirconium oxide, magnesium oxide, calcium oxide, boron oxide, antimony oxide, and bismuth oxide; sulfate salts, such as lithium sulfate, sodium sulfate, potassium sulfate, magnesium sulfate, calcium sulfate, and aluminum sulfate; carbonate salts, such as lithium carbonate, calcium carbonate, and magnesium carbonate; and carbon.

2-1-5. Separator

A separator is commonly interposed between the positive and negative electrodes in order to prevent short circuit. In this case, the separator is commonly impregnated with the electrolytic solution according to the present invention.

The material constituting the separator and the shape of the separator are not limited; known separators which do not significantly impair the advantageous effects of the present invention may be used. Among these, a resin, a glass fiber, an inorganic substance, and the like composed of a material stable toward the electrolytic solution according to the present invention may be used. It is preferable to use a separator having the shape of a porous sheet, a nonwoven fabric, or the like, which has a high liquid-retaining capacity.

Examples of the material constituting the resin and glass fiber separators include polyolefins, such as polyethylene and polypropylene; and aromatic polyamide, polytetrafluoroethylene, polyethersulfone, and a glass filter. Among these, a glass filter and polyolefins are preferable. Polyolefins are further preferable. Polypropylene is particularly preferable. The above materials may be used alone. Alternatively, two or more types of the materials may be used in any combination and ratio and may be stacked on top of one another. Specific examples of a separator constituted by two or more materials used in an appropriate combination and stacked on top of one another include a three-layer separator constituted by a polypropylene layer, a polyethylene layer, and a polypropylene layer stacked on top of one another in this order.

The thickness of the separator is not limited; is normally 1 μm or more, is preferably 5 μm or more, and is further preferably 8 μm or more; and is normally 50 μm or less, is preferably 40 μm or less, and is further preferably 30 μm or less. When the above thickness falls within the above range, insulating property and mechanical strength may be maintained while the battery performance, such as rate characteristics, and energy density are maintained.

In the case where a porous separator, such as a porous sheet or a nonwoven fabric, is used, the porosity of the separator is not limited; is normally 20% or more, is preferably 35% or more, and is further preferably 45% or more; and is normally 90% or less, is preferably 85% or less, and is further preferably 75% or less. When the above porosity falls within the above range, insulating property and mechanical strength may be maintained, while the membrane resistance is reduced and suitable rate characteristics are achieved.

The average pore size of the separator is also not limited; is normally 0.5 μm or less and is preferably 0.2 μm or less; and is normally 0.05 μm or more. If the average pore size exceeds the above range, the risk of short circuit is increased. When the average pore size falls within the above range, the occurrence of short circuit may be reduced, while the membrane resistance is reduced and suitable rate characteristics are achieved. Examples of the inorganic material include oxides, such as alumina and silicon dioxide; nitrides, such as aluminum nitride and silicon nitride; and sulfate salts, such as barium sulfate and calcium sulfate. The above inorganic materials are used in the form of particles or fibers.

As for the shape of the separator, a separator having the shape of a thin-film, such as a nonwoven fabric, a woven fabric, or a microporous film, may be used. When the separator has the shape of a thin-film, a separator having a pore size of 0.01 to 1 μm and a thickness of 5 to 50 μm is suitably used. In addition to the separator having the shape of an independent thin-film, a separator produced by forming a composite porous layer including particles of the inorganic material on the surface layers of the positive electrode and/or the negative electrode using a resin binding agent may also be used. For example, a porous layer including alumina particles having a 90% particle size of less than 1 μm may be formed on both surfaces of the positive electrode using a fluororesin as a binding agent.

2-1-6. Battery Design

<Electrode Group>

The electrode group may be either an electrode group having a multilayer structure including the positive and negative electrode plates and the separator interposed therebetween or an electrode group having a structure formed by winding the positive and negative electrode plates and the separator interposed therebetween in a spiral form. The proportion of the mass of the electrode group to the volume of the battery (hereinafter, this proportion is referred to as "electrode group occupancy") is normally 40% or more and is preferably 50% or more; and is normally 90% or less and is preferably 80% or less. When the electrode group occupancy falls within the above range, the battery capacity may be maintained while the degradation of charge-discharge cycle characteristics and battery characteristics, such as storage at high temperatures, which may be caused due to an increase in inside pressure, is limited. Furthermore, the activation of the gas release valve may be prevented.

<Current Collection Structure>

The current collection structure is not limited. It is preferable to form a current collection structure that reduces the resistances of wire portions and joint portions. In the case where the electrode group has the above multilayer structure, a structure in which the metal cores of the respective electrode layers are welded to the terminal in a bundle is suitably used. In the case where the area of each electrode is large, internal resistance is increased accordingly. Therefore, in such a case, it is suitable to form plural terminals in each electrode in order to reduce resistance. In the case where the electrode group has the above wound structure, the internal resistance may be reduced by forming plural lead structures in each of the positive and negative electrodes and connecting the lead structures to the terminal in a bundle.

<Package Casing>

The material constituting the package casing is not limited and may be any substance stable toward the nonaqueous electrolytic solution used. Specific examples thereof include metals, such as a nickel-plated steel sheet, stainless steel, aluminum, an aluminum alloy, and a magnesium alloy; and a laminated film including a resin and an aluminum foil. Metals, such as aluminum and an aluminum alloy, and a laminated film are suitably used from the viewpoint of weight reduction.

Examples of the package casing composed of a metal include a package casing having a hermetically sealed structure formed by welding metals by laser welding, resistance welding, or ultrasonic welding; and a package casing having a structure caulked using the metals with a resin gasket. Examples of the package casing composed of a laminated film include a package casing having a hermetically sealed structure formed by bonding resin layers to one another by thermal fusion. In order to enhance sealing performance, a resin different from the resin included in the laminated film may be interposed between the resin layers. Since a metal and a resin need to be bonded to each other particularly when the sealed structure is formed by bonding the resin layers to each other by thermal fusion with a current collection terminal interposed therebetween, the resin interposed between the resin layers is suitably a resin including a polar group or a modified resin to which a polar group has been introduced. The shape of the package is also not limited and may be any of cylindrical, rectangular, laminated film-shaped, coin-shaped, large-sized, etc.

<Protection Device>

For example, a PTC (positive temperature coefficient), a temperature fuse, and a thermistor, the resistance of which increases upon anomalous heat being generated or an excessively large current being passed through the device; and a valve (current limiting valve) that interrupts the current passing through the circuit upon the pressure or temperature inside the battery being rapidly increased when anomalous heat is generated may be used as a protection device. It is preferable to select a protection device that does not operate in ordinary use at high currents. It is more preferable to design the battery such that any of the generation of anomalous heat and thermal runaway does not occur even without the protection device.

2-2. Polyvalent Cation Battery

An oxide material or the like is used as a positive electrode. Metals, such as magnesium, calcium, and aluminum, compounds including the metals, and the like are used as a negative electrode. As an electrolyte, a nonaqueous electrolytic solution prepared by dissolving a magnesium salt, a calcium salt, an aluminum salt, or the like in a nonaqueous solvent is used in order to give an element the same as the element included in the active material that reacts on the negative electrode, that is, a magnesium ion, a calcium ion, or an aluminum ion. A nonaqueous electrolytic solution for polyvalent cation batteries may be prepared by dissolving the compound represented by Formula (1) in the nonaqueous electrolytic solution.

2-3. Metal-Air Battery

Metals, such as zinc, lithium, sodium, magnesium, aluminum, and calcium, compounds including the metals, and the like are used as a negative electrode. Since the positive electrode active material is oxygen, the positive electrode is a porous gas-diffusion electrode. The porous material is preferably carbon. As an electrolyte, a nonaqueous electrolytic solution prepared by dissolving a lithium salt, a sodium salt, a magnesium salt, an aluminum salt, a calcium salt, or the like in a nonaqueous solvent is used in order to give an element the same as the element included in the negative electrode active material, that is, lithium, sodium, magnesium, aluminum, calcium, or the like. A nonaqueous electrolytic solution for metal-air batteries may be prepared by dissolving the compound represented by Formula (1) in the nonaqueous electrolytic solution.

2-4. Secondary Battery Including S-Block Metal Other than the Above Secondary Batteries The s-block elements are Group 1 elements (hydrogen and alkali metals), Group 2 elements (beryllium, magnesium, and alkaline-earth metals), and helium. The term "s-block metal secondary battery" used herein refers to a secondary battery that includes the s-block metal as a negative electrode and/or an electrolyte. Specific examples of the s-block metal secondary battery other than the above secondary batteries include a lithium-sulfur battery and a sodium-sulfur battery, which include a positive electrode including sulfur; and a sodium ion battery.

2-5. Lithium Ion Capacitor

A material capable of forming an electric double-layer is used as a positive electrode. A material capable of occluding and releasing lithium ions is used as a negative electrode. The material constituting the positive electrode is preferably active carbon. The material constituting the negative electrode is preferably a carbonaceous material. A nonaqueous electrolytic solution including the compound represented by Formula (1) is used as a nonaqueous electrolytic solution.

2-6. Electric Double-Layer Capacitor A material capable of forming an electric double-layer is used as positive and negative electrodes. The material constituting the positive and negative electrodes is preferably active carbon. A nonaqueous electrolytic solution including the compound represented by Formula (1) is used as a nonaqueous electrolytic solution.

EXAMPLES

The present invention is described more specifically with reference to Examples and Comparative examples below. The present invention is not limited to Examples below.

The structures of the compounds represented by Formula (1) used in Examples are described below.

[Chem. 33]

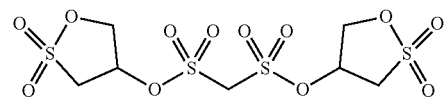

(Compound (1-1))

Substituents in Formula (1) $R^1$ to $R^5$=H, X=S, Y=CH$_2$, l=0, m=2, n=1, and k=2

[Chem. 34]

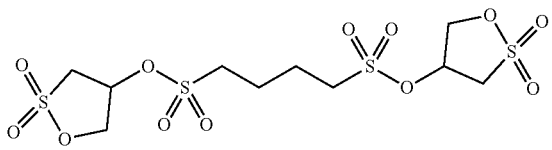

(Compound (1-2))

Substituents in Formula (1): $R^1$ to $R^5$=H, X=S, Y=C$_4$H$_8$, l=0, m=2, n=1, and k=2

[Chem. 35]

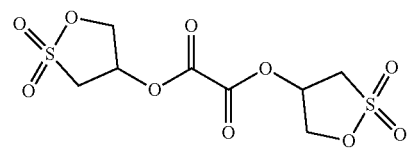

(Compound (1-3))

Substituents in Formula (1) $R^1$ to $R^5$=H, X=C, Y=None, l=0, m=1, n=1, and k=2

[Chem. 36]

(Compound (1-4))

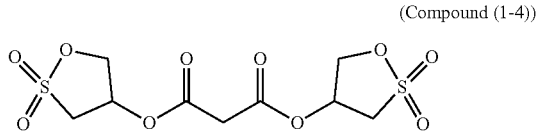

(Compound (1-4))
Substituents in Formula (1) $R^1$ to $R^5$=H, X=C, Y=$CH_2$, l=0, m=1, n=1, and k=2

[Chem. 37]

(Compound (1-5))

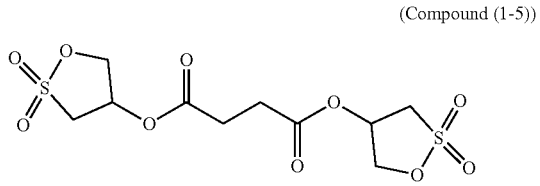

Substituents in Formula (1) $R^1$ to $R^5$=H, X=C, Y=$C_2H_4$, l=0, m=1, n=1, and k=2

[Chem. 38]

(Compound 1-6))

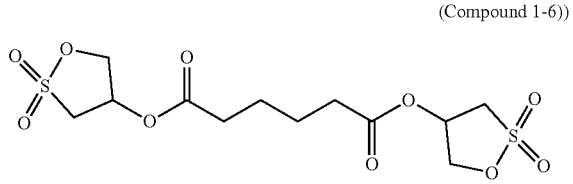

Substituents in Formula (1): $R^1$ to $R^5$=H, X=C, Y=$C_4H_8$, l=0, m=1, n=1, and k=2

[Chem. 39]

(Compound 1-7))

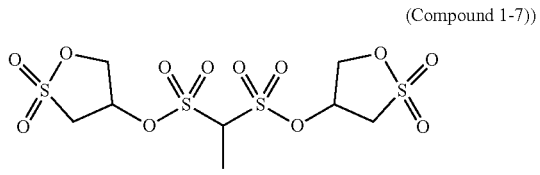

Substituents in Formula (1) $R^1$ to $R^5$=H, X=S, Y=$C_2H_4$, l=0, m=2, n=1, and k=2

[Chem. 40]

(Compound 1-8))

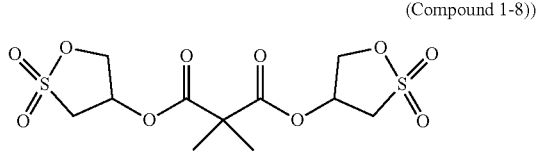

Substituents in Formula (1) $R^1$ to $R^5$=H, X=C, Y=$C_3H_6$, l=0, m=1, n=1, and k=2

The structure of the other compound used is described below.

[Chem. 41]

(Compound A-1))

1,3-Propanesultone

The methods for synthesizing the compounds (1-1) to (1-8) are specifically described below. The present invention is not limited to Synthesis examples below.

Synthesis Example 1

<Synthesis of Compound (1-1)>

In a nitrogen atmosphere, 1.0 g (7.2 mmol) of 2-hydroxy-1,3-propanesultone was charged into a 50-ml three-necked flask and then dissolved in 20 ml of THF. The resulting solution was cooled to less than 10° C. with an ice bath. Subsequently, 0.76 g (3.5 mmol) of methanedisulphonyl dichloride/5 ml of THE was added to the solution. Then, a 0.81 g (8.0 mmol) of triethylamine/10 ml of THE solution was slowly added dropwise to the solution such that the internal temperature did not exceed 10° C. After stirring had been performed for 2 hours at less than 5° C., 20 ml of water was added to the solution. Then, extraction was performed 3 times with 20 ml of dichloromethane. The resulting organic layer was concentrated until the precipitation of a white solid was confirmed. The white solid was recovered by performing filtration under reduced pressure and then dried in vacuum. Hereby, 0.38 g of a compound (1-1) was prepared with a yield of 25.9% in the form of a white solid.

$^1$H-NMR (DMSO-d6, 400 MHz): 6.37 (s, 2H), 5.94-5.92 (m, 2H), 4.81-4.77 (m, 2H), 4.73-4.70 (m, 2H), 4.06-4.01 (m, 2H), 3.93-3.89 (m, 2H). MS(ESI): m/z 414.9 (M–H)$^-$.

Synthesis Example 2

<Synthesis of Compound (1-2)>

In a nitrogen atmosphere, 2.17 g (15.7 mmol) of 2-hydroxy-1,3-propanesultone was charged into a 100-ml three-necked flask and then dissolved in 30 ml of THF. The resulting solution was cooled to less than 10° C. with an ice bath. Subsequently, 2.4 ml (17.2 mmol) of triethylamine was added to the solution. Then, a 2.0 g (7.8 mmol) of 1,4-butanedisulfonyl dichloride/20 ml of THE solution was slowly added dropwise to the solution while the internal temperature was controlled not to exceed 10° C. After the addition, stirring was performed for 2 hours at less than 10° C. To the stirred solution, 30 ml of ethyl acetate/20 ml of water was added and stirring was performed. The resulting insoluble white solid was recovered by performing filtration under reduced pressure. The filtrate was also concentrated, and the precipitated white solid was recovered by performing filtration under reduced pressure. In total, 1.26 g of the white solid was obtained. This solid was suspended in 10 ml of methanol and washed for 1 hour. Subsequently, the white solid was recovered by performing filtration under reduced pressure and then dried in vacuum. Hereby, 1.26 g of a compound (1-2) was prepared with a yield of 35.7% in the form of a white solid.

$^1$H-NMR (DMSO-d6, 400 MHz): 5.73-5.69 (m, 2H), 4.76-4.73 (m, 2H), 4.70-4.66 (m, 2H), 3.99-3.94 (m, 2H), 3.90-3.85 (m, 2H), 3.60-3.57 (m, 4H), 1.87-1.84 (m, 4H). MS(DCI): m/z 459.0 (M+H)$^+$.

Synthesis Example 3

<Synthesis of Compound (1-3)>

In a nitrogen atmosphere, 1.0 g (7.2 mmol) of 2-hydroxy-1,3-propanesultone was charged into a 100-ml three-necked flask. To the flask, 35 ml of dichloromethane was added. The resulting solution was cooled to less than 10° C. with an ice bath. Subsequently, 0.81 g (8.0 mmol) of triethylamine/5 ml of dichloromethane was added to the solution while stirring was performed. Then, 0.45 g (3.5 mmol) of oxalyl chloride/5 ml of dichloromethane was slowly added dropwise to the solution such that the internal temperature did not exceed 10° C. Subsequently, stirring was performed for 5 hours at room temperature. The reaction solution containing a white solid was filtered. The resulting solid was washed with water. Hereby, 0.4 g of a compound (1-3) was prepared with a yield of 34.2% in the form of a white solid.

$^1$H-NMR (DMSO-d6, 400 MHz): 5.84-5.81 (m, 2H), 4.75-4.71 (m, 2H), 4.68-4.65 (m, 2H), 4.01-3.96 (m, 2H), 3.81-3.76 (m, 2H). MS(DCI): m/z 331.0 (M+H)$^+$.

Synthesis Example 4

<Synthesis of Compound (1-4)>

In a nitrogen atmosphere, 1.0 g (7.2 mmol) of 2-hydroxy-1,3-propanesultone was charged into a 50-ml three-necked flask. To the flask, 2 ml THF/20 ml of dichloromethane was added. The resulting solution was stirred. The solution was cooled to less than 10° C. with an ice bath. Then, a 0.5 g (3.5 mmol) of malonyl chloride/5 ml of dichloromethane solution was added to the solution at a time. Subsequently, a 0.81 g (8.0 mmol) of triethylamine/5 ml of dichloromethane solution was slowly added dropwise to the solution such that the internal temperature did not exceed 10° C. The temperature was gradually increased to room temperature and stirring was performed for 3 hours. Subsequently, the reaction solution was washed with water and then with brine. Then, drying was performed using anhydrous sodium sulfate. The resulting organic layer was concentrated until the precipitation of a white solid was confirmed. The white solid was recovered by performing filtration under reduced pressure and then dried in vacuum. Hereby, 0.34 g of a compound (1-4) was prepared with a yield of 27.8% in the form of a white solid.

$^1$H-NMR (DMSO-d6, 400 MHz): 5.75-5.72 (m, 2H), 4.71-4.67 (m, 2H), 4.58-4.54 (m, 2H), 3.92-3.86 (m, 2H), 3.71-3.65 (m, 2H), 3.66 (s, 2H). MS(ESI): m/z 343.0 (M−H)$^−$.

Synthesis Example 5

<Synthesis of Compound (1-5)>

In a nitrogen atmosphere, 1.0 g (7.2 mmol) of 2-hydroxy-1,3-propanesultone was charged into a 50-ml three-necked flask. To the flask, 2 ml THF/20 ml of dichloromethane was added. The resulting solution was stirred. The solution was cooled to less than 10° C. with an ice bath. Then, a 0.55 g (3.5 mmol) of succinyl chloride/5 ml of dichloromethane solution was added to the solution at a time. Subsequently, a 0.81 g (8.0 mmol) of triethylamine/5 ml of dichloromethane solution was slowly added dropwise to the solution such that the internal temperature did not exceed 10° C. Then, stirring was performed for 2 hours at less than 5° C. To the stirred solution, 20 ml of water was added. Subsequently, extraction was performed 3 times with 20 ml of dichloromethane. The resulting organic layer was dried using Na$_2$SO$_4$, followed by filtration and concentration. The resulting solid was purified in a column. Hereby, 0.42 g of a compound (1-5) was prepared with a yield of 33.0% in the form of a light yellow solid.

$^1$H-NMR (DMSO-d6, 400 MHz): 5.69-5.65 (m, 2H), 4.69-4.65 (m, 2H), 4.55-4.52 (m, 2H), 3.89-3.83 (m, 2H), 3.67-3.62 (m, 2H), 2.65 (s, 4H). MS(ESI): m/z 357.0 (M−H)$^−$.

Synthesis Example 6

<Synthesis of Compound (1-6)>

In a nitrogen atmosphere, 2.0 g (14.5 mmol) of 2-hydroxy-1,3-propanesultone was charged into a 100-ml three-necked flask. To the flask, 40 ml of THF was added. The resulting solution was stirred. The solution was cooled to less than 10° C. with an ice bath. Then, a 1.3 g (7.1 mmol) of adipoyl chloride/5 ml of THF solution was added to the solution at a time. Subsequently, a 1.61 g (15.9 mmol) of triethylamine/10 ml solution was slowly added dropwise to the solution such that the internal temperature did not exceed 10° C. Then, stirring was performed for 2 hours at less than 5° C. To the stirred solution, 20 ml of water was added. Subsequently, extraction was performed 3 times with 20 ml of ethyl acetate. The resulting organic layer was dried using Na$_2$SO$_4$, followed by filtration and concentration. The resulting organic layer was concentrated until the precipitation of a white solid was confirmed. The white solid was recovered by performing filtration under reduced pressure and then dried in vacuum. Hereby, 0.45 g of a compound (1-6) was prepared with a yield of 16.4% in the form of a white solid.

$^1$H-NMR (DMSO-d6, 400 MHz): 5.68-5.64 (m, 2H), 4.69-4.65 (m, 2H), 4.55-4.52 (m, 2H), 3.88-3.83 (m, 2H), 3.68-3.64 (m, 2H), 2.39-2.36 (m, 4H), 1.58-1.55 (m, 4H). MS(DCI): m/z 387.0 (M+H)$^+$.

Synthesis Example 7

<Synthesis of Compound (1-7)>

In a nitrogen atmosphere, 1.92 g (13.9 mmol) of 2-hydroxy-1,3-propanesultone was charged into a 100-ml three-necked flask and then dissolved in 10 ml of THF. The resulting solution was cooled to less than 10° C. with an ice bath. Subsequently, a 1.5 g (6.6 mmol) of 1,1-ethanedisulphonyl dichloride/10 ml of THF solution was added to the solution. Then, a 1.47 g (14.5 mmol) of triethylamine/5 ml of THF solution was slowly added dropwise to the solution while the internal temperature was controlled not to exceed 10° C. After the addition, stirring was performed for 2 hours at less than 10° C. To the stirred solution, 20 ml of water was added and stirring was performed. Subsequently, extraction was performed 3 times with 30 ml of ethyl acetate. The resulting organic layer was concentrated. Methanol was added to the organic layer to precipitate a white solid. The white solid was recovered by performing filtration under reduced pressure and then dried in vacuum. Hereby, 0.14 g of a compound (1-7) was prepared with a yield of 4.9%.

$^1$H-NMR (DMSO-d6, 400 MHz): 6.28-6.23 (m, 1H), 5.90-5.87 (m, 2H), 4.81-4.71 (m, 4H), 4.05-3.91 (m, 4H), 1.81-1.79 (m, 3H). MS(ESI): m/z 428.9 (M−H)$^−$.

Synthesis Example 8

<Synthesis of Compound (1-8)>

In a nitrogen atmosphere, 1.8 g (13.0 mmol) of 2-hydroxy-1,3-propanesultone was charged into a 50-ml three-necked flask. To the flask, 10 ml of THF was added and stirring was performed. The resulting solution was cooled to less than 10° C. with an ice bath. Subsequently, 1.32 g (13.0 mmol) of triethylamine/5 ml of THF was added to the solution. Then, a 1.0 g (5.9 mmol) of dimethylmalonyl dichloride/5 ml of THF solution was slowly added dropwise to the solution such that the internal temperature did not exceed 10° C. Subsequently, stirring was performed for 2 hours at less than 5° C. To the stirred solution, 20 ml of water was added. Subsequently, extraction was performed 3 times with 20 ml of ethyl acetate. The resulting organic layer was concentrated. Methanol was added to the organic layer to form a white solid. The white solid was recovered by performing filtration under reduced pressure and then dried in vacuum. Hereby, 1.30 g of a compound (1-8) was prepared with a yield of 59.0% in the form of a white solid.

$^1$H-NMR (CDCl$_3$, 400 MHz): 5.68-5.64 (m, 2H), 4.68-4.64 (m, 2H), 4.54-4.50 (m, 2H), 3.59-3.53 (m, 2H), 3.46-3.38 (m, 2H), 1.51 (s, 6H). MS(ESI): m/z 373.0 (M+H)*.

Examples 1-1 to 1-6 and Comparative Example 1-1

Example 1-1

[Preparation of Nonaqueous Electrolytic Solution]

In a dry argon atmosphere, LiPF$_6$ used as an electrolyte was dissolved in a mixed solvent including ethylene carbonate (EC), ethyl methyl carbonate (EMC), and diethyl carbonate (DEC) (volume mixing ratio EC:EMC:DEC=3:4:3) in a proportion of 1.2 mol/L. To the resulting solution, 2.0% by mass of vinylene carbonate (VC) and 2.0% by mass of monofluoroethylene carbonate (MFEC) were added to prepare a fundamental electrolytic solution. To the fundamental electrolytic solution, 0.85% by mass of the compound (1-1) was added to prepare a nonaqueous electrolytic solution of Example 1-1.

[Preparation of Positive Electrode]

In an N-methylpyrrolidone solvent, 97% by mass of lithium cobalt oxide (LiCoO$_2$) used as a positive electrode active material, 1.5% by mass of acetylene black used as a conductant agent, and 1.5% by mass of polyvinylidene fluoride (PVdF) used as a binder were mixed with a disperser to form a slurry. The slurry was uniformly applied onto both surfaces of an aluminum foil having a thickness of 15 μm. The resulting coating layers were dried and subsequently pressed. Hereby, a positive electrode was prepared.

[Preparation of Negative Electrode]

A natural graphite powder used as a negative electrode active material, an aqueous dispersion of sodium carboxymethyl cellulose (concentration of sodium carboxymethyl cellulose: 1 mass %) used as a thickener, and an aqueous dispersion of a styrene butadiene rubber (concentration of styrene butadiene rubber: 50 mass %) used as a binder were mixed with one another with a disperser to form a slurry. The slurry was uniformly applied onto one of the surfaces of a copper foil having a thickness of 10 m. The resulting coating layer was dried and subsequently pressed. Hereby, a negative electrode was prepared. The negative electrode was prepared such that the mass ratio of Natural graphite:Sodium carboxymethyl cellulose:Styrene butadiene rubber in the dried negative electrode was 98:1:1.

[Preparation of Lithium Secondary Battery]

The positive electrode, the negative electrode, and a separator composed of polypropylene were stacked on top of one another in the order of negative electrode, separator, positive electrode, separator, and negative electrode to form a battery element. The battery element was inserted into a package that was a laminated film formed by coating both surface of an aluminum film (thickness: 40 μm) with a resin layer, such that the terminals of the positive and negative electrodes were protruded from the package. Subsequently, the nonaqueous electrolytic solution was charged into the package, which was then vacuum sealed. Hereby, a sheet-like lithium secondary battery was prepared.

[Evaluation of Initial Battery Characteristics]

While the lithium secondary battery was sandwiched between glass plates and pressurized by the glass plates, it was charged for 6 hours at a constant current corresponding to 0.05 C and subsequently discharged to 3.0 V at a constant current of 0.2 C at 25° C. After the lithium secondary battery had been again charged to 4.1 V at a current corresponding to 0.2 C by constant current-constant voltage charging (referred to also as "CC-CV charging")(0.05 C cutoff), it was left to stand at 45° C. for 72 hours. Then, the lithium secondary battery was discharged to 3.0 V at a constant current of 0.2 C. After the lithium secondary battery had been again charged to 4.4 V at 0.2 C by CC-CV charging (0.05 C cutoff), it was again discharged to 3.0 V at 0.2 C. Thus, the initial battery characteristics were stabilized. Note that the term "1 C" refers to a current at which the reference capacity of the battery can be discharged within 1 hour. For example, "0.2 C" refers to a current that is ⅕ of the 1 C current.

[High-Temperature Cycle Capacity Retention Factor Evaluation Test]

The lithium secondary battery that had been evaluated in terms of initial battery characteristics was subjected to a charge-discharge cycle in which it was charged to 4.4 V at a constant current of 0.2 C and subsequently discharged to 3.0 V at a constant current of 0.2 C at 60° C. The discharge capacity of the lithium secondary battery measured in this cycle is referred to as "cycle initial capacity". Subsequently, the lithium secondary battery was subjected to a charge-discharge cycle in which it was charged to 4.4 V at a constant current of 1 C and subsequently discharged to 3.0 V at a constant current of 1 C. The charge-discharge cycle was repeated 500 times. Then, the lithium secondary battery was subjected to a charge-discharge cycle in which it was charged to 4.4 V at a constant current of 0.2 C and subsequently discharged to 3.0 V at a constant current of 0.2 C. The discharge capacity of the lithium secondary battery measured in this cycle is referred to as "discharge capacity after 500 cycles". The ratio of the discharge capacity after 500 cycles to the cycle initial capacity is referred to as "cycle capacity retention factor" (%). Table 1 shows the evaluation results in relative values with the results of Comparative example 1-1 being 100.0%. The same applies hereinafter.

[Evaluation of Increase in Resistance]

The lithium secondary battery that had been evaluated in terms of initial battery characteristics was charged to 4.4 V at 0.2 C by CC-CV charging (0.05 C cutoff). Subsequently, the lithium secondary battery was transferred to a thermostat set at 0° C. The alternating current impedance of the lithium secondary battery was measured at frequencies of 20 kHz to 0.01 Hz. A Bode plot was drawn with the vertical axis representing imaginary part and the horizontal axis representing frequency. The absolute value of the peak top was considered as initial resistance. Then, the battery was subjected to the cycle capacity retention factor evaluation test for 400 cycles and, subsequently, the alternating current impedance of the battery was measured as described above. The absolute value of the peak top was considered as resistance after cycles. The ratio of the resistance after cycles to the initial resistance is referred to as "increase in resistance" (%). Table 1 shows the evaluation results in relative values with the results of Comparative example 1-1 being 100.0%. The same applies hereinafter. Table 1 summarizes the evaluation results.

Example 1-2

A lithium secondary battery was prepared as in Example 1-1, except that, instead of the compound (1-1), 0.94% by mass of the compound (1-2) was added to the electrolytic solution prepared in Example 1-1, and subjected to the above evaluations. Note that the amount of substance of the compound (1-1) used in Example 1-1 is equal to the amount of substance of the compound (1-2) used in Example 1-2.

Example 1-3

A lithium secondary battery was prepared as in Example 1-1, except that, instead of the compound (1-1), 0.68% by mass of the compound (1-3) was added to the electrolytic solution prepared in Example 1-1, and subjected to the above evaluations. Note that the amount of substance of the compound (1-1) used in Example 1-1 is equal to the amount of substance of the compound (1-3) used in Example 1-3.

Example 1-41

A lithium secondary battery was prepared as in Example 1-1, except that, instead of the compound (1-1), 0.71% by mass of the compound (1-4) was added to the electrolytic solution prepared in Example 1-1, and subjected to the above evaluations. Note that the amount of substance of the compound (1-1) used in Example 1-1 is equal to the amount of substance of the compound (1-4) used in Example 1-4.

Example 1-5

A lithium secondary battery was prepared as in Example 1-1, except that, instead of the compound (1-1), 0.73% by mass of the compound (1-5) was added to the electrolytic solution prepared in Example 1-1, and subjected to the above evaluations. Note that the amount of substance of the compound (1-1) used in Example 1-1 is equal to the amount of substance of the compound (1-5) used in Example 1-5.

Example 1-6

A lithium secondary battery was prepared as in Example 1-1, except that, instead of the compound (1-1), 0.79% by mass of the compound (1-6) was added to the electrolytic solution prepared in Example 1-1, and subjected to the above evaluations. Note that the amount of substance of the compound (1-1) used in Example 1-1 is equal to the amount of substance of the compound (1-6) used in Example 1-6.

Comparative Example 1-11

A lithium secondary battery was prepared as in Example 1-1, except that the electrolytic solution prepared in Example 1-1 did not contain the compound (1-1), and subjected to the above evaluations.

TABLE 1

| | Additive | Cycle capacity retention factor (%) | Increase in resistance (%) |
|---|---|---|---|
| Example 1-1 | Compound (1-1) 0.85 mass % | 122.5 | 67.7 |
| Example 1-2 | Compound (1-2) 0.94 mass % | 125.8 | 61.4 |
| Example 1-3 | Compound (1-3) 0.68 mass % | 112.2 | 46.8 |
| Example 1-4 | Compound (1-4) 0.71 mass % | 112.0 | 73.4 |
| Example 1-5 | Compound (1-5) 0.73 mass % | 119.7 | 67.1 |
| Example 1-6 | Compound (1-6) 0.79 mass % | 120.0 | 77.8 |
| Comparative example 1-1 | — | 100.0 | 100.0 |

The results shown in Table 1 confirm that using the nonaqueous electrolytic solutions of Examples 1-1 to 1-6 according to the present invention increased the cycle capacity retention factor and limited an increase in resistance compared with the case (Comparative example 1-1) where the compound represented by Formula (1) was not used. That is, excellent batteries were prepared. Specifically, it was suggested that the addition of the compound represented by Formula (1) increases the thermal stability of the coating film deposited on the negative electrode, thereby suppresses the electrochemical side reaction that occurs on the electrode, and enables the production of a stable battery the resistance of which does not vary significantly during the cycle test period. It is clear that batteries including the electrolytic solution according to the present invention have superior characteristics.

Examples 2-1 and 2-2 and Comparative Examples 2-1 and 2-2

Example 2-11

[Preparation of Nonaqueous Electrolytic Solution]
A nonaqueous electrolytic solution was prepared as in Example 1-2.
[Preparation of Positive Electrode]
A positive electrode was prepared as in Example 1-1.
[Preparation of Negative Electrode]
A negative electrode was prepared as in Example 1-1.
[Preparation of Lithium Secondary Battery]
A lithium secondary battery was prepared as in Example 1-1.
[Evaluation of Initial Battery Characteristics]
The evaluation was made as in Example 1-1.
[High-Temperature Continuous-Charging Endurance Test (Continuous Charge Capacity, Amount of Continuous Charge Gas, and Discharge Capacity After Continuous Charge)]
The lithium secondary battery that had been evaluated in terms of initial battery characteristics was charged to 4.4 V at 0.2 C by CC-CV charging (0.05 C cutoff) at 25° C. Subsequently, the lithium secondary battery was immersed in an ethanol bath. The initial volume of the battery was calculated on the basis of the buoyancy force measured. Then, the lithium secondary battery was charged for 14 days at a constant voltage of 4.4 V at 60° C. The charge current capacity measured in the constant-voltage charging is referred to as "continuous charge capacity". After the battery had been cooled to a sufficient degree, the battery was immersed in an ethanol bath in order to measure the volume of the battery. The change from the initial volume of the battery is referred to as amount of continuous charge gas. Subsequently, the battery was discharged to 3.0 V at a constant current of 0.2 C at 25° C. Then, the battery was charged to 4.4 V at 0.2 C by CC-CV charging (0.05 C cutoff) at 25° C. Subsequently, the battery was again discharged to 3.0 V at 0.05 C. This is referred to as "discharge capacity after continuous charge".

The continuous charge capacity reflects the amount of electrochemical side reaction that occurred on the electrode during the high-temperature continuous-charging endurance test. Specifically, the smaller the continuous charge capacity, the higher the degree of suppression of the electrochemical side reaction that occurred on the electrode during the continuous-charging endurance test. Table 2 shows the evaluation results in relative values with the results of Comparative example 2-1 being 100.0%. The same applies hereinafter.

Example 2-21

A lithium secondary battery was prepared as in Example 2-1, except that the content of the compound (1-2) in the electrolytic solution prepared in Example 2-1 was changed to 0.47% by mass, and subjected to the above evaluations. Note that the amount of substance of the compound (1-2) used in Example 2-2 is half the amount of substance of the compound (1-2) used in Example 2-1.

Comparative Example 2-1

A lithium secondary battery was prepared as in Example 2-1, except that the electrolytic solution prepared in Example 2-1 did not contain the compound (1-2), and subjected to the above evaluations.

Comparative Example 2-2

A lithium secondary battery was prepared as in Example 2-1, except that, instead of the compound (1-2), 0.50% by mass of the compound (A-1) was added to the electrolytic solution prepared in Example 2-1, and subjected to the above evaluations. Note that the amount of substance of the compound (A-1) used in Comparative example 2-2 is double the amount of substance of the compound (1-2) used in Example 2-1.

TABLE 2

| | Additive | Continuous charge capacity/% | Amount of continuous charge gas/% | Discharge capacity after continuous charge/% |
|---|---|---|---|---|
| Example 2-1 | Compound (1-2) 0.94 mass % | 80.7 | 50.1 | 106.3 |
| Example 2-2 | Compound (1-2) 0.47 mass % | 79.0 | 56.2 | 106.0 |
| Comparative example 2-1 | — | 100.0 | 100.0 | 100.0 |
| Comparative example 2-2 | Compound (A-1) 0.5 mass % | 95.9 | 93.8 | 100.5 |

The results shown in Table 2 confirm that using the nonaqueous electrolytic solution of Example 2-1 according to the present invention reduced the continuous charge capacity and the amount of continuous charge gas and increased the discharge capacity after continuous charge, compared with the case (Comparative example 2-1) where the compound represented by Formula (1) was not used. Specifically, it was suggested that the addition of the compound represented by Formula (1) suppresses an electrochemical side reaction between the positive electrode charged at 4.4 V, which has high reactivity, and the nonaqueous electrolytic solution.

In the case (Comparative example 2-2) where the compound (A-1), which is outside the scope of Formula (1), was used such that the number of moles of the cyclic sulfonic acid skeleton was equal to that in Example 2-1, the continuous charge capacity, the amount of continuous charge gas, and the discharge capacity after continuous charge were improved but the improvement effects were small. That is, Example 2-1 was superior. In the case (Example 2-2) where the compound represented by Formula (1) was used such that the number of moles of the cyclic sulfonic acid skeleton was half that of the compound (A-1), results superior to Comparative example 2-2 were obtained in terms of the continuous charge capacity, the amount of continuous charge gas, and the discharge capacity after continuous charge. In other words, even if an excessively large number of moles of the compound (A-1) compared with the compound represented by Formula (1) is used, an electrolytic solution that includes the compound represented by Formula (1) is superior. It is clear that batteries including the electrolytic solution according to the present invention have superior characteristics.

Examples 3-1 to 3-5 and Comparative Examples 3-1 and 3-2

Example 3-1

[Preparation of Nonaqueous Electrolytic Solution]
A nonaqueous electrolytic solution was prepared as in Example 1-1.
[Preparation of Positive Electrode]
A positive electrode was prepared as in Example 1-1.
[Preparation of Negative Electrode]
A negative electrode was prepared as in Example 1-1.
[Preparation of Lithium Secondary Battery]
A lithium secondary battery was prepared as in Example 1-1.
[Evaluation of Initial Battery Characteristics]
The evaluation was made as in Example 1-1.
[High-Temperature Cycle Capacity Retention Factor Evaluation Test]
The high-temperature cycle capacity retention factor evaluation test was conducted as in Example 1-1, except that the number of the charge-discharge cycles was changed to 200. The ratio of the discharge capacity after 200 cycles to the cycle initial capacity is referred to as "cycle capacity retention factor" (%). Table 3 shows the evaluation results in relative values with the results of Comparative example 3-1 being 100.0%. The same applies hereinafter.
[Evaluation of Increase in Resistance]
The evaluation was made as in Example 1-1. The ratio of the resistance after 200 cycles to the initial resistance is referred to as "increase in resistance" (%). Table 3 shows the evaluation results in relative values with the results of Comparative example 3-1 being 100.0%. The same applies hereinafter. Table 3 summarizes the evaluation results.

Example 3-2

A lithium secondary battery was prepared as in Example 3-1, except that, instead of the compound (1-1), 0.94% by mass of the compound (1-2) was added to the electrolytic solution prepared in Example 3-1, and subjected to the above evaluations. Note that the amount of substance of the compound (1-1) used in Example 3-1 is equal to the amount of substance of the compound (1-2) used in Example 3-2.

Example 3-3

A lithium secondary battery was prepared as in Example 3-1, except that, instead of the compound (1-1), 0.88% by mass of the compound (1-7) was added to the electrolytic solution prepared in Example 1-1, and subjected to the above evaluations. Note that the amount of substance of the compound (1-1) used in Example 3-1 is equal to the amount of substance of the compound (1-7) used in Example 3-3.

Example 3-41

A lithium secondary battery was prepared as in Example 3-1, except that, instead of the compound (1-1), 0.71% by mass of the compound (1-4) was added to the electrolytic solution prepared in Example 3-1, and subjected to the above evaluations. Note that the amount of substance of the compound (1-1) used in Example 3-1 is equal to the amount of substance of the compound (1-4) used in Example 3-4.

Example 3-51

A lithium secondary battery was prepared as in Example 3-1, except that, instead of the compound (1-1), 0.76% by mass of the compound (1-8) was added to the electrolytic solution prepared in Example 3-1, and subjected to the above evaluations. Note that the amount of substance of the compound (1-1) used in Example 3-1 is equal to the amount of substance of the compound (1-8) used in Example 3-5.

Comparative Example 3-1

A lithium secondary battery was prepared as in Example 3-1, except that the electrolytic solution prepared in Example 3-1 did not contain the compound (1-1), and subjected to the above evaluations.

Comparative Example 3-2

A lithium secondary battery was prepared as in Example 3-1, except that, instead of the compound (1-1), 2.00% by mass of the compound (A-1) was added to the electrolytic solution prepared in Example 3-1, and subjected to the above evaluations. Note that the amount of substance of the compound (A-1) used in Comparative example 3-2 is 8 times the amount of substance of the compound (1-1) used in Example 3-1.

TABLE 3

| | Additive | Cycle capacity retention factor (%) | Increase in resistance (%) |
|---|---|---|---|
| Example 3-1 | Compound (1-1) 0.85 mass % | 116.2 | 60.2 |
| Example 3-2 | Compound (1-2) 0.94 mass % | 117.4 | 74.5 |
| Example 3-3 | Compound (1-7) 0.88 mass % | 115.8 | 61.4 |
| Example 3-4 | Compound (1-4) 0.71 mass % | 109.1 | 46.4 |

TABLE 3-continued

| | Additive | Cycle capacity retention factor (%) | Increase in resistance (%) |
|---|---|---|---|
| Example 3-5 | Compound (1-8) 0.76 mass % | 107.7 | 58.0 |
| Comparative example 3-1 | — | 100.0 | 100.0 |
| Comparative example 3-2 | Compound (A-1) 2.00 mass % | 113.9 | 104.6 |

The results shown in Table 3 confirm that using the nonaqueous electrolytic solutions of Examples 3-1 to 3-5 according to the present invention increased the cycle capacity retention factor and limited an increase in resistance compared with the case (Comparative example 3-1) where the compound represented by Formula (1) was not used. That is, excellent batteries were prepared. Specifically, it was suggested that the addition of the compound represented by Formula (1) increases the thermal stability of the coating film deposited on the negative electrode, thereby suppresses the electrochemical side reaction that occurs on the electrode, and enables the production of a stable battery the resistance of which does not vary significantly during the cycle test period.

In Comparative example 3-2, where the compound (A-1) which is outside the scope of Formula (1) was used in an excessive amount that was 8 times the amount of substance of the compound (1-1) used in Example 3-1, the addition of the excessive amount of the compound (A-1) increased the cycle capacity retention factor but accelerated the increase in resistance. In contrast, in the case where the compound represented by Formula (1) was used, the cycle capacity retention factor was increased while an increase in resistance was limited. Therefore, it is clear that batteries including the electrolytic solution according to the present invention have superior characteristics.

Examples 4-1 to 4-4 and Comparative Example 4-1

Example 4-1

[Preparation of Nonaqueous Electrolytic Solution]

In a dry argon atmosphere, $LiPF_6$ used as an electrolyte was dissolved in a mixed solvent including ethylene carbonate (EC), ethyl methyl carbonate (EMC), and dimethyl carbonate (DMC) (volume mixing ratio EC:EMC:DMC=3:4:3) in a proportion of 1.0 mol/L to prepare a fundamental electrolytic solution. To the fundamental electrolytic solution, 0.85% by mass of the compound (1-1) was added to prepare a nonaqueous electrolytic solution of Example 4-1.

[Preparation of Positive Electrode]

With 85 parts by mass of lithium nickel manganese cobalt oxide ($LiNi_{1/3}Mn_{1/3}Co_{1/3}O_2$) used as a positive electrode active material, 10 parts by mass of carbon black and 5 parts by mass of polyvinylidene fluoride were mixed. N-methyl-2-pyrrolidone was added to the resulting mixture to form a slurry. The slurry was uniformly applied onto both surfaces of an aluminum foil having a thickness of 15 μm. The resulting coating layers were dried and subsequently pressed. Hereby, a positive electrode was prepared.

[Preparation of Negative Electrode]

A natural graphite powder used as a negative electrode active material, an aqueous dispersion of sodium carboxymethyl cellulose (concentration of sodium carboxymethyl cellulose: 1 mass %) used as a thickener, and an aqueous dispersion of a styrene butadiene rubber (concentration of styrene butadiene rubber: 50 mass %) used as a binder were mixed with one another with a disperser to form a slurry. The slurry was uniformly applied onto one of the surfaces of a copper foil having a thickness of 10 μm. The resulting coating layer was dried and subsequently pressed. Hereby, a negative electrode was prepared. The negative electrode was prepared such that the mass ratio of Natural graphite:Sodium carboxymethyl cellulose:Styrene butadiene rubber in the dried negative electrode was 98:1:1.

[Preparation of Lithium Secondary Battery]

The positive electrode, the negative electrode, and a separator composed of polypropylene were stacked on top of one another in the order of negative electrode, separator, positive electrode, separator, and negative electrode to form a battery element. The battery element was inserted into a package that was a laminated film formed by coating both surface of an aluminum film (thickness: 40 μm) with a resin layer, such that the terminals of the positive and negative electrodes were protruded from the package. The nonaqueous electrolytic solution was charged into the package, which was vacuum sealed. Hereby, a sheet-like lithium secondary battery was prepared.

[Evaluation of Initial Battery Characteristics]

While the lithium secondary battery was sandwiched between glass plates and pressurized by the glass plates, it was charged to 4.2 V at a constant current corresponding to 1/GC and further charged at a constant voltage until the current decreased to 0.01 C at 25° C. (the above charging method is referred to also as "constant current-constant voltage charging" or "CC-CV charging").

Subsequently, the battery was discharged to 2.5 V at a constant current corresponding to 1/6C and then charged to 4.1 V at maximum at a current corresponding to 1/6C until the current decreased to 0.01 C, that is, by constant current-constant voltage charging. Subsequently, the battery was left to stand at 60° C. for 12 hours. Then, the temperature was reduced to 25° C. and the battery was discharged to 2.5 V at a constant current corresponding to 1/6C. The battery was again charged to 4.2 V at maximum at a current corresponding to 1/6C at 25° C. until the current decreased to 0.01 C, that is, by constant current-constant voltage charging. The battery was then discharged to 2.5 V at a constant current corresponding to 1/6C.

Subsequently, the battery was charged to 3.72 V at maximum at a current corresponding to 1/6C at 25° C. until the current decreased to 0.01 C, that is, by constant current-constant voltage charging. Then, the alternating current impedance was measured at 0° C.

The imaginary component of the resistance at 0.5 Hz was used for comparison. This resistance was considered as initial resistance.

[High-Temperature Cycle Capacity Retention Factor Evaluation Test]

The lithium secondary battery that had been evaluated in terms of initial battery characteristics was charged to 4.2 V at maximum at a constant current corresponding to 1/3C at 60° C. The battery was further charged at a constant voltage until the total amount of time during which the battery was charged, which was calculated taking the time during which the battery was charged by constant-current charging into account, reached 6 hours. Subsequently, the battery was discharged to 2.5 V at a constant current corresponding to 1/3C. The discharge capacity of the battery measured after the above charge-discharge cycle is referred to as "cycle initial capacity". Then, the battery was charged to 4.2 V by 1 C constant-current constant-voltage charging (total charging time: 2 hours) and subsequently discharged to 2.5 V at a constant current of 1 C. The above charge-discharge cycle was repeated 200 times. Subsequently, the battery was charged to 4.2 V by 1/3C constant-current constant-voltage charging (total charging time: 2 hours) and subsequently discharged to 2.5 V at a constant current corresponding to 1/3C. The discharge capacity of the battery measured after the above charge-discharge cycles is referred to as "discharge capacity after 200 cycles". The ratio of the discharge capacity after 200 cycles to the cycle initial capacity is referred to as "cycle capacity retention factor" (%). Table 4 shows the evaluation results in relative values with the results of Comparative example 4-1 being 100.0%. The same applies hereinafter.

[Evaluation of Increase in Resistance]

The temperature of the battery used in the high-temperature endurance test was reduced to 25° C. Subsequently, the battery was charged to 3.72 V at maximum at a current corresponding to 1/3C at 25° C. until the current decreased to 0.01 C, that is, by constant current-constant voltage charging. The battery was then cooled to 0° C. Subsequently, the alternating current impedance was measured.

The imaginary component of the resistance at 0.5 Hz was used for comparison. This resistance is referred to as "resistance after cycles". The ratio of the resistance after cycles to the initial resistance is referred to as "increase in resistance" (%). Table 4 shows the evaluation results in relative values with the results of Comparative example 4-1 being 100.0%. The same applies hereinafter. Table 4 summarizes the evaluation results.

Example 4-2

A lithium secondary battery was prepared as in Example 4-1, except that, instead of the compound (1-1), 0.94% by mass of the compound (1-2) was added to the electrolytic solution prepared in Example 4-1, and subjected to the above evaluations. Note that the amount of substance of the compound (1-1) used in Example 4-1 is equal to the amount of substance of the compound (1-2) used in Example 4-2.

Example 4-31

A lithium secondary battery was prepared as in Example 4-1, except that, instead of the compound (1-1), 0.71% by mass of the compound (1-4) was added to the electrolytic solution prepared in Example 4-1, and subjected to the above evaluations. Note that the amount of substance of the compound (1-1) used in Example 4-1 is equal to the amount of substance of the compound (1-4) used in Example 4-3.

Example 4-4

A lithium secondary battery was prepared as in Example 4-1, except that, instead of the compound (1-1), 0.76% by mass of the compound (1-8) was added to the electrolytic solution prepared in Example 4-1, and subjected to the above evaluations. Note that the amount of substance of the compound (1-1) used in Example 4-1 is equal to the amount of substance of the compound (1-8) used in Example 4-4.

Comparative Example 4-1

A lithium secondary battery was prepared as in Example 4-1, except that the electrolytic solution prepared in Example 4-1 did not contain the compound (1-1), and subjected to the above evaluations.

TABLE 4

| | Additive | Cycle capacity retention factor (%) | Increase in resistance (%) |
|---|---|---|---|
| Example 4-1 | Compound (1-1) 0.85 mass % | 100.9 | 12.3 |
| Example 4-2 | Compound (1-2) 0.94 mass % | 102.2 | 13.8 |
| Example 4-3 | Compound (1-4) 0.71 mass % | 101.5 | 49.2 |
| Example 4-4 | Compound (1-8) 0.76 mass % | 100.3 | 52.4 |
| Comparative example 4-1 | — | 100.0 | 100.0 |

The results shown in Table 4 confirm that using the nonaqueous electrolytic solutions of Examples 4-1 to 4-4 according to the present invention increased the cycle capacity retention factor and limited an increase in resistance compared with the case (Comparative example 4-1) where the compound represented by Formula (1) was not used. That is, excellent batteries were prepared. Specifically, it was suggested that the addition of the compound represented by Formula (1) increases the thermal stability of the coating film deposited on the negative electrode, thereby suppresses the electrochemical side reaction that occurs on the electrode, and enables the production of a stable battery the resistance of which does not vary significantly during the cycle test period. It is clear that batteries including the electrolytic solution according to the present invention have superior characteristics.

Although the present invention has been described in detail with reference to specific embodiments, it is apparent to a person skilled in the art that various alterations and modifications can be made therein without departing from the spirit and scope of the present invention.

The present application is based on a Japanese patent application (Japanese Patent Application No. 2018-060481) filed on Mar. 27, 2018, which is incorporated herein by reference in its entirety.

INDUSTRIAL APPLICABILITY

The nonaqueous electrolytic solution according to the present invention may improve the discharge capacity retention factor of an energy device that includes the nonaqueous electrolytic solution and the resistance characteristics of the energy device relative to the initial battery, which are determined in the high-temperature cycle test, and may reduce the amount of gas generated by the energy device and the continuous charge capacity of the energy device, which are determined in the high-temperature continuous-charging endurance test. Thus, the nonaqueous electrolytic solution according to the present invention is useful. Therefore, the nonaqueous electrolytic solution according to the present invention and the energy device may be used in a variety of known applications. Specific examples of the applications include a notebook computer, a pen-input computer, a portable computer, an electronic book player, a cellular mobile phone, a portable facsimile, a portable copier, a portable printer, a headphone stereo, a video movie, a liquid crystal television, a handy cleaner, a portable CD, a minidisc, a transceiver, an electronic personal organizer, an electronic calculator, a memory card, a portable tape recorder, a radio, a backup power source, a motor, an automobile, a motorcycle, a motorized bicycle, a bicycle, lighting equipment, a toy, game instrument, a clock, an electric tool, a stroboscope, a camera, a backup power source for home use, a backup power source for office use, a load-levelling power source, and a nature-energy storing power source.

The invention claimed is:

1. A compound of Formula (1):

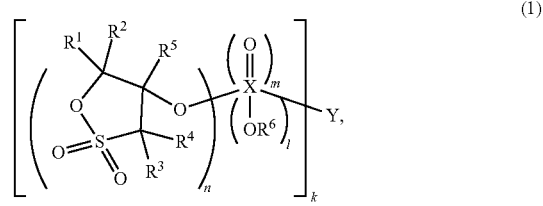

wherein, $R^1$ to $R^5$ are each independently H or an optionally substituted alkyl group comprising 1 to 3 carbon atoms, $R^6$ is an organic group comprising 1 to 8 carbon atoms and optionally a heteroatom, X is C, S, or P, when X is C, l=0, m=1, and n=1, when X is S, l=0, m=2, and n=1, and when X is P, l=0, m=1, and n=2 or l=1, m=1, and n=1, k is an integer in a range of from 2 to 4; and Y is a direct bond or a linking group comprising 4 to 8 carbon atoms and optionally a heteroatom, and when Y is a direct bond, the compound has an X-X bond and k=2.

2. The compound of claim 1, wherein, in Formula (1), Y is an alkylene group comprising 4 carbon atoms.

3. A nonaqueous electrolytic solution, comprising:
a nonaqueous solvent; and
a compound of Formula (1):

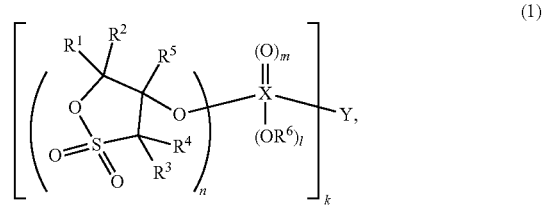

wherein, $R^1$ to $R^5$ are each independently H or an optionally substituted alkyl group that has 1 to 3 carbon atoms, $R^6$ is an organic group comprising 1 to 8 carbon atoms and optionally a heteroatom, X is C, S, or P, when X is C, l=0, m=1, and n=1, when X is S, l=0, m=2, and n=1, and when X is P, l=0, m=1, and n=2 or l=1, m=1, and n=1, k is an integer in a range of from 2 to 4, and Y is a direct bond or a linking group comprising 4 to 8 carbon atoms and optionally a heteroatom, and when Y is a direct bond, the compound has an X-X bond and k=2.

4. The solution of claim 3, wherein, in Formula (1), all of $R^1$ to $R^5$ are H.

5. The solution of claim 3, wherein Y is absent in Formula (1) and the compound has an X-X bond.

6. The solution of claim 3, wherein, in Formula (1), X is P and $R^6$ is a methyl group or an ethyl group.

7. The solution of claim 1, wherein a content of the compound of formula (1) is in a range of from 0.01% to 10% by mass, relative to 100% by mass of the nonaqueous electrolytic solution.

8. The solution of claim 3, further comprising:
an electrolyte.

9. The solution of claim 3, further comprising:
a cyclic carbonate comprising an unsaturated carbon-carbon bond,
a cyclic carbonate comprising a fluorine atom, and/or
a salt comprising fluorine.

10. An energy device, comprising:
a negative electrode capable of occluding and releasing a metal ion;
a positive electrode capable of occluding and releasing a metal ion; and
the nonaqueous electrolytic solution of claim 3.

11. The device of claim 10, wherein the positive electrode comprises a layered transition metal oxide.

12. The device of claim 10, wherein the negative electrode comprises a carbon compound.

13. An electric vehicle, comprising:
the device of claim 10 as an energy source.

14. The solution of claim 3, wherein, in Formula (1), Y is an alkylene group comprising 4 carbon atoms.

15. The device of claim 10, wherein the positive electrode comprises a first layered transition metal oxide and a second layered transition metal oxide.

16. The solution of claim 3, wherein the compound of Formula (1) comprises

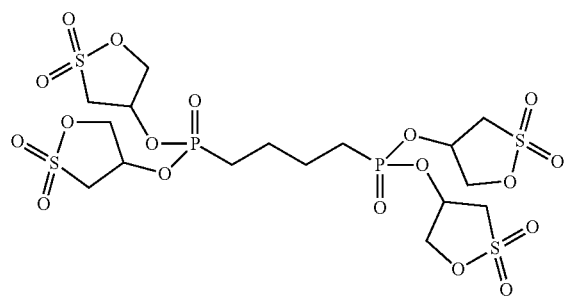

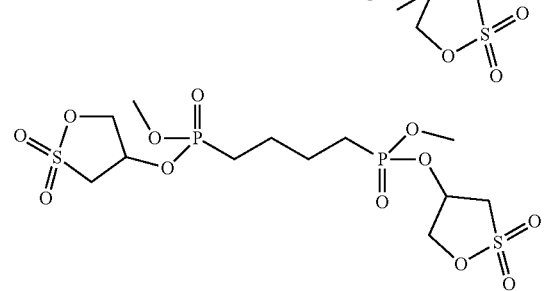

-continued

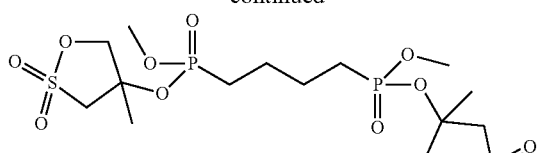

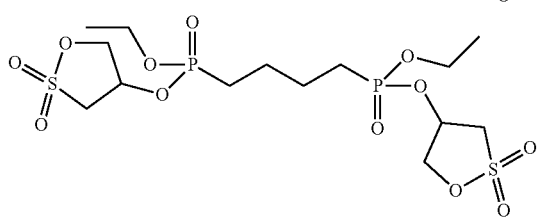

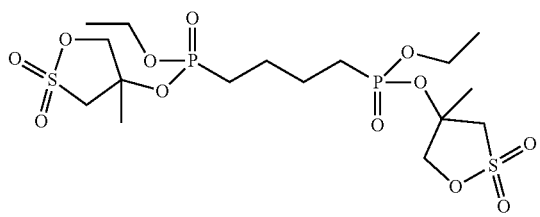

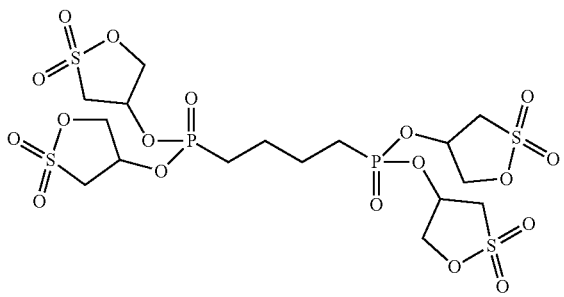

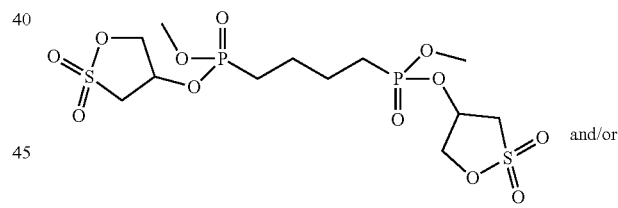

and/or

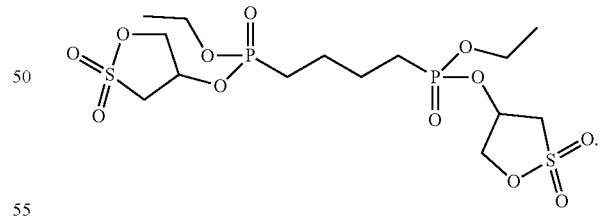

17. The solution of claim 3, wherein the compound of Formula (1) comprises

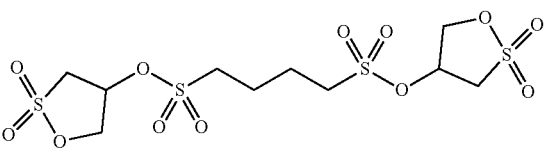

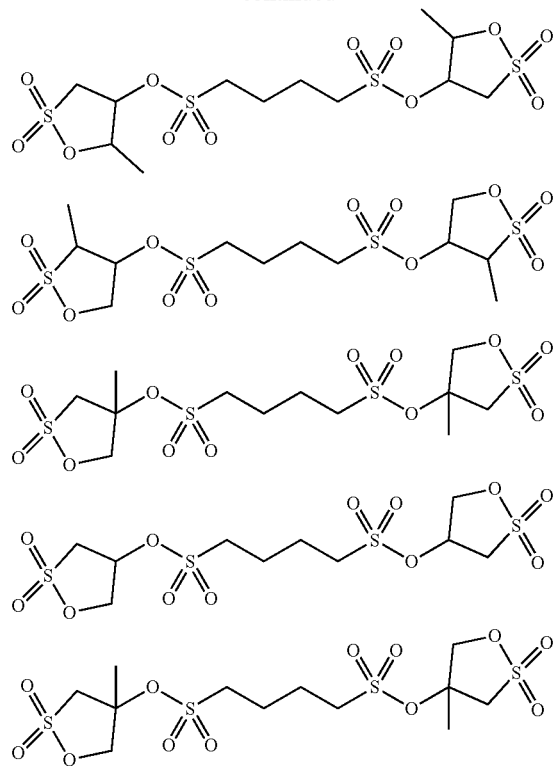
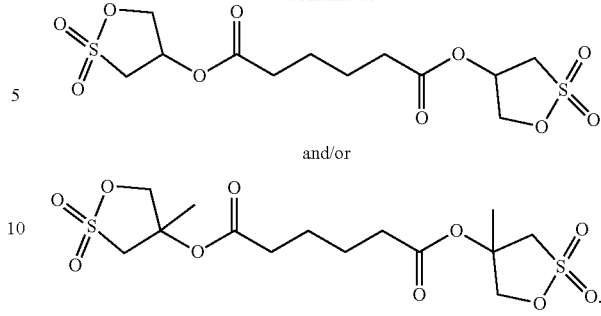
and/or
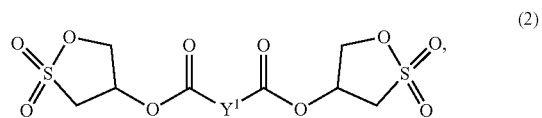
18. The solution of claim 3, wherein, in the compound of Formula (1), X is S.
19. A compound of Formula (2):
$$\text{(2)}$$
wherein,
Y$^1$ is a direct bond or a linking group comprising 4 to 8 carbon atoms and optionally a heteroatom.
20. The compound of claim 19, wherein, in Formula (2), Y is an alkylene group comprising 4 carbon atoms.
* * * * *